United States Patent [19]

Dale et al.

[11] Patent Number: 5,621,731
[45] Date of Patent: Apr. 15, 1997

[54] PRIVATE EXCHANGE FOR ISDN

[75] Inventors: Allan D. Dale, Haslett; Earl Goodrich, II, East Lansing; Thomas R. Bayerl, Williamston; Brian P. Dick, Haslett; Scott W. B. English, Okemos; John C. Dougherty, Lansing, all of Mich.

[73] Assignee: Omnilink Communications Corporation, Lansing, Mich.

[21] Appl. No.: 192,177

[22] Filed: Feb. 4, 1994

[51] Int. Cl.$^6$ .............................. H04Q 5/00; H04M 1/00
[52] U.S. Cl. ........................ 370/79; 370/67; 370/110.1; 379/94; 379/231
[58] Field of Search .................................... 370/58.1, 58.2, 370/66, 67, 68.1, 85.1, 85.9, 85.13, 110.1, 110.2, 62, 79; 379/67, 94, 96, 231, 234, 201

[56] References Cited

U.S. PATENT DOCUMENTS

| | | | |
|---|---|---|---|
| 3,952,172 | 4/1976 | Penn et al. | 379/12 |
| 4,535,202 | 8/1985 | Meunier | 379/379 |
| 4,551,581 | 11/1985 | Doughty | 379/94 |
| 4,575,585 | 3/1986 | Brown | 379/361 |
| 4,652,701 | 3/1987 | Cubbison, Jr. | 379/373 |
| 4,709,388 | 11/1987 | Defretin | 379/413 |
| 4,737,986 | 4/1988 | Tsunoda | 379/373 |
| 4,740,955 | 4/1988 | Litterer et al. | 370/67 |
| 4,805,213 | 2/1989 | Schlanger | 379/373 |
| 4,808,905 | 2/1989 | Chen et al. | 323/222 |
| 4,839,920 | 6/1989 | Held-Elbert et al. | 379/377 |
| 4,868,873 | 9/1989 | Kamil | 379/386 |
| 4,953,195 | 8/1990 | Okemori | 379/33 |
| 4,979,171 | 12/1990 | Ashley | 370/110.2 |
| 4,998,243 | 3/1991 | Kao | 370/62 |
| 5,008,884 | 4/1991 | Yazawa et al. | 370/110.1 |
| 5,023,868 | 6/1991 | Davidson et al. | 370/62 |
| 5,027,345 | 6/1991 | Littlewood et al. | 370/58.2 |
| 5,054,055 | 10/1991 | Hanle et al. | 379/142 |
| 5,060,241 | 10/1991 | Allouis et al. | 375/108 |
| 5,067,125 | 11/1991 | Tsuchida | 370/79 |
| 5,077,734 | 12/1991 | Ohtsuka | 370/110.1 |
| 5,113,396 | 5/1992 | Kagami | 370/110.2 |
| 5,193,110 | 3/1993 | Jones et al. | 379/94 |
| 5,291,549 | 3/1994 | Izumi | 379/233 |
| 5,398,246 | 3/1995 | Fujioka | 370/94.1 |
| 5,400,397 | 3/1995 | Ryu | 379/201 |
| 5,414,760 | 5/1995 | Hokari | 379/93 |
| 5,416,835 | 5/1995 | Lee | 379/221 |

FOREIGN PATENT DOCUMENTS

| | | |
|---|---|---|
| 9209164 | 5/1992 | WIPO . |
| 9312594 | 6/1993 | WIPO . |

OTHER PUBLICATIONS

"A Catalog of National ISDN Solutions for Selected NIUF Applications," Second Edition, Contributed by NIUF Applications Analysis Working Group, Oct. 19, 1993, pp. 1-1–I-9.

Primary Examiner—Hassan Kizou
Attorney, Agent, or Firm—Van Dyke, Gardner, Linn & Burkhart, LLP

[57] ABSTRACT

An integrated services digital network (ISDN) private exchange device is provided, which includes connectors for connection to an ISDN local exchange, a plurality of ports for connection to respective analog telephone devices, a plurality of ports for connection to respective digital devices, and an ISDN digital port for connection to at least one additional ISDN terminal device. The private exchange device may include a pair of ports for connection to two different analog telephone devices, each having simultaneous access capability with the ISDN network. Further, the private exchange device may include four ports for connection up to four digital devices, which are each capable of simultaneously accessing the ISDN local exchange. The ISDN digital port can be connected with up to eight ISDN terminals or terminal adapters. The private exchange device may further include a detector for detecting whether the port connected to the local exchange is connected to an ISDN network or to a conventional network and for bypassing an ISDN control circuit if the system detects that it is connected to a conventional analog network.

72 Claims, 66 Drawing Sheets

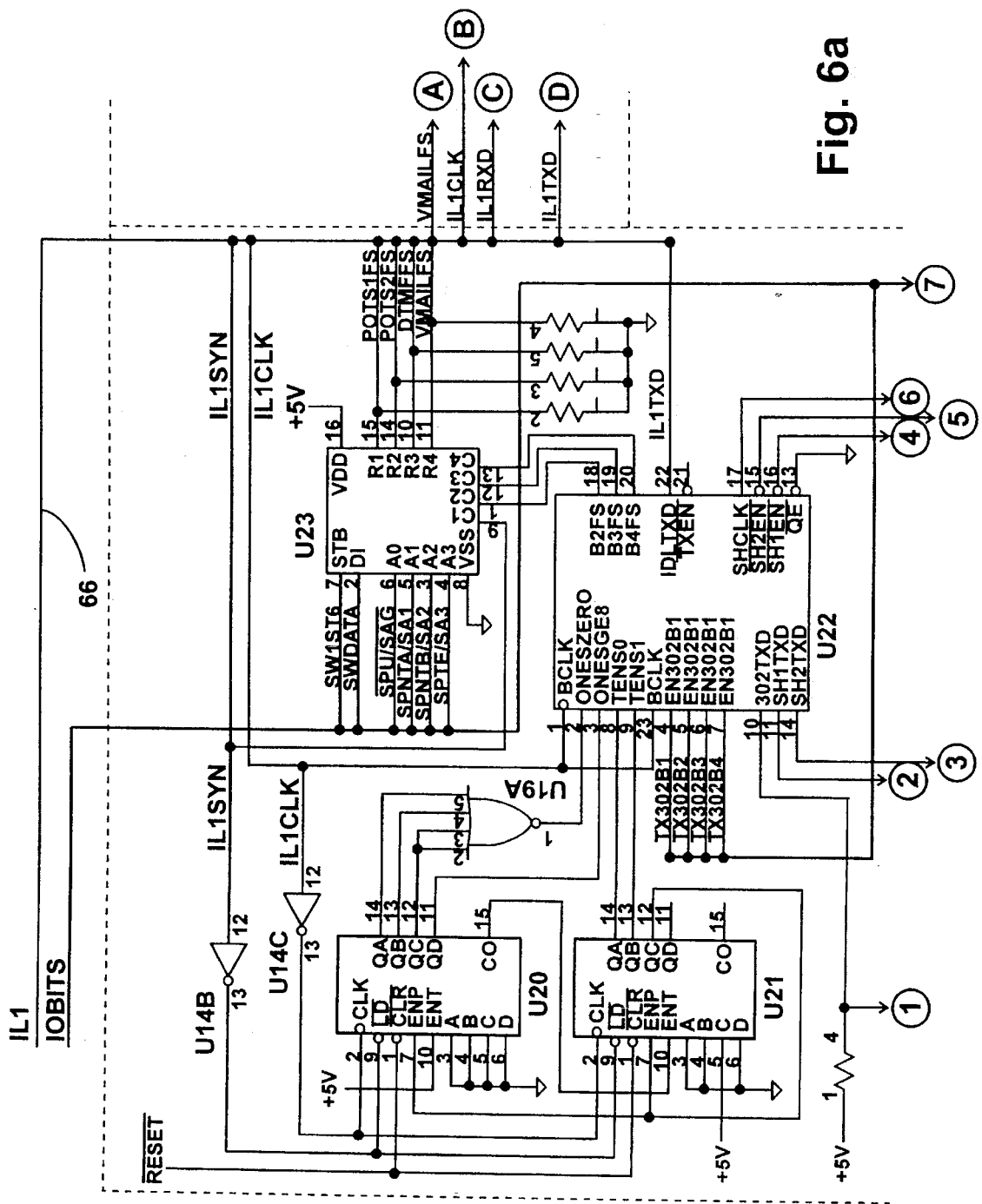

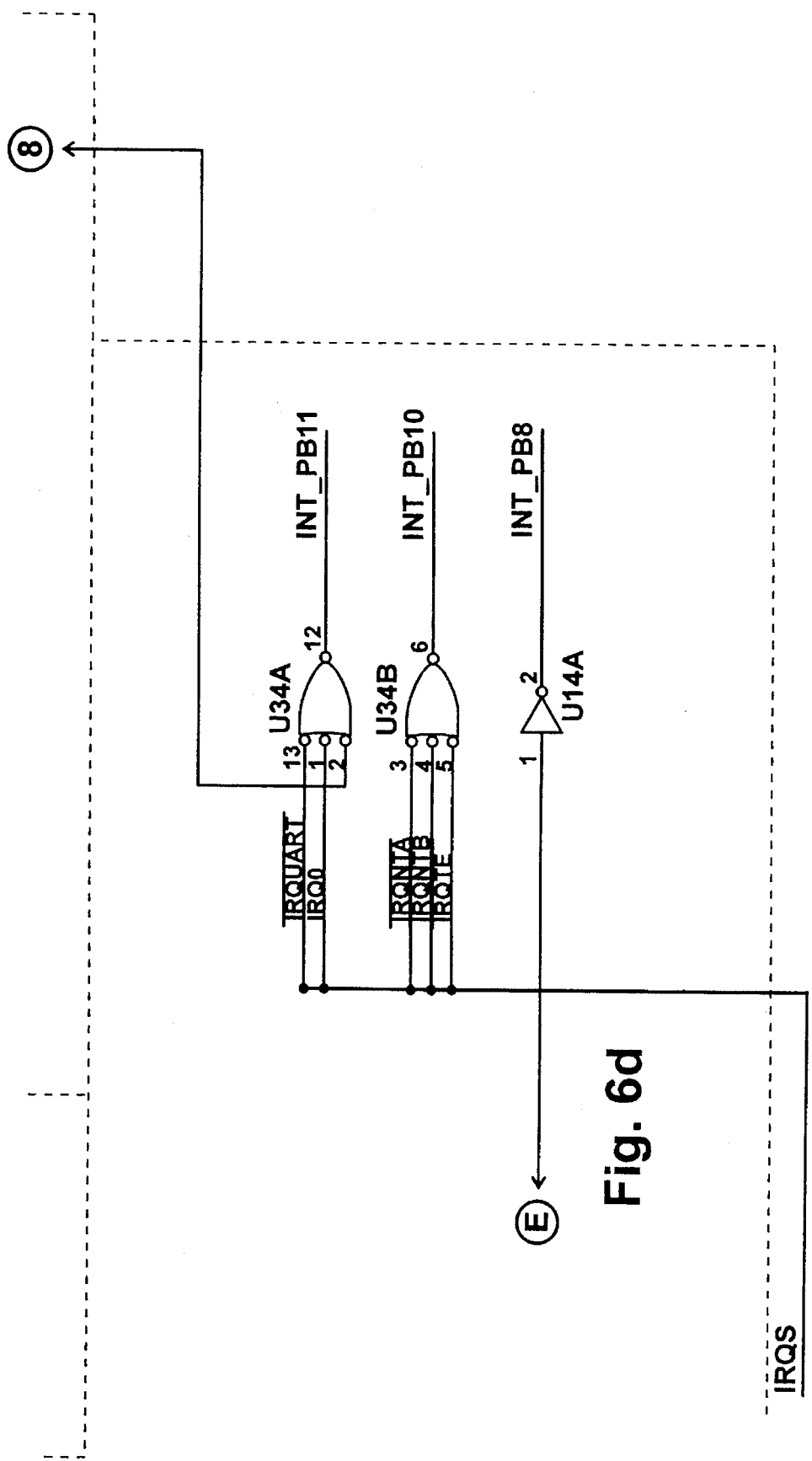

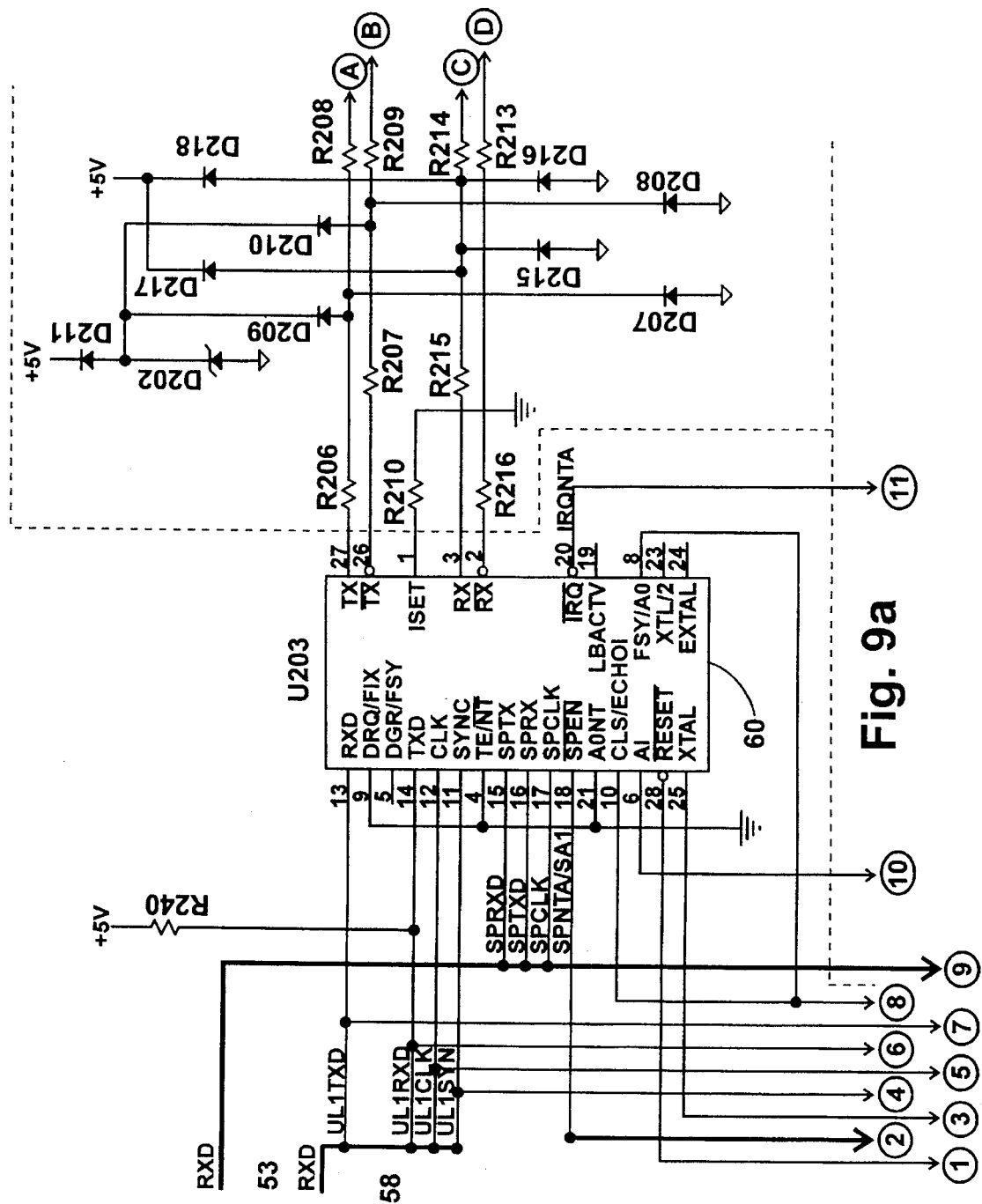

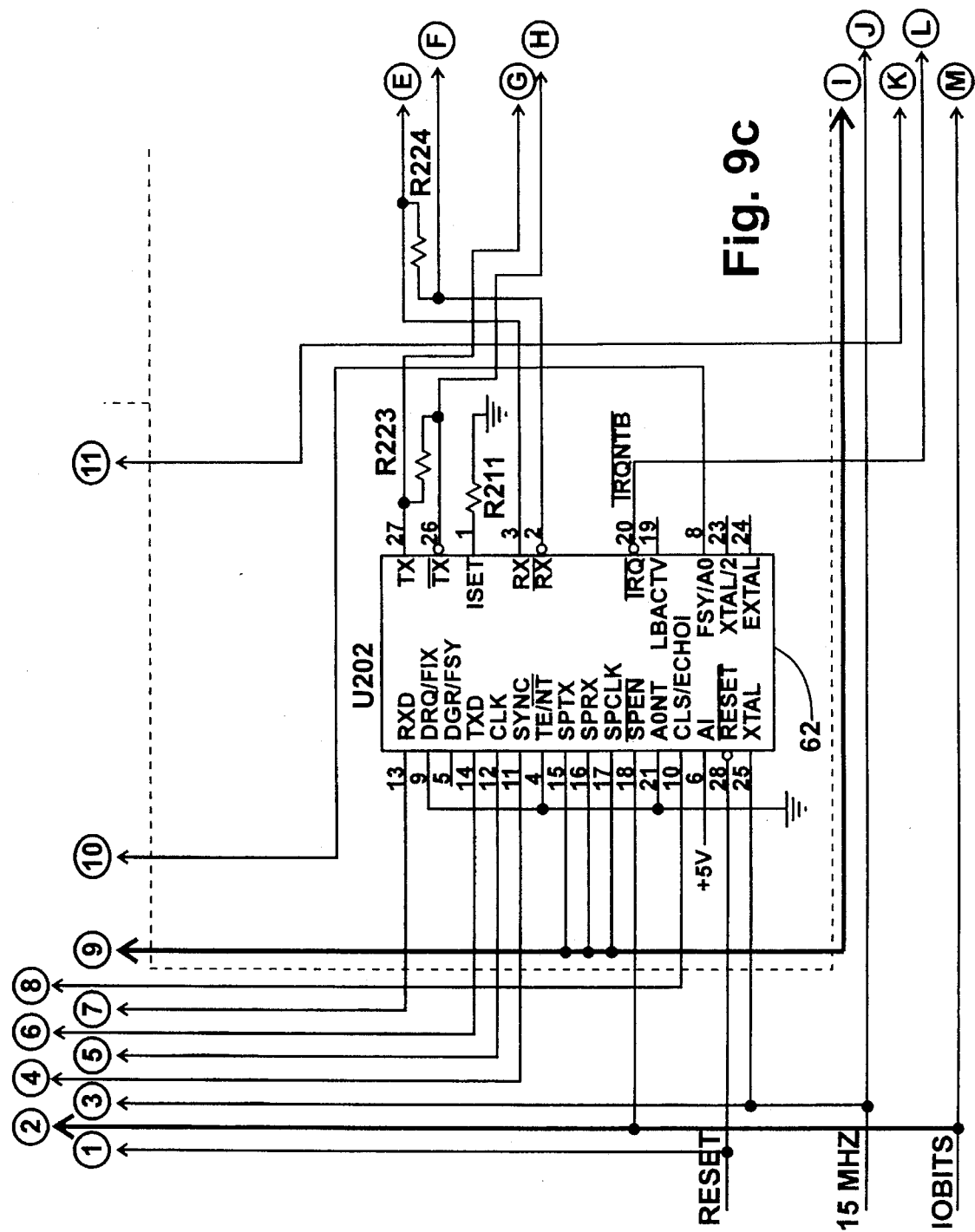

Fig. 21a  Hook State Diagram

Hook State Table

|  | H1 | H2 | H3 | H4 |
|---|---|---|---|---|
|  | • On-Hook<br>• No Timers<br>• Upper Layers On-Hook | • Unknown Hook<br>• B Timer<br>• Upper Layer On-Hook | • Flash, Dial or On-Hook<br>• C Timer<br>• Upper Layers Off-Hook | • Unknown Hook<br>• B Timer<br>• Upper Layers Off-Hook |
| DTMF Interrupt | — |  | — | — |
| On-Hook Interrupt | — | — |  | — |

Fig. 21b1

Hook State Table

| | H1 | H2 | H3 | H4 |
|---|---|---|---|---|
| Off-Hook Interrupt | H6<br>• Set FOH<br>• Start A<br>• Prohibit Ringing | — | Time<=20 H7<br>• Cancel C<br>• Enable 429<br>20<Timer<100 H10<br>• Pulse Count<br>• Record Time<br>Timer>=100 H8<br>• Cancel C<br>• Enable 429<br>• Set FOH<br>• Start A<br>• Send Flash Msg | — |
| Timer A Expiry | / | / | / | / |

Fig. 21b2

Hook State Table

| | H1 | H2 | H3 | H4 |
|---|---|---|---|---|
| Timer B Expiry | / | Read Off Hook → H7<br>• Send Off-Hook Msg<br>• Allow Ringing<br>Read On-Hook → H1<br>• Allow Ringing | / | Read Off-Hook → H7<br>Read On-Hook → H1<br>• Send On-Hook Message |
| Timer C Expiry | * | * | H1<br>• Enable 429<br>• Send On-Hook Msg | * |
| Caller ID Start | H9<br>• Set FOH<br>• Start A | — | — | — |
| Caller ID Stop | / | / | / | / |

"/" - No Change, no action
FOH - Forced Off-Hook

"/" - Impossible or prohibited situation
Timer A - 40ms for allowing SLIC to power up

Fig. 21b3

Hook State Table

| | H5 | H6 | H7 | H8 |
|---|---|---|---|---|
| | • On-Hook<br>• No Timers<br>• FOH<br>• Playing Caller ID<br>• Upper Layers On-Hook | • Off-Hook (Probably)<br>• A Timer<br>• FOH<br>• Upper Layers On-Hook | • Off-Hook<br>• No Timers<br>• Upper Layers Off-Hook | • Off-Hook (Probably)<br>• A Timer<br>• FOH<br>• Upper Layers Off-Hook |
| DTMF Interrupt | — | — | H7<br>• Send DTMF Message | — |
| On-Hook Interrupt | — | — | H3<br>• Disable 429<br>• Start C<br>• Record Time | — |

Fig. 21b4

Hook State Table

| | H5 | H6 | H7 | H8 |
|---|---|---|---|---|
| Off-Hook Interrupt | — | — | — | — |
| Timer A Expiry | / | H2<br>• Clear FOH<br>• Start B | / | H4<br>• Clear FOH<br>• Start B |

Fig. 21b5

Hook State Table

| | H5 | H6 | H7 | H8 |
|---|---|---|---|---|
| Timer B Expiry | / | / | / | / |
| Timer C Expirey | * | * | * | * |
| Caller ID Start | / | — | — | — |
| Caller ID Stop | H2<br>• Clear FOH<br>• Start B | / | / | / |

"*" - Technically a "/" but implemented as a "—"
Timer B - 150ms after removal of FOH fro Hook Status Check

Fig. 21b6

Hook State Table

| | H9 | H10 | H11 |
|---|---|---|---|
| | • On-Hook<br>• A Timer<br>• FOH<br>• Preparing Caller ID<br>• Upper Layers On-Hook | • Off-Hook<br>• C Timer<br>• Pusle Dial<br>• Upper Layers Off-Hook | • On-Hook<br>• C Timer<br>• Pulse Dial<br>• Upper Layers Off-Hook |
| DTMF Interrupt | — | — | — |
| On-Hook Interrrupt | — | Timer<=20: H11<br>20,Timer,75: H11<br>• Record Time<br>Timer>=75: H11<br>• Send Pulse Count as Digit Msg | — |

Fig. 21b7

Hook State Table

| | H9 | H10 | H11 | |
|---|---|---|---|---|
| Off-Hook Interrupt | — | — | Time<=20: H10<br>20<Time<100: H10<br>• Interrupt Pulse Count<br>• Record Time<br>Time>=100: H8<br>• Cancel C<br>• Enable 429<br>• Set FOH<br>• Start A<br>• Send Flash Msg | / |
| Timer A Expiry | H5<br>• Play Caller ID | | | / |

Fig. 21b8

Hook State Table

| | H9 | H10 | H11 |
|---|---|---|---|
| Timer B Expiry | / | / | / |
| Timer C Expiry | * | Elapse<250:  H10<br>• Restart C from Recorded Time<br><br>Elapse>=250:  H7<br>• Enable 429<br>• Send Pulse Count as Digit Msg | Elapse<(C-20):  H11<br>• Restart C from Recorded Time<br><br>Elapse>=(C-20):  H1<br>• Enable 429<br>• Send On-Hook Msg |
| Caller ID Start | / | / | — |
| Caller ID Stop | / | / | / |

All times given in table are in milliseconds
Timer C - is for Flash Detection vs. Off-On-Off Hook

Fig. 21b9

Dial Mode (dial tone)

Command Mode

Dial Mode

Shortcut Keys

To access this level from Dial Mode, enter: #10

Base System Setup

Set System Time

To access this level from Dial Mode, enter: #12 and the line number

To access this level from Dial Mode, enter #19 and the port number

Log Mask bit Definition

| Bit | Name | Description |
|---|---|---|
| 0 | Logprim | Log CE/ME and level 2 primitives processed |
| 1 | Logpkt | Print the header data of each level 2 frame |
| 2 | Logdata | |
| 3 | Lapstate | Log the LAP state transitions |
| 4 | Lapvar | Print a selected set of LAP local varieties |
| 5 | Logsvcprim | Log all related primitives done by LAP |
| 6 | Lodgebug | Print detailed messages from LAP which can be used to trace the program flow |
| 7 | Lognls | Print NLS debugging information |
| 8 | Nlpprim | Log NLP primitives processed |
| 9 | Nlppkt | reserved |
| 10 | Nlpdata | Log the contents of each NLP packet |
| 11 | Nlpstate | Log the NLP state transitions. NLP state information is not logged when Nlpvar is set |
| 12 | Nlpvar | Print a selected set of the NLP local variables |
| 13 | Nlpsend | Print information concerning packets being sent to either the CE/ME or LAP by NLP |
| 14 | Nlpdebug | Print defaulted messages from NLP which can be used to trace the program flow |
| 15 | USART debug | Log messages in the TAUI and ULLD code for debugging messages |

Fig. 36

PRIVATE EXCHANGE FOR ISDN

BACKGROUND OF THE INVENTION

The present invention pertains to private exchanges and, more particularly, to a basic rate private exchange for interfacing between a digital network local exchange such as the Integrated Services Digital Network (ISDN) and a wide variety of different types of subscriber station devices.

The Integrated Services Digital Network is a world-wide telephone industry standard for the delivery of digital telephony services. In its Basic Rate Interface (BRI) implementation, ISDN can utilize most existing two-wire local exchange loops. In North America, the ISDN basic rate interface provides full duplex, 160,000 bit per second service through an encoding and signaling technique known as 2B1Q. Either 2B1Q or other similar encoding techniques are used outside of North America. CCITT ISDN specifications have defined several interface reference points in the ISDN. The customer end of the two wire local exchange loop is known as the "U" reference point which connects to a network local exchange LE (FIG. 23). At the U reference point, the 160,000 bit per second bandwidth is subdivided into one 16,000 bit per second signaling and packet data D (FIG. 24) channel, two 64,000 bit per second bearer B channels and one 16,000 bit per second maintenance M channel. According to CCITT specifications, the U reference interface must be terminated by a device known as a Network Termination-1 (NT-1). The NT-1 processes the information in maintenance channel M and converts the two-wire full duplex interface into a four-wire duplex interface including two two-wire simplex interfaces. The four-wire downstream interface provided by the NT-1 is known as the "S/T" reference point. According to the CCITT reference model for ISDN, all ISDN Customer Premises Equipment connects at the S/T reference point.

Signaling activity, performing the functions of call setup, call progress and data link establishment, for BRI of the ISDN is performed by a complex protocol of, information packet exchanges across the signaling channel D between the local exchange and the customer premises equipment. This signalling activity is sufficiently complex to require the services of a powerful microcomputer and a large, complex set of software instructions contained within the customer premises equipment.

A difficulty encountered in marketing a digital network private exchange such as that connected to the ISDN U and S/T reference interface points, are totally incompatible with the existing analog Plain Old Telephone Service (POTS). None of the existing POTS customer premises equipment, such as telephones, answering machines, PBXs facsimile devices and modems can operate if they are attached directly to either the U or the S/T ISDN reference points. In the CCITT ISDN reference model, the primary method for telephony users to connect to an ISDN basic rate interface is through entirely new digital S/T reference interface customer premises equipment. Due to many factors, such as the complexity of ISDN basic rate interface signaling protocols, the digital S/T reference interface customer premises equipment has proven to be very expensive, often on the order of ten times the cost of POTS customer premises equipment. Additionally, in North America the ISDN user is responsible for the cost of supplying and installing the ISDN basic rate interface NT-1 device, and providing main power and power backup devices necessary to supply reliable DC power to the attached S/T reference interface customer premises equipment.

Over the past several years, United States telephone service suppliers have invested billions of dollars developing and deploying the central office switching equipment, software and human resources necessary to enable the wide spread utilization of an ISDN basic network interface. However, user acceptance of this service has been very minimal. There is now a widely accepted belief that the primary barrier to widespread user acceptance of the ISDN basic rate interface is the high cost of ISDN equipment to the ISDN customer. This cost is compounded by the incompatibility of the ISDN S/T reference interface with existing POTS customer premises equipment which prevents telephone users from utilizing their existing POTS customer premises equipment with an ISDN basic rate interface.

Current Art

There now exists a large variety of telephone customer premises equipment designed to interface directly to the BRI ISDN at the S/T or U interface reference points. This ISDN customer premises equipment includes telephones, adapters for personal computers and various self-contained data interface units. Some of this customer premises equipment supports both data and voice operations, and others include support for analog POTS customer premises equipment. However, this existing customer premises equipment does not provide a sufficient degree of access integration for existing POTS and data customer premises equipment to ISDN basic rate interface, and they do not include adequate access functions required for such integration.

SUMMARY OF THE INVENTION

The present invention provides a means to interface all existing POTS customer premises equipment and the most common forms of existing digital interface (RS-232 serial interface) devices to an ISDN basic rate interface. The described invention permits access to ISDN voice and data services without requiring existing POTS customer premises equipment or existing data devices to either interface to an ISDN S/T reference interface point or support ISDN signaling protocols. The present invention also incorporates all of the CCITT reference model NT-1 and power supply functions in a manner which minimizes the cost and complexity of providing these functions. An important element of the present invention is the means which were devised to minimize the cost of providing all of these functions, therefore minimizing the cost of providing effective ISDN basic rate interface services to the telephony user and removing the perceived cost and compatibility barriers which are currently an impediment to widespread adoption of ISDN basic rate interface implementation.

According to one aspect of the present invention, an Integrated Services Digital Network private exchange device is provided which includes connectors for connection to the ISDN local exchange, a plurality of ports for connection to respective analog telephone devices, a plurality of ports for connection to respective digital devices, and an ISDN digital port for connection to at least one additional ISDN terminal device. For example, the device may include a pair of ports for connection to two different analog telephone devices each having simultaneous access capability with the ISDN network. Further, the device may include four ports for connection of up to four digital devices which are each capable of simultaneously accessing the ISDN local exchange. Still further, the ISDN digital port can be connected with, for example, up to eight ISDN terminals or terminal adaptors.

According to another aspect of the invention, the private exchange device provided includes a detector for detecting whether the port connected to the local exchange is connected to an ISDN network or to a conventional network. If the system detects that it is connected to a conventional analog network, an ISDN control circuit used for communicating with the ISDN network is bypassed, and one of the analog telephone ports is connected directly to the analog exchange.

According to another aspect of the invention, the ISDN private exchange apparatus detects the ISDN switch utilized by the local exchange and is further adapted to thereby automatically communicate with the local exchange according to the particular switch used at the local exchange.

According to another aspect of the invention, a private exchange for the Integrated Services Digital Network is provided which includes a network PCM bus connected to the local exchange at the U interface, and a local PCM bus selectively connected to the network PCM bus through a local terminal. The local PCM bus is connected to a plurality of ports.

According to still another aspect of the invention, the private exchange apparatus includes a controller which synthesizes additional B channels on the local PCM bus, to create a second terminal within the private exchange. The synthesizer creates B3 and B4 channels which are available for internal use, and the B1 and B2 signals associated with the local exchange may thus be reserved for external calls.

According to a further aspect of the invention, the private exchange apparatus provided includes a voice mail processing unit accessible from any of the devices connected to the private exchange. The voice mail processing unit may be connected to an internal PCM bus to provide ready access to both analog lines when the B1 and B2 channels are not available. The voice mail processor is also available to external callers. The voice mail processor may include a microprocessor which communicates with a core microprocessor and selectively implements direct access to the core microprocessor's memory.

According to a still further aspect of the invention, the private exchange apparatus provided includes a DTMF detector which is coupled to the local PCM bus to receive signals from remote calling devices. This DTMF detector converts the signals from the remote devices into control signals which may be used by the private exchange. This DTMF detector preferably operates independently of respective DTMF detectors associated with each of the analog ports of the private exchange.

According to another aspect of the invention, the private exchange includes a microprocessor which controls billing information output to the local exchange. The microprocessor stores billing criteria and outputs billing information according to such criteria when telephone calls are originated through the private exchange. In a more detailed aspect of the invention, the billing criteria may be set up according to the originating device and the time of day, such that calls made from one line during the day are billed on one account and calls made at another time of day are billed on a different account.

According to another aspect of the invention, the private exchange which is provided includes operating instructions which are stored in a memory such that they may be updated. For example, such operating instructions include the CCITT standard protocols used by the private exchange and billing rates for different long distance carriers and call routings. The stored information is accessible externally of the exchange such that the stored signals may be updated from a remote location whenever the information changes.

According to still another aspect of the invention, a private exchange for an Integrated Services Digital Network is provided which may be accessed and configured from any of the analog or digital ports. Analog telephone devices may receive prompting signals from the private exchange controller. Digital devices may receive menu information for display to the user.

According to yet another aspect of the invention, the system includes error-detection capability. The private exchange controller includes a memory device for logging selected errors such that they may be recalled later. This logging capability facilitates identification and correction of faults in the private exchange.

According to another aspect of the invention, the system includes a memory which stores call progress tones, DTMF tones, and caller ID signals. These signals are communicated to the connected analog devices from the private exchange microcontroller. The signals are output onto the PCM signalling bus in a suitable PCM format such that when converted by the CODEC into analog signals, they produce calling tones which duplicate POTS signals.

The present invention provides a versatile, low cost, basic rate ISDN local exchange interface device which can be readily installed by a non-technical user in a residential or small business environment and provides extensive hardware functionality in a fully integrated package.

The private exchange according to the invention connects to the bare copper pair access point at the customer end of the subscriber loop, and performs the network interface functions required under CCITT standards. The private exchange provides a great deal of versatility in connecting devices to an ISDN local exchange, facilitating the connection of up to two analog devices, four digital devices, and an additional eight ISDN devices. The digital devices that may be connected to the four digital ports include computers, credit card readers, security or alarm sensors, and other data devices. The system includes a highly capable microprocessor system with a large program storage capability and advanced serial data handling capability. Additionally, the private exchange includes a low cost, highly functional voice mail system.

These and other advantages, features and aspects of the present invention will be better understood upon reading the ensuing more detailed description of the invention with reference to the attached drawings in which:

BRIEF DESCRIPTION OF THE DRAWINGS

FIGS. 25–43 illustrate the command mode key sequences and options.

DETAILED DESCRIPTION OF THE PREFERRED EMBODIMENTS

Figure 1:
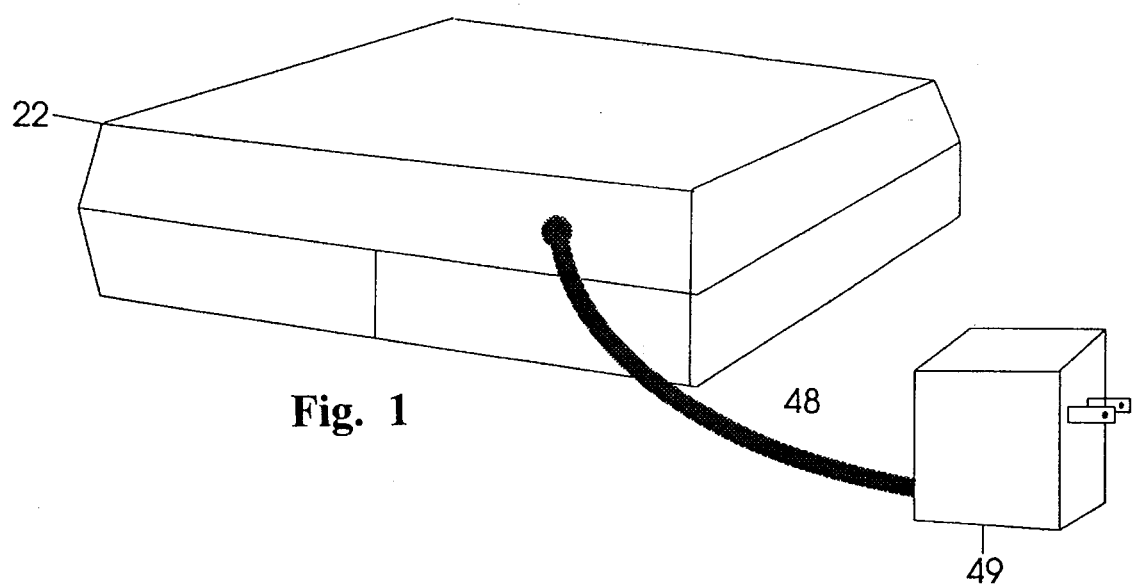
FIG. 1 is a top perspective view of a private exchange according to the present invention.
Figure 2:
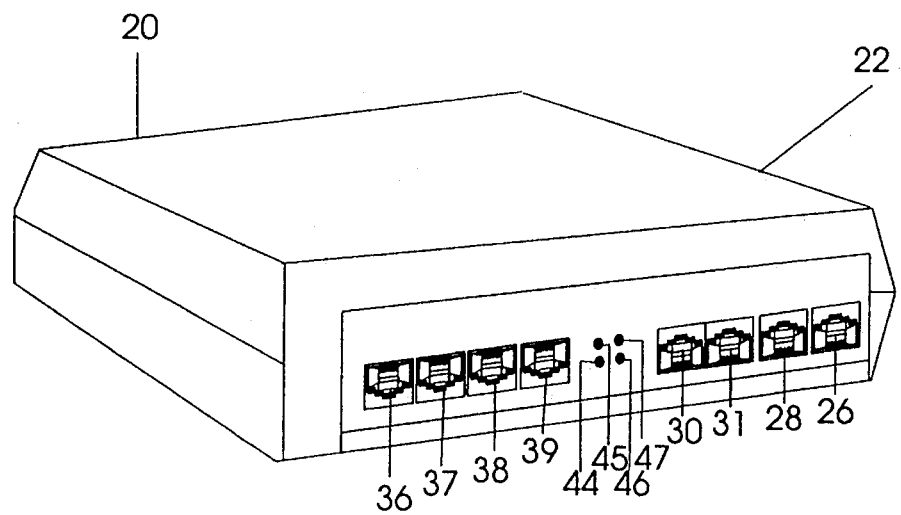
FIG. 2 is an opposite perspective view of the private exchange according to FIG. 1.
Figure 3A:
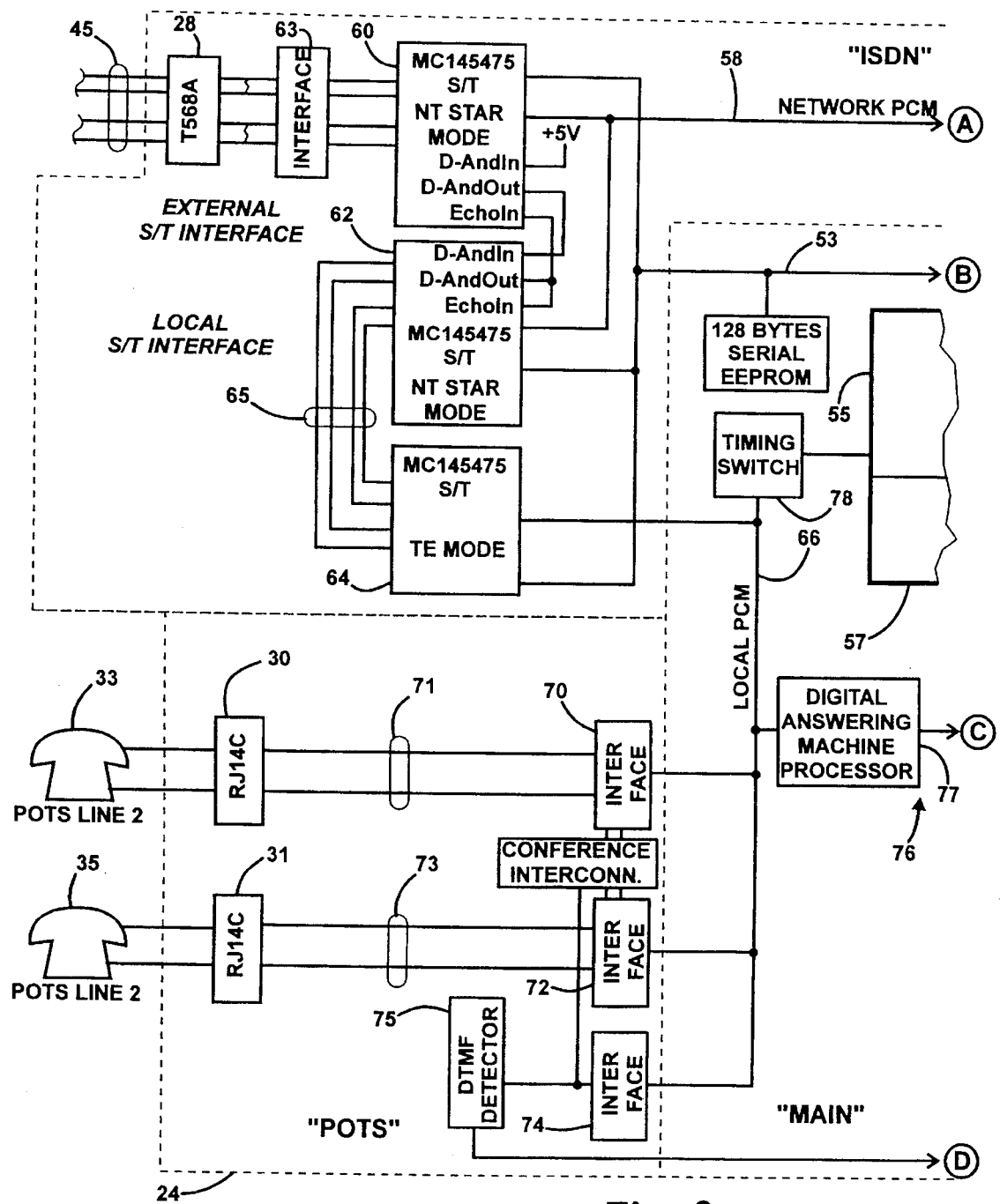
FIG. 3 is a circuit schematic in block diagram form showing the private exchange for an Integrated Services Digital Network.
Figure 3B:
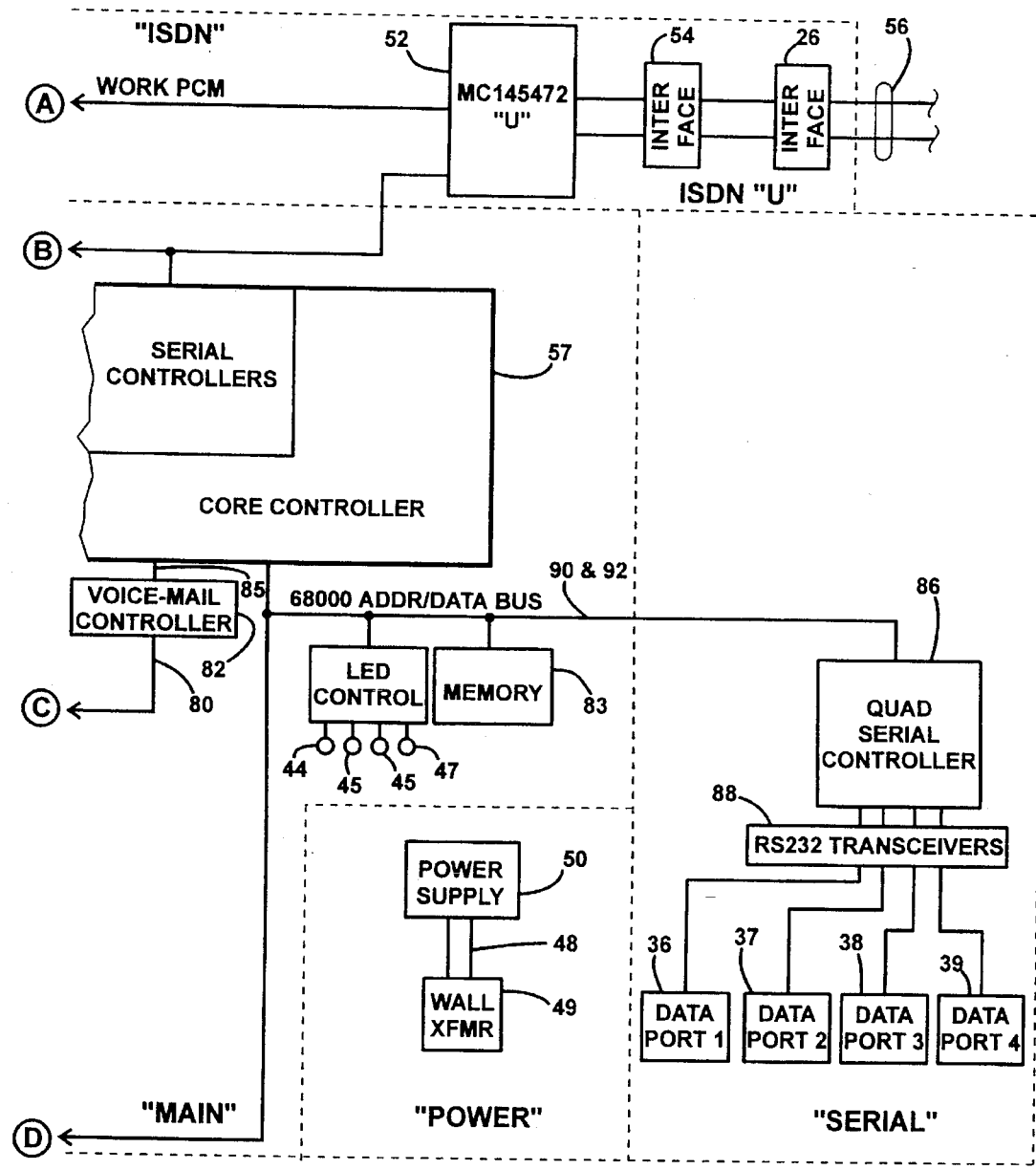

An ISDN private exchange 20 according to the invention is illustrated in FIGS. 1 and 2. The private exchange includes a generally rectangular housing 22 which encloses the private exchange circuit 24 (FIG. 3). The private exchange includes port 26 for connection to an ISDN local exchange LE (FIG. 4) at the "U" boundary. Although the preferred embodiment is illustrated with reference to an integrated services digital network, those skilled in the art will recognize that the invention may be advantageously utilized for communication with any intelligent connection to a digital line exchange which uses a digital carrier. For example, the private exchange may be connected to a digital cable service, a digital cellular phone service, or the like. The digital network also includes a port 28 for connection to ISDN terminal equipment (TE1) or ISDN terminal adapters (TA) at the "S" or "T" boundaries. The private exchange 20 also includes analog ports 30 and 31 for connection to analog subscriber devices 33, 35, such as POTS analog telephones, modems, or any other device which connects to a POTS central exchange. Four ports, 36–39, are provided on housing 22 for connection to the digital ports of terminal equipment 40–43 such as computers, credit card readers, and alarm devices. The exchange also includes four light sources 44–47 (FIG. 1) providing visual status indications, such as power-on and battery status, as described in greater detail hereinbelow. A cable 48 (FIG. 2), connected to circuit 24 and extending from housing 22, is terminated by an AC wall transformer 49. The wall transformer 49 connects to a conventional AC wall outlet and outputs AC power for the private exchange power supply 50. Power supply 50 is described in International Application No. WO95/21485, entitled POWER SUPPLY FOR PRIVATE BRANCH EXCHANGE, Published Aug. 10, 1995, the disclosure of which is incorporated herein by reference.

Somewhat more particularly, private exchange circuit 24 (FIG. 3) includes a U-port module 52 connected to the U-port 26 through a U-port interface 54. U-port interface circuit 54 includes circuit components used to interface between a two-wire pair 56 connected to the local exchange LE (FIG. 4) and the "U" port module 52. The interface includes transformers, protection switches, and sealing current circuits. U-port module 52 is coupled to a serial controller 55 through a serial bus 53. The U-port module is responsive to control signals on the serial bus for performing the maintenance functions required of a network terminator (NTI) operating according to CCITT standards.

Figure 4:
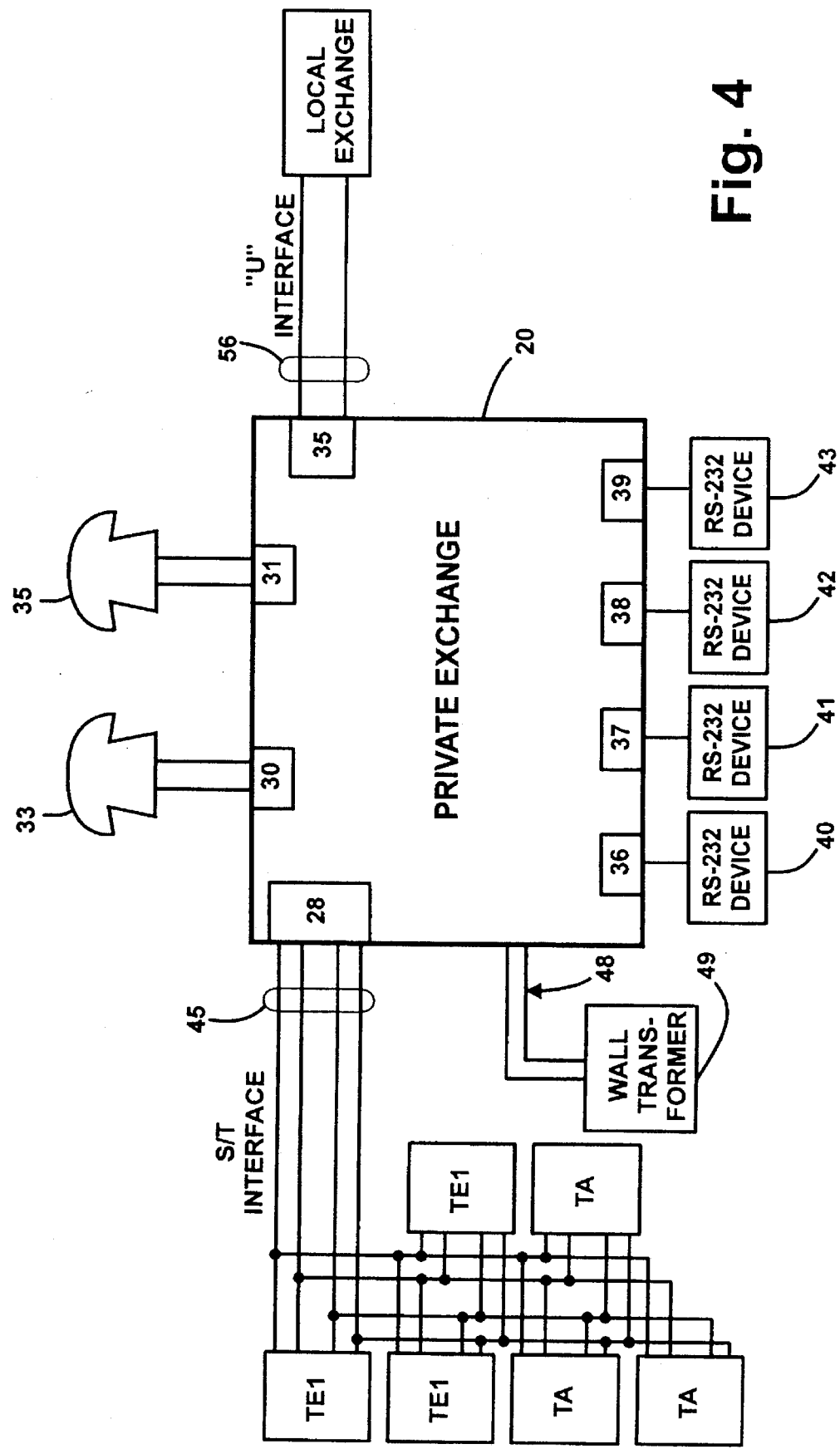
FIG. 4 is a schematic representation of the private exchange according to the invention connected between the S/T and U interfaces.
Figure 5A:
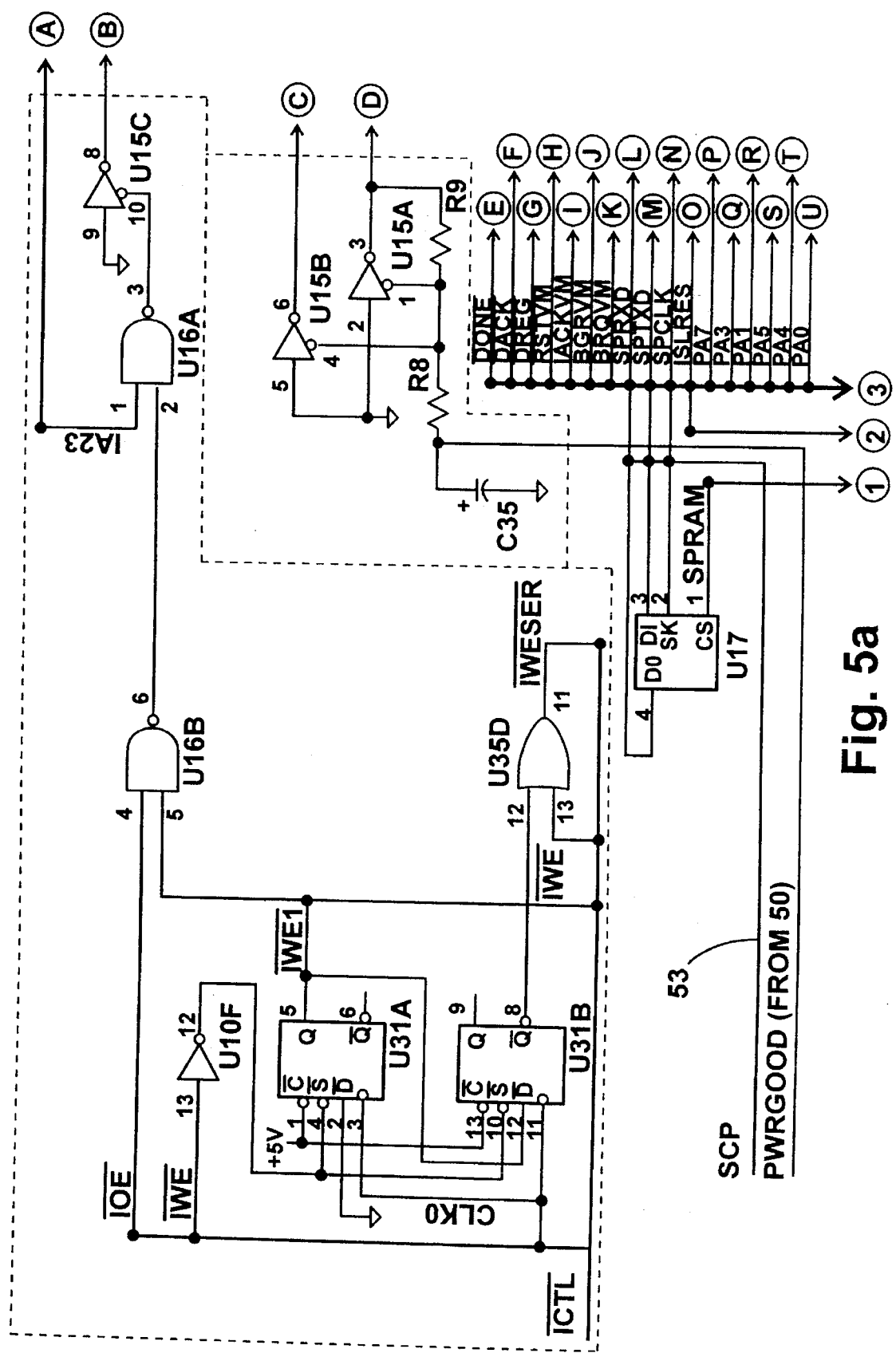
FIGS. 5–13 are circuit schematics showing the private exchange controller according to the invention.
Figure 5B:
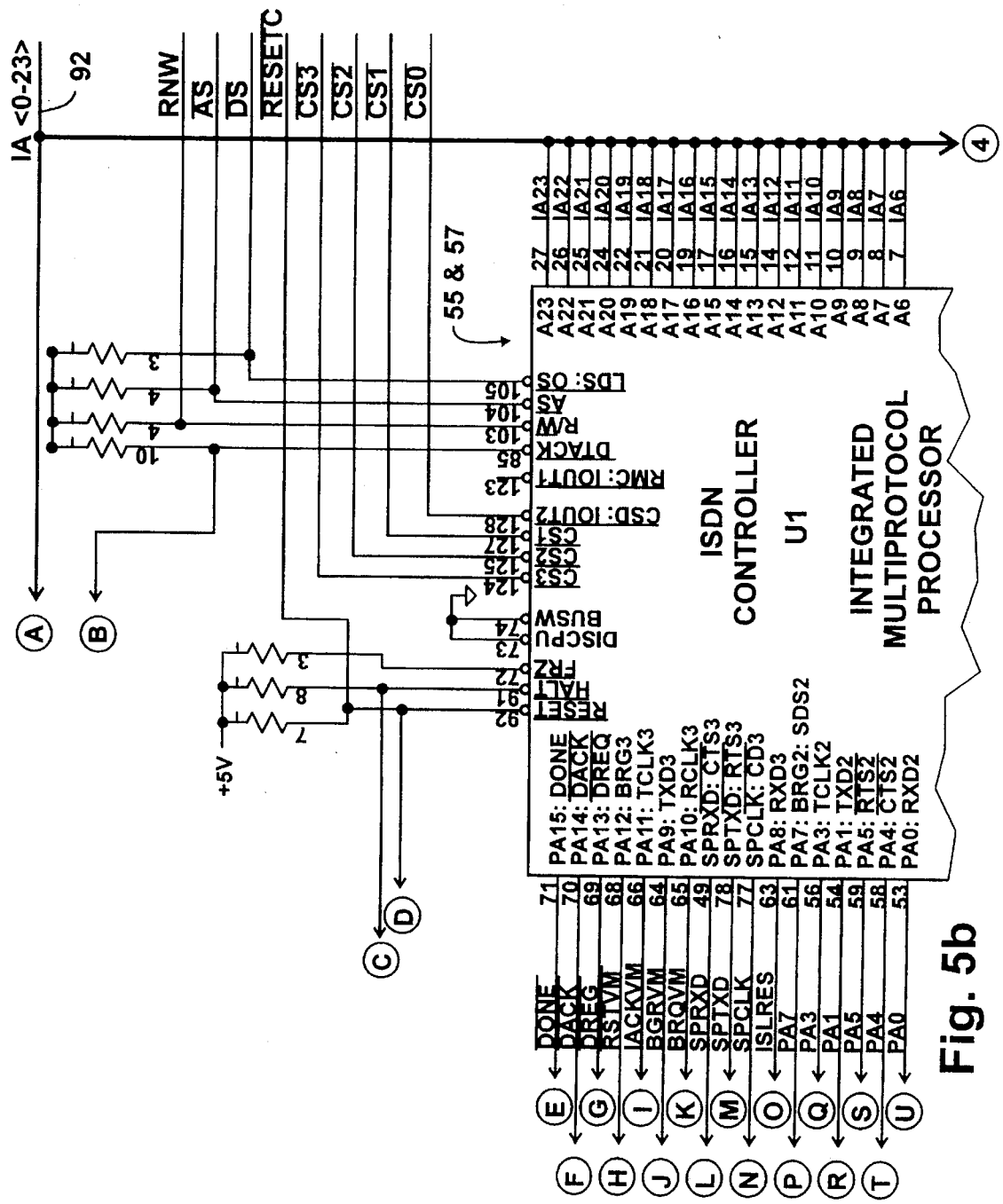
Figure 5C:
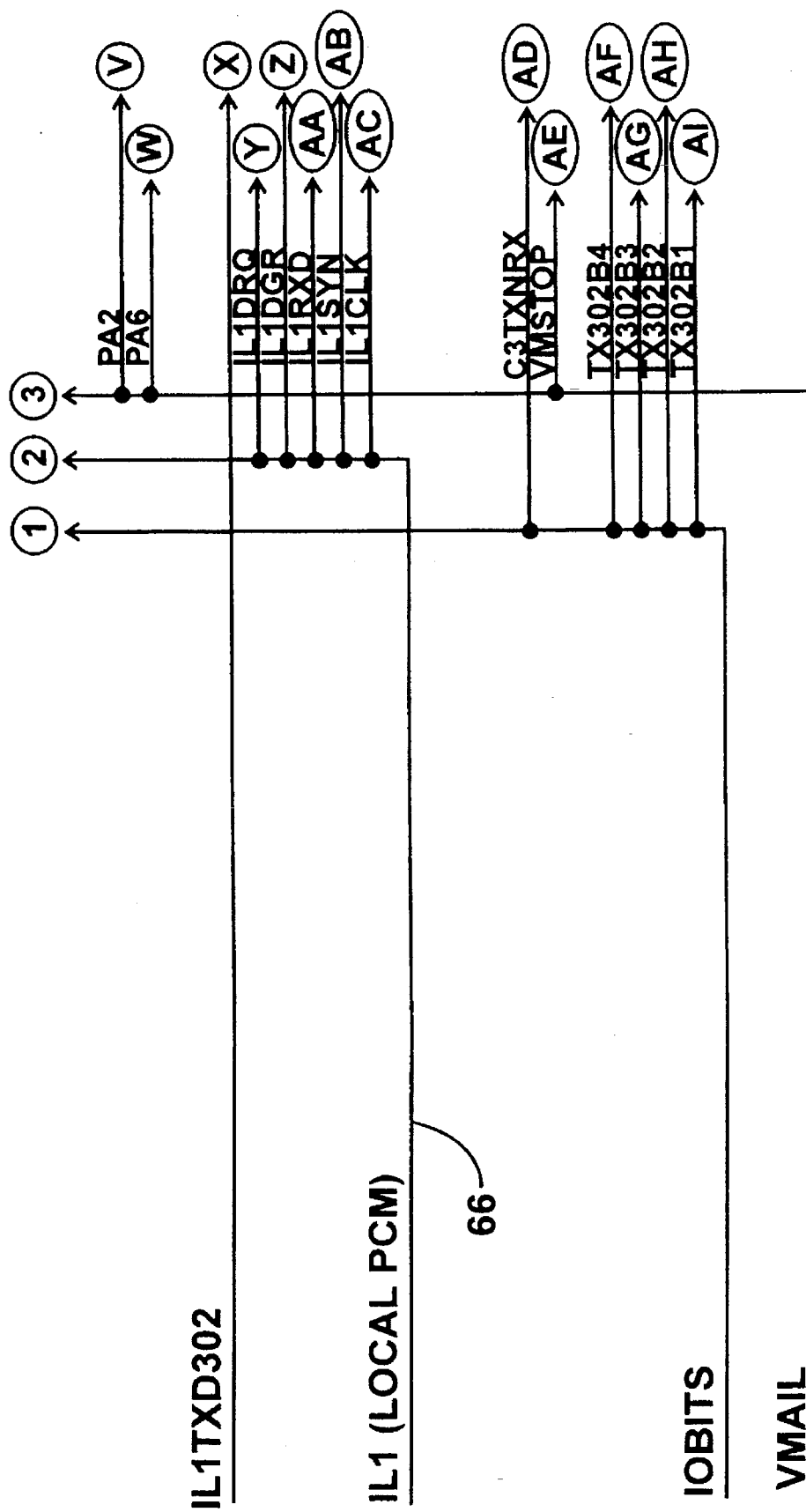
Figure 5D:
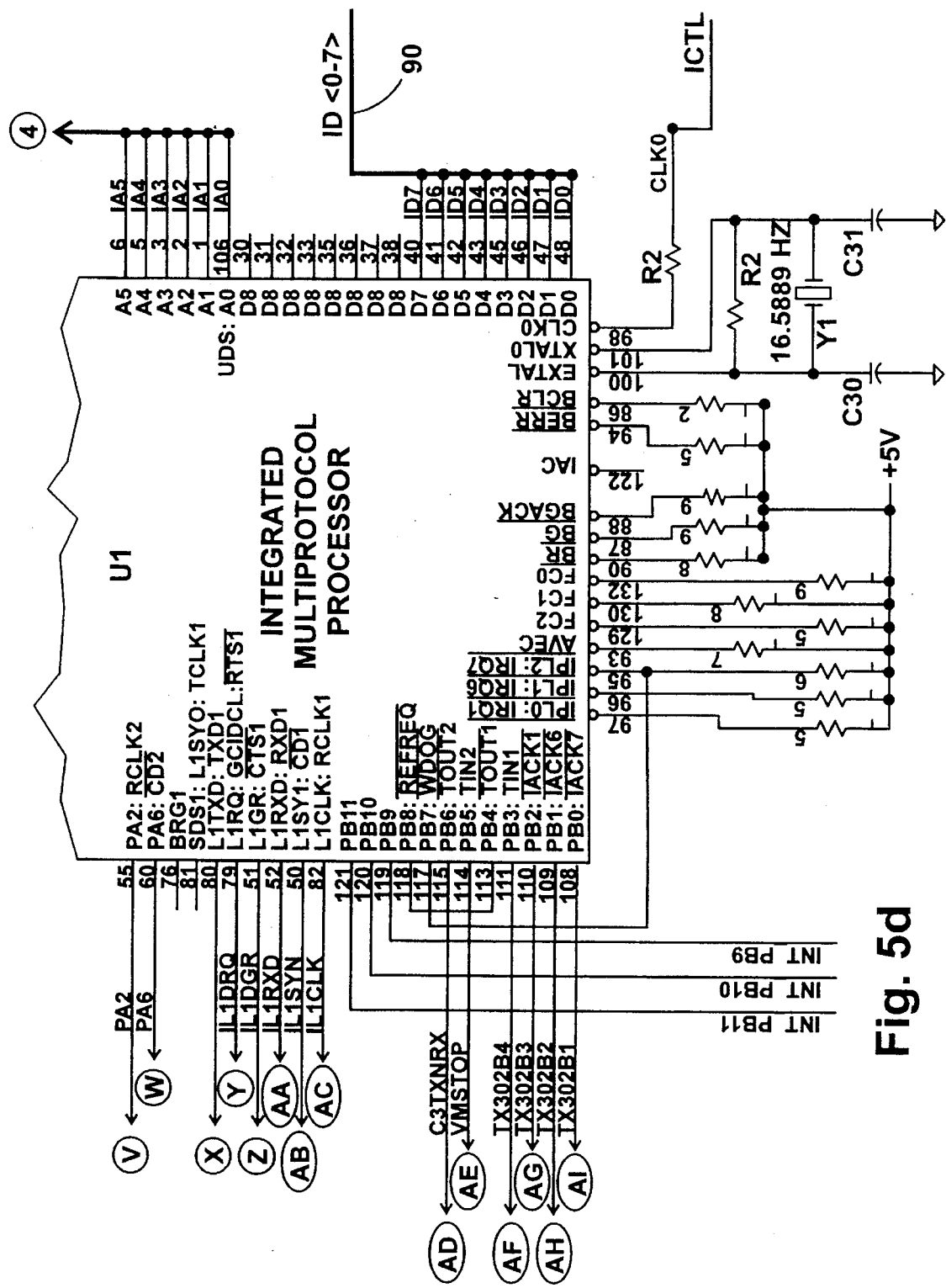

With continued reference to FIG. 3, the U-port module 52 is also connected to a network PCM bus 58. Network PCM bus 58 is connected to an S/T port module 60 and a local S/T module 62. The S/T port module 60 is connected to the four-wire S/T port 28 through an interface circuit 63. The S/T interface circuit includes circuit components necessary for the S/T port module to connect the four-wire line to which ISDN terminal equipment TE1 (FIG. 4) and terminal adaptors TA may be connected. Under CCITT standards, the ISDN PCM bus 28 will service up to eight ISDN terminal equipment TE1 or terminal adaptors TA. Accordingly, up to eight additional ISDN terminal adaptors TA or terminal equipment TE1 may be connected to port 28, as shown in FIG. 4. These terminal units may include any combination of ISDN type-1 terminal equipment TE1 and terminal equipment adaptor TA. The terminal equipment communicates through the S/T port module 60, PCM bus 58 and U-port module 52 according to CCITT standard protocols.

The four-wire side of local S/T module 62 is connected through a four-wire line 65 to a local TE interface module 64. The local TE module 64 two-wire side is connected to a novel local PCM bus 66. The TE module 64 competes with terminal equipment TE1 and terminal adaptors TA connected to S/T port 28 to gain access to the network controller LE through network IDS 58 and U-port module 52. The terminal equipment and terminal adaptors are granted access to the local exchange according to an arbitration routine set by CCITT standards.

The local PCM bus 66 (FIG. 3) is coupled to local TE module 64, an analog interface 70 for a first analog line 71 coupled to port 30, an analog interface 72 for a second analog line 73 connected to port 31, a third analog interface 74 connected to DTMF detector 75, a voice mail system 76, and a time slot switch 78. The analog interfaces 70 and 72 include a CODEC for converting between PCM and analog signals, signalling interfaces and other circuitry, as described in greater detail hereinbelow and in International Application NO. WO95/21498, entitled PRIVATE EXCHANGE POTS LINE INTERFACE Published Aug. 10, 1995, the disclosure of which is incorporated herein by reference thereto. Ports 30 and 31 connected to analog interfaces 72 and 74 are implemented with standard RJ-14C female connectors which receive a conventional analog RJ-11 male telephone connector for single-line operation, or an RJ-14C connector for access to both analog interfaces. Analog devices which may be connected to ports 30 and 31 include modems, analog telephones, or any other conventional analog subscriber station.

The timing switch 78 is connected between serial controller 55 and the local PCM bus 66. The network PCM bus 58 and the local PCM bus 66 are time division multiplex buses. The network PCM bus signalling is in the B1 and B2 channel time slots as allocated by the local exchange according to CCITT standards. The local PCM bus 66 includes the same B1 and B2 channels as the network PCM bus 58. The local PCM bus 66 also has two additional B channel time slots in the unallocated time period following the 20 bits (8 bits B1, 1 bit D, 1 bit M, 8 bits B2, 1 bit D, 1 bit M, see FIG. 24, which are allocated on the network PCM bus. These two additional time slots are implemented using the time slot switch 78 and the are referred to herein as the B3 channel and the B4 channel. The B3 and B4 channels are dedicated to communication on the local PCM bus 66. The B1 and B2 channels on the local PCM bus are assigned by the local exchange LE and they are used for network communication. These channels are thus in the same time slots as the B1 and B2 channels on the network PCM bus. Time slot switch 78 creates the B3 and B4 time slots and places the microprocessor U1 B1 and B2 data into these time slots by shifting data output from the serial controller 55 in the B1 and B2 time slots into the B3 and B4 time slots. Data in the B3 and B4 channels is directed between the analog interfaces 70, 72 and the voice mail system 76.

The voice mail system 76 includes an answering machine processor 77, a serial bus 80, a voice mail microcontroller 82, and a parallel bus 85. The voice mail system also uses the core microprocessor U1 and memory 83. The system utilizes a low cost answering machine processor 77 which is logically incompatible with the core microprocessor. The answering machine processor 77 serves the following four functions: it converts PCM signals on the local PCM bus 66 to compressed PCM signals on bus 80; it converts the compressed PCM signals on bus 80 to uncompressed PCM signals on local PCM bus 66; it detects PCM DTMF signals on the local PCM bus, and provides amplitude control. The signals input to, and output from, the answering machine processor are in a serial format. The voice mail microcontroller 82 provides serial/parallel conversion between the core microcontroller 57 which inputs and outputs signals in parallel, and the answering machine processor 77, which receives and transmits serial data. The voice mail microcontroller also generates queuing signals which effect incrementing of the core microcontroller 57 address outputs. This queued information is used by the core microcontroller 57 when storage and retrieval of voice mail information is delegated to the voice mail microcontroller 82 to permit direct memory access from voice mail microcontroller 82 to memory 83, as described in greater detail hereinbelow. This delegation allows the core microcontroller to perform other operations while the voice mail information is being input to, or read from, memory 83.

Core controller 57 is connected through a quad serial controller 86 and RS232 transceivers 88 to the four data ports 36–39. These data ports receive connectors associated with digital devices such as computers, credit card readers, and alarm devices. The digital ports are provided by RJ-45 connectors coupled to RS-232 transceivers. Alternatively, RS-232 connectors may be used to implement the data ports.

The core controller 57 provides a respective interface between each of the data ports 36–39 and the ISDN network. Each of these interfaces is referred to herein as a software implemented packet assembler/disassembler, or "PAD." Each PAD has two "sides." The ISDN side of the PAD has CCITT standard signaling and control for a digital ISDN port. The device "side" of the PAD is selected by the user in a configuration process. The PAD device side is selected to be compatible with the device connected to the port 36–39 associated with the PAD. For example, if a device coupled to one of the ports 36–39 has a communication protocol for a modem, the PAD provides signals to the data port 36–39 which simulate the data I/O signals from a modem. The PAD provides signal conversion between the device side protocol and the ISDN side protocol. As a result, the external device receives and outputs signals for a modem, and the ISDN network receives and inputs signals according to the CCITT protocol.

The memory devices in memory 83 include a non-volatile dynamic memory wherein the CCITT operating protocol for the microprocessor and the U-port module 52 are stored. This memory can also store rate information for the call providers. This memory is selectively accessible to the core microcontroller 57 responsive to receipt of a predetermined control signal from the ISDN network. If the control signal includes data to replace the stored protocol or rates, the core microcontroller 57 replaces the stored protocol or rates with the received protocol or rates. Consequently, updates can be communicated to private exchange 20 through the ISDN network. This provides a very convenient, low cost method of updating the private exchange when the CCITT standards and carrier rates change.

Figure 6B:
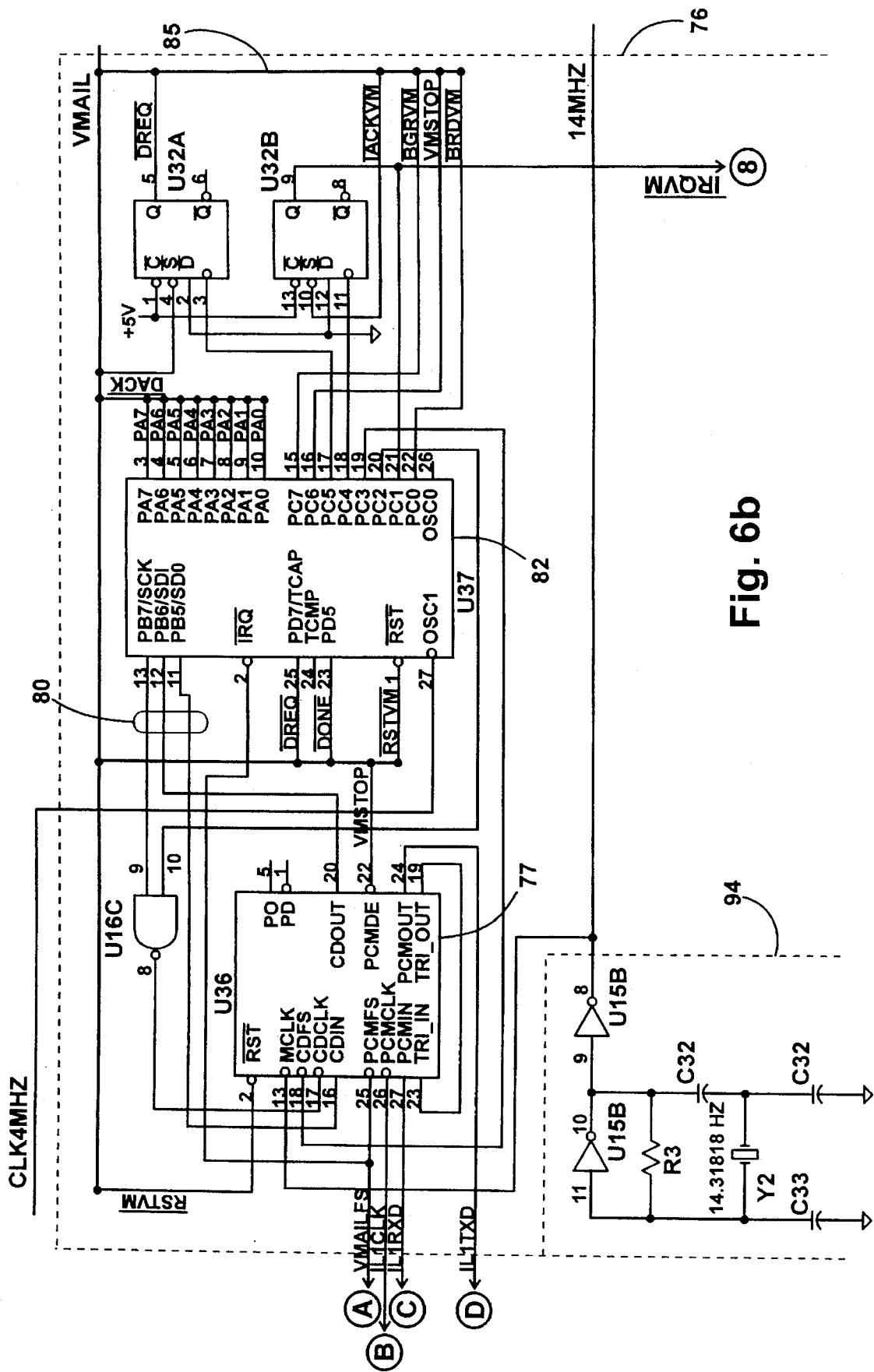
Figure 6C:
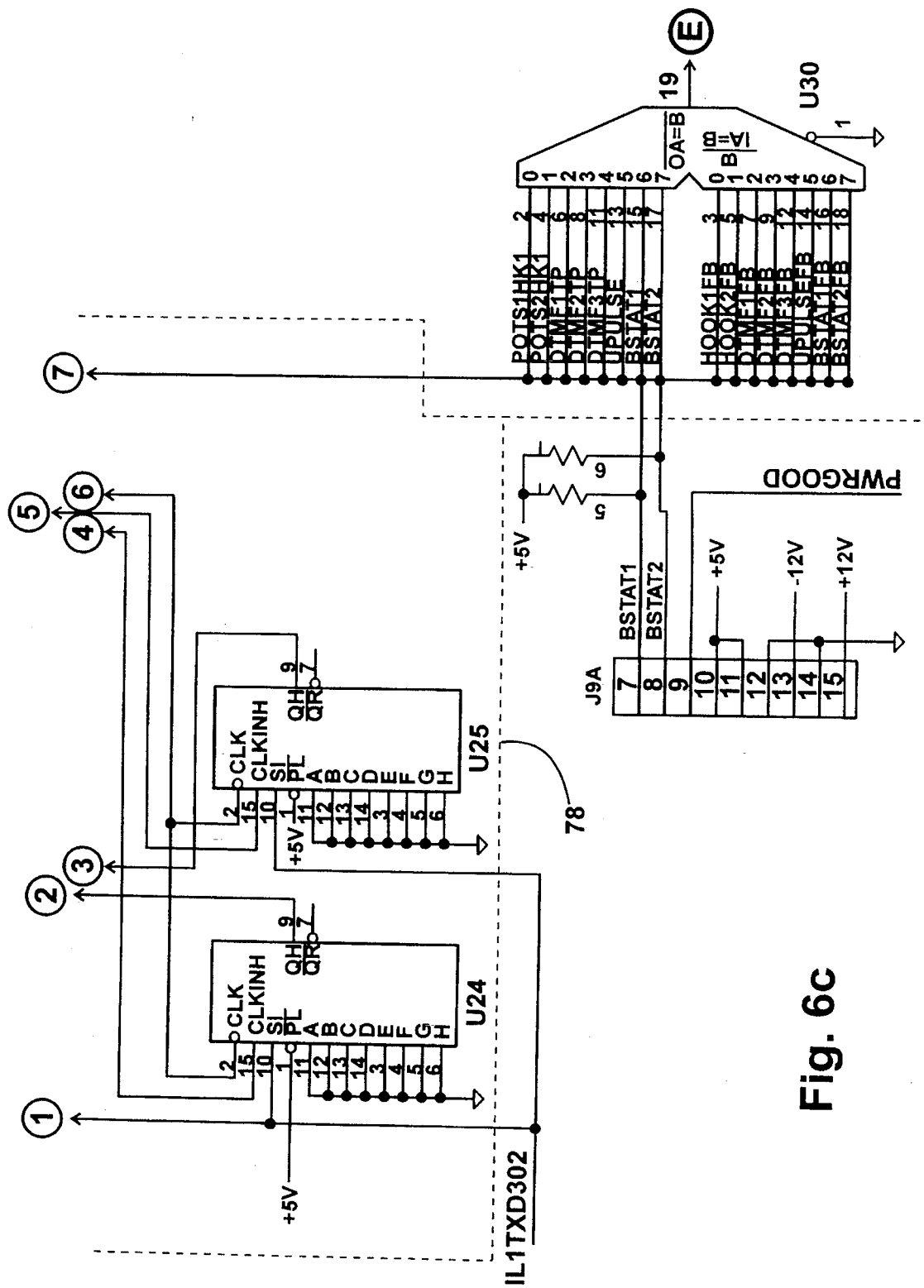
Figure 7A:
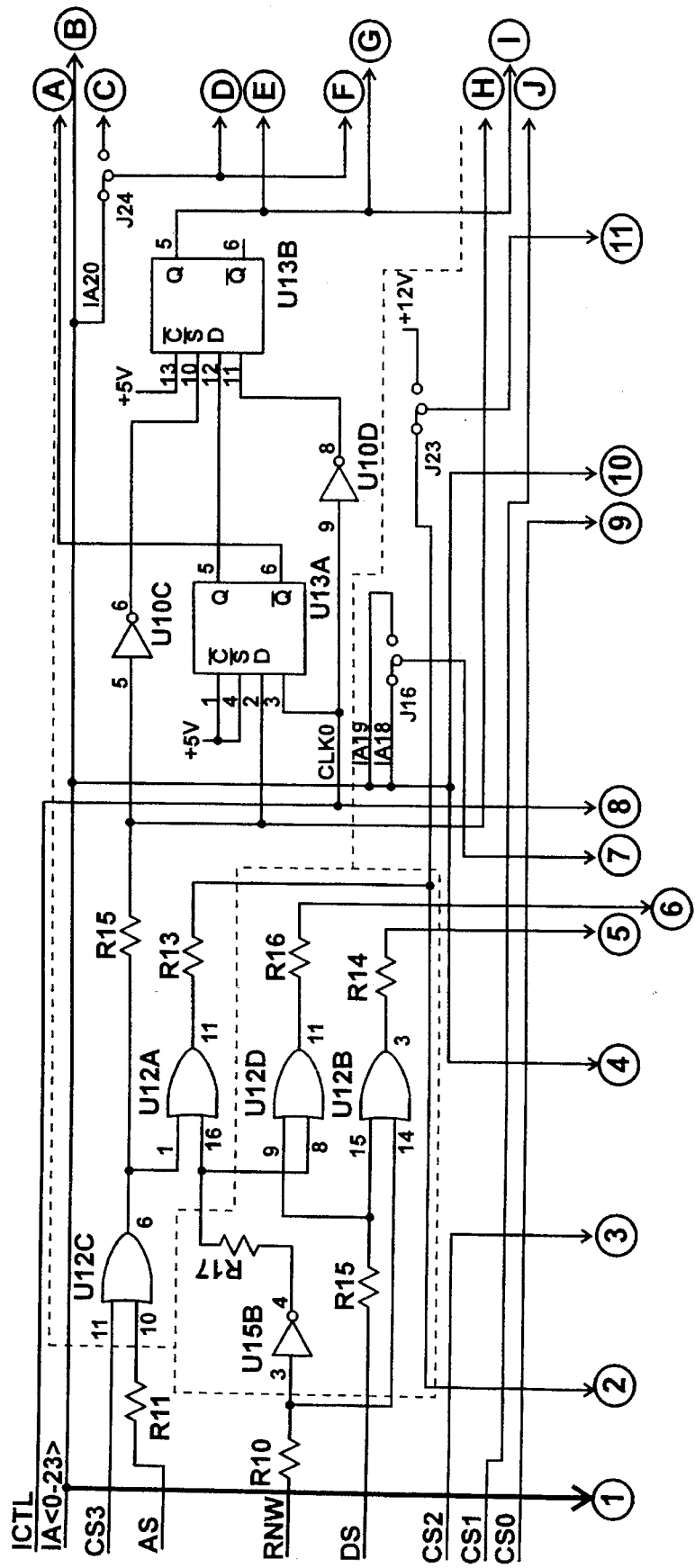
Figure 7B:
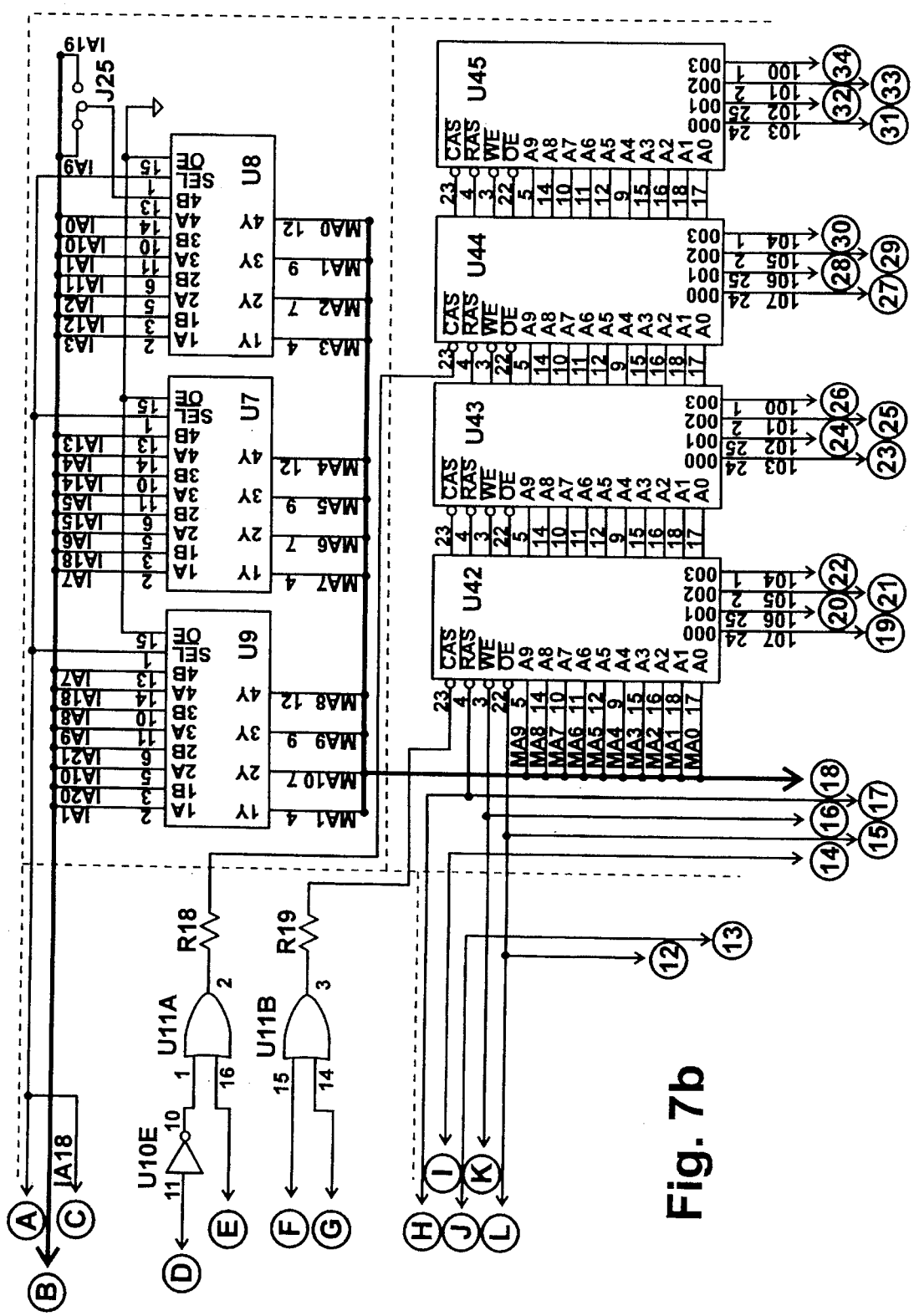
Figure 7C:
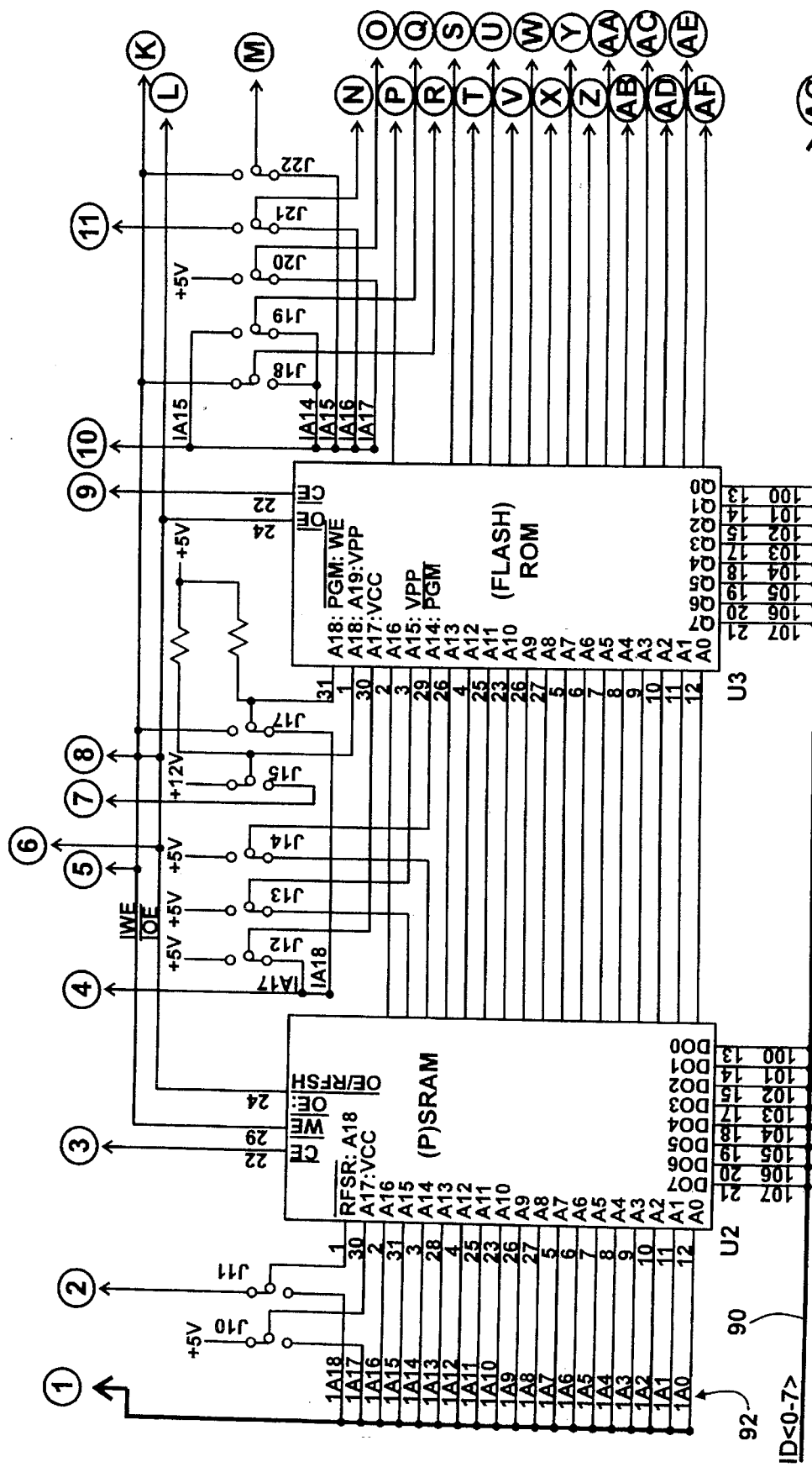
Figure 7D:
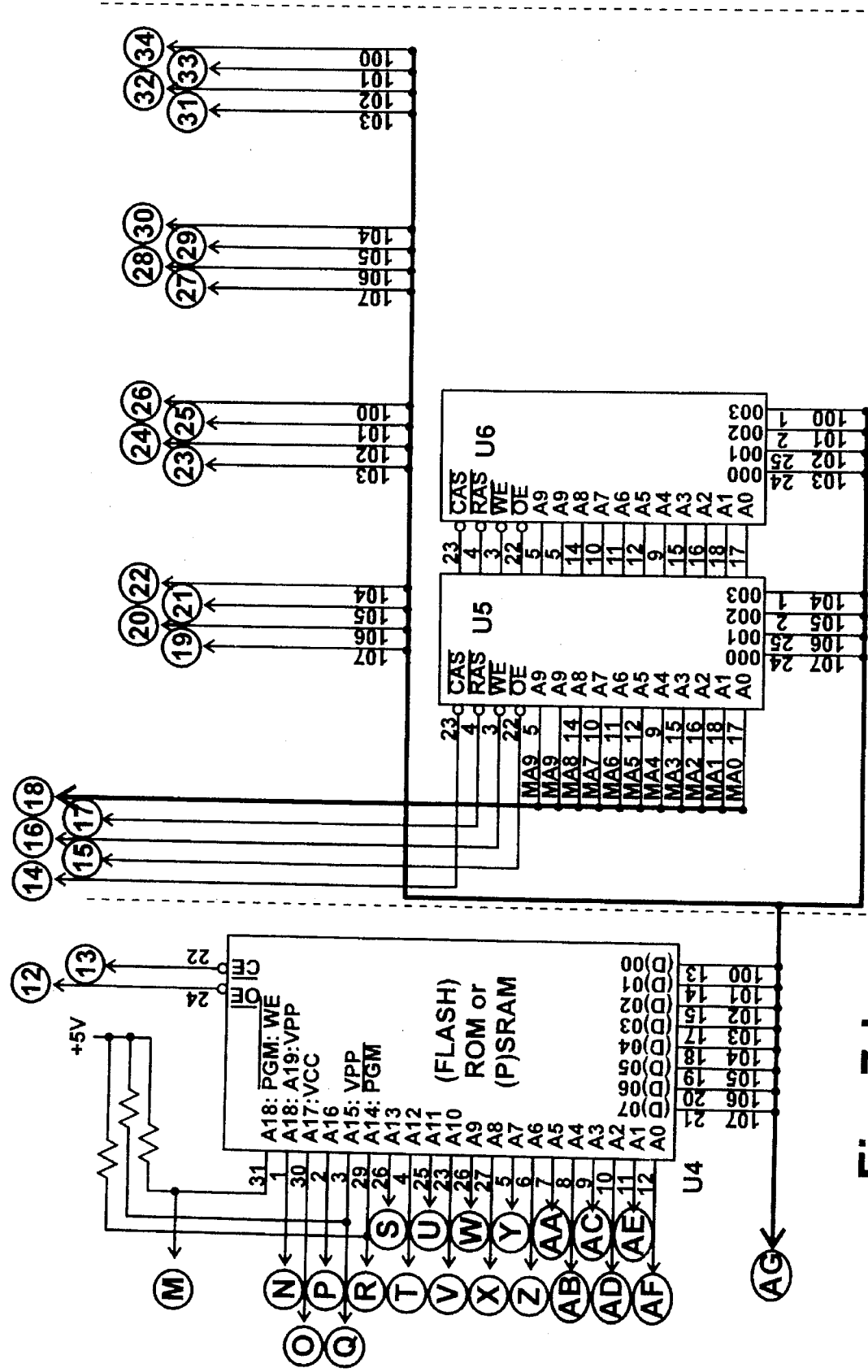

More particularly, in the illustrated embodiment of the invention, the core microcontroller 57 and the serial controller 55 are provided by an MC68302 FC-16 integrated multi-protocol microprocessor U1 (FIG. 5), although the microcontroller and serial controller may be implemented using any suitable commercially available microprocessor and compatible serial controller. In the illustrated embodiment, the right side of the microprocessor includes data pins 30–38, 40–48 (D0–D15) although the microprocessor U1 is strapped into an 8-bit mode of operation (data pins D0–D7), such that less memory is necessary for system operation. The data pins D0–D7 are connected to an 8 bit data bus 90. Microprocessor U1 also includes a 24 address pins 106, 1–27 (pins A0–A23) connected to address bus 92, memory 83 (FIG. 3) and quad controller 86, to control access to these devices. On the left side of the microprocessor, beginning at the bottom, port B includes pin 106 (PB0), which is connected to circuit U22 (FIG. 6) in time slot switch 78. This is a timing signal which indicates the signal output from the microprocessor U1 for slot B1 is in the B1 time slot. Pin 109 (PB1) is similarly connected to circuit U22. The signal on PB1 is a timing signal which indicates that output from the microprocessor U1 for time slot B2 is in the B2 time slot. Pins 110 (PB2) and 111 (PB3) of microprocessor U1 are also connected to integrated circuit U22. Pin 110 (PB2) has a timing signal thereon indicating that B1 signals output from the microprocessor serial controller 55 are for the B3 time slot. Pin 111 (PB3) has a timing signal indicating that the B2 signal output from microprocessor serial controller 55 in the B2 time slot is for the B4 time slot on the local PCM bus 66. Pins PB0–PB3 are connected to timing control circuit 78 (FIG. 6). Pins 113 (PB4; FIG. 5) and 118 (PB8) are directly interconnected for a refresh generator in the microprocessor U1. Pin 114 (PB5) is connected to pin 22 (FIG. 6) of the voice mail integrated circuit 77 and pin 16 of the voice mail microprocessor 82 to stop voice mail operations. The output signal on pin PB5 stops voice mail operation by disabling the voice mail microprocessor 82 (FIG. 6) and the answering machine integrated circuit 77. Pin 117 (PB7 FIG. 5) is a watchdog timer input which is connected to pin 95 of microprocessor U1. Pins 119–121 (PB9–PB11) are hardware interrupt inputs to the microcontroller U1, responsive to which the microcontroller is interrupted to determine an input operation.

Pin 82 (FIG. 5) of the microprocessor U1 has a clock signal which is input from interface circuit (FIG. 9), and is also supplied to integrated circuits U20–U22. This clock signal is at a frequency of 2048 KHz to control these integrated circuits to operate at the rate of data on the local and network PCM buss. Pin 50 of microprocessor U1 has an IL1SYNC signal thereon. This is a timing signal which indicates the beginning of a B1, B2 and D timing sequence, and thus immediately precedes a B1 channel signal. This sync signal is generated from the ISDN signalling network and is derived herein from the local exchange LE according to CCITT standards. Pin 52 is the L1RXD input to the microprocessor. This is the input to the microprocessor U1 (FIG. 5) from the local PCM bus 66 which, in this novel private exchange, is connected to the local TE module 64, analog interfaces 70, 72, 74 and voice mail circuit 76. The processor receives B1 to B4 channel signals from these devices. Pins 51 and 79 of the microprocessor U1 are connected to pins 5 (FIG. 9) and 9 of the local TE module 64. These pins have request signals (IL1DRQ) to the local TE module and grant signals (IL1DGR) to the microprocessor U1 thereon, which signals are used to control communication between the local TE module and the microprocessor U1.

The time slot switch 78 will now be described with reference to FIGS. 5 and 6. Pin 80 (FIG. 5) is a data communication output pin of the serial controller in microprocessor U1 and it is connected to the serial input pins 7 of shift registers U24 and U25. The serial outputs 9 of shift registers U24 and U25 are connected to pins 11 and 14 of integrated circuit U22, respectively. Each of the shift registers provides a 20 bit shift such that the output on pin 9 of shift register U24 is data from the B1 time slot and the output of shift register U25 is from the B2 time slot. Pin 80 of microprocessor U1 is connected directly to pin 10 of integrated circuit U22 (FIG. 6). Integrated circuit U22 selects one of the signals at pin 10, pin 11 or pin 14 to be the IL1TXD signal on the local PCM bus. The IL1TXD signal is the transmit (TXD) data signal on the local PCM bus. If pin 10 is selected as the IL1TXD signal on the local PCM bus 66, the transmit signal output from microprocessor U1 at pin 80 is output directly onto the local PCM bus, without a time slot shift. The output signal on pin 80 will be selected as the TXD signal on the local PCM bus 66 when the signal from microprocessor U1 is communicating in the B1 or B2 time slot assigned by the local exchange LE. The selection is made by the output signal PB0 or PB1, which are the B1 in B1 time slot signal and the B2 in B2 time slot signals. The shifted signal on pin 11 is selected by integrated circuit U22 when the signal output on pin 80 of microprocessor U1 is in the B1 time slot and should be shifted to the B3 time slot. If the signal on pin 14 is selected, the signal on pin 80 is in the B2 time slot and should be shifted to the B4 time slot. Pin 10 and pin 11 are selected by PLA U22 when the signal output on pins PB2 and PB3 of the microprocessor U1 indicate that the B1 signal is for the B3 time slot and the signal B2 signal is for the B4 time slot, respectively.

Pins 53–56 (FIG. 5) and 58–61 (PA0–PA7) of microprocessor U1 are connected to pins 3–10 of voice mail microprocessor 82 (FIG. 6) through parallel bus 85. The compressed PCM signals for the voice mail system 76 are input and output in parallel on pins 3–10 (PA0–PA7) of microprocessor 82. This data is input and output on pins D0–D7 of microprocessor U1 for storage in DRAM integrated circuits U42–U45 or U5 and U6 of memory 83, as described in greater detail hereinbelow. Pin 63 of microprocessor U1 (PAS) is connected to the reset pin 28 of local TE module 64 (FIG. 9) to effect a reset of this module when a low-level S/T reset is required. A voice mail request signal output at pin 22 (FIG. 6) of voice mail microprocessor 82 is input to the microprocessor U1 at pin 65 (PA10 FIG. 5). A voice mail grant signal output from the microprocessor U1 at pin 64 (PA9) is input to pin 15 of microprocessor 82. The flip-flop U32B generates an interrupt IRQVM at the Q output. This interrupt is connected to logic gate U34B, which inputs an interrupt to microprocessor U1. A voice mail interrupt acknowledge is output at pin 66 (PA11) and communicated to flip-flop U32B to reset this flip-flop when the interrupt is acknowledged by microprocessor U1. A voice mail reset output at pin 68 (PA12) of microprocessor U1 is input to pin 1 (RST) of the voice mail microprocessor 82, and effects a reset of the voice mail microprocessor 82. Pins 69–71 (PA13–PA15) of microprocessor U1 are connected to the Q output of flip-flop U32A (FIG. 6 in voice mail system 76), the S input of flip-flop U32A, and pin 23 of integrated circuit U37. Flip-flop U32A has an input connected to pin 17 of microprocessor 82. These connections are utilized for voice mail direct memory access when messages are stored to, and retrieved from, the memory 83. A storage request initiated by a signal output at pin 17 of the voice mail microprocessor 82 causes a request signal at the Q output of flip-flop U32A. This signal is communicated through the VMAIL bus to pin 69 of the microprocessor U1 and to pin 25 of microcontroller 82. An acknowledgment of this request is output from the microcontroller at pin 70 and communicated through the VMAIL bus to flip-flop U32A, to reset the flip-flop. When the data is stored, the microprocessor U1 increments the internal address counter A0–A23 and outputs a done signal on pin 71. The done signal is communicated through the VMAIL bus to pin 23 of the voice mail microprocessor 82. If there are more data words (8 bits each) to be stored in memory 83, the process will be repeated until all the data is stored. It will be recognized that data can be read from the memory 83 using the same process, with the memory U42–U45, or U5 and U6, being read instead of being written to.

The microprocessor U1 (FIG. 5) includes a reset input pin 92 and a halt input pin 91. The reset and halt pins are connected to gates U15A and U15B which are provided by a commercially available 74HC125A integrated circuit. If the power supply is satisfactory, a PWRGOOD signal is generated by the power supply 50 which permits the reset and halt signals to be held at a high logic level by the pull-up resistors connected thereto. If the power signal is not satisfactory, the microcontroller is reset by these pins being pulled to ground by gates U15A and 15B. The reset signal is also connected to the reset pin of latch circuit U27. Latch U27 generates a reset signal at pin 19 which is coupled to other integrated circuits to effect a reset of the private exchange. The details of how the PWRGOOD signal is generated are disclosed in International Application NO. WO95/21485, entitled POWER SUPPLY FOR PRIVATE BRANCH EXCHANGE Published Aug. 10, 1995, the disclosure of which is incorporated herein by reference.

Pins 124, 125, 127 and 128 (FIG. 5) of the microprocessor U1 are chip select outputs for selecting (enabling) inputs and outputs from memory circuits U2, U3, U4, U5, U6 and U41–U45 (FIG. 7). Pin 128 of microprocessor U1 is connected to pin 22 of ROM integrated circuit U3 and selects the ROM integrated circuit U3 when the signal on pin 22 has a low logic level. The signal on pin 127 of microprocessor U1 is connected to pin 22 of integrated circuit U4 and it is used to select memory U4 when the signal on pin 127 is at a low logic level. The signal on pin 125 of microprocessor U1 is connected to 22 of SRAM integrated circuit U2 and selects memory circuit U2 when the signal on pin 125 is low.

With continued reference to FIGS. 5 and 7, pin 124 of microprocessor U1 is connected to one input of an ORgate U12C. The other input of U12C is connected to the address strobe (AS) pin 104 of microprocessor U1. The address strobe signal and the chip select signal CS3 must both be low for the ORgate U12C to generate a low level signal. The output of ORgate U12C is supplied to the S input of a flip-flop U13B, through an inverter U10C to the D input of row address strobe flip-flop U13A, and to the (RAS) input of integrated memory circuits U5, U6, U42, U43, U44 and U45. The Q output of flip-flop U13A follows the output of U12C by one clock cycle. The Q output of flip-flop U13A selects multiplex circuits U7–U9 which output the address signals for memory circuits U5, U6 and U42–U45. The output of flip-flop U13B follows by another one-half clock cycle and U44/U45 is input to ORgates U11A and U11B for bank select CAS signals for U42/U43 and U44/U45, and to the column address strobe (CAS) inputs of circuits U5 and U6.

Six DRAM devices U5, U6 and U42–U45 are shown, although only U42–U45 or U5 and U6 are used. Jumpers J24 and J25 select between up to four 256 K×4 integrated circuits or up to four 1M.×4 memory units U42–U45, which are pin compatible. Alternatively, two 4M×4 devices can be installed at U5 and U6 for 4 Mbytes total storage. The necessary refresh for the DRAMs U5, U6 and U42–U45 is provided by the microprocessor U1. The connection of the TOUT1 (pin PB4) and REFREQ (pin PB8) causes the microprocessor to generate an "ordinary" read cycle every 15 microseconds. The refresh timing is provided for DRAMs U42–U45 or U5 and U6. Since only one row of each DRAM memory unit U5, U6 or U42–U45 can be refreshed with each read cycle, a counter in the microprocessor U1 increments the row address at pins A0–A10 for each refresh read of these DRAM integrated circuits. A novel feature of this design is that the refresh read is passed to the pseudo static RAM U2 through ORgate U12A to allow it to refresh responsive to a refresh signal at pin 1, which is a refresh control signal. The (P)SRAM circuit U2 has an internal counter to accomplish row indexing during a refresh, such that the microprocessor is not required to increment the row indexing of the (P)SRAM. Each of the devices which use OE/RFSH will receive an output enable signal from ORgate U12D when any memory is read, and refresh themselves on all read signals which occur when the chip enable signal for that circuit does not enable the circuit, including the DRAM refresh reads.

The ROM U3 is shown to be a 512K'8 EPROM in the illustrated embodiment. Its maximum size is 1M×8. However, it may have any of the sizes listed on block U3. Memory U4 is a ROM or an SRAM, having a maximum size of 512K×8. It may have any of the sizes listed in block U4. The (P)SRAM U2 is a 128K×8 memory unit in the illustrated embodiment. However, the maximum size capability of this memory unit is 512K×8, and it may be as small as 32K×8. The DRAM memory U5 and U6 or U42–U45 are used for voice mail, and includes a 1M×4 memory in the illustrated embodiment, although it could be as large as 4M×8.

The read/write (W/R) output pin 103 of microprocessor U1 is connected to ORgate U12B. The other input of ORgate U12B is connected to the data strobe DS pin 105 of microprocessor U1. The ORgate U12D has an input connected through an inverter to the output of the R/W pin 103 and an input connected to the DS pin of microprocessor U1. ORgate U12B generates the write enable output for memory circuits U2, U4 and U5, U6 or U42–54 and ORgate U12D generates the output enable for all the memory devices.

To generate an end cycle signal for I/O cycles, which is any access to the upper 8 Mbytes of the microprocessor U1 address space, at the output of NANDgate U16A receives output NANDgate U16B and the IA23 signal. The gates U16A (FIG. 5), U16B, U31A and U350 create retimed strobe signals IWE1 and IWESER for some of the input/ output (I/O) devices, and a ready signal at pin 85 of microprocessor U1 upon completion of an I/0 cycle. These signals are generated from the write enable signal IWE output from ORgate U23, the output enable signal IOE of ORgate U12D, and the clock signal CLK0. The write enable signal output from U12B is input to an inverter U10F. The output of inverter U10F is input to flip-flops U31A and U31B. The output of flip-flop U31A is inverted and delayed with respect to the IWE signal. The output of U31A is input to NANDgate U16B. When the output enable signal or the delayed write enable signal are low, the output of U16B is high. When the output of U16B is high, and IA23 (highest bit of address bus for the memory units) is high, the output of U16A is low. When the output of U16A is low, pin 85 is pulled low by driver U15C indicating the end of an I/O cycle. Thus, an input/output cycle will be completed whenever the microprocessor causes the address pin A23 to have a high level, although this restricts the system by eliminating the top half of the address capability. However, this is not a detrimental limitation since the system generally uses only the lower one-eighth of the processor's 16 megabyte address space. The IWE1 signal output from D flip-flop U31A is input to integrated circuit U33, which generates timing signals for the data bus 92. A further delayed signal is output from flip-flop U31B, the output of which is input to ORgate U35D. The other input to ORgate U35D is the write enable signal. The output of ORgate U35D is a timing signal for pin 18 of quad serial controller U400.

The private exchange 20 includes integrated circuits U26 (FIG. 8) and U33 which are decoders generating I/O chip selects and write enables for the private exchange. The integrated circuit U26 generates a low logic level signal at one of pins Y0–Y7 depending upon the output signals on address pins IA18–IA20 of microprocessor U1 (FIG. 5). The output signals on address pins IA21–IA23 of microprocessor U1 are used to enable integrated circuit U26. Four of the outputs of integrated circuit U26 are used to select the output data ports 36–39 (FIG. 12). Only one of these ports is enabled at any time. Data port 38 is selected when IA18–IA20 (FIG. 8) are all low logic level signals. Port 39 is selected when IA18–IA20 pins have the value 001. Data port 36 is selected when the IA18–IA20 pins have the value 010. Data port 37 is selected when the IA18–IA20 pins have the value 011. The Y4–Y6 outputs select integrated circuits U39, U38 or U29 through ORgates U35A–U35C. When the output enable signal from ORgate U12D is high, all three circuits U29, U38 and U39 are selected through ORgates U35A–U35C. Because OE is an active low signal, the port devices will not be enabled when OE is high. The Y7 output of circuit is the E1 enable signal for integrated circuit U33. Circuit U33 outputs similar clock signals for integrated circuits U41, U40, U28, U27 and U18. U33 also outputs clock signals for the data ports through flip-flops U405 and U406, which output ring indicator and data carrier detect signals for the RS232 transceivers. U33 also generates the strobe signal (MUXSTB) for conference circuits U314 and U315 in the analog circuit, which are described in greater detail in International Application NO. 95/21498, entitled PRIVATE EXCHANGE POTS LINE INTERFACE Published Aug. 10, 1995.

Figure 8A:
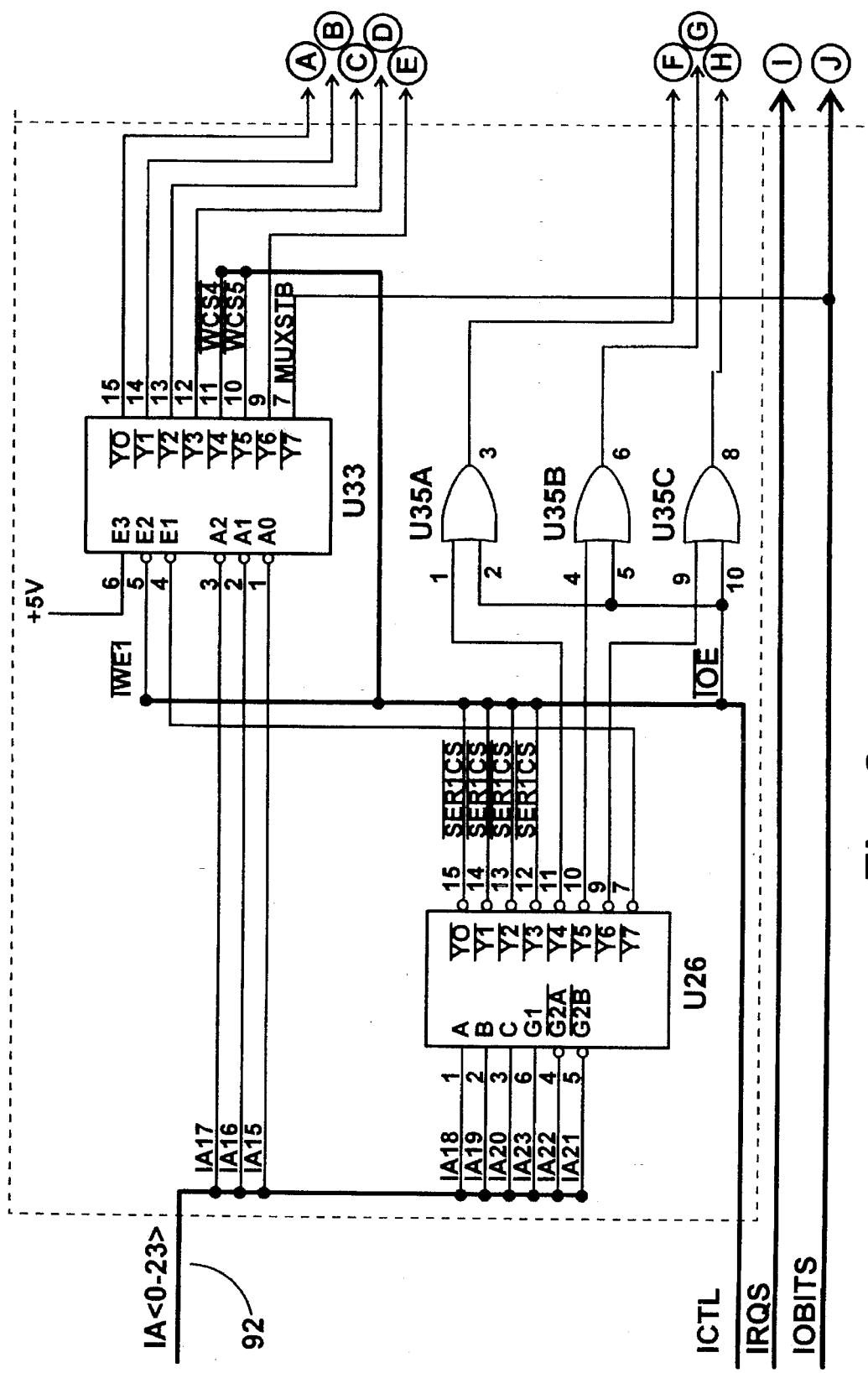
Figure 8B:
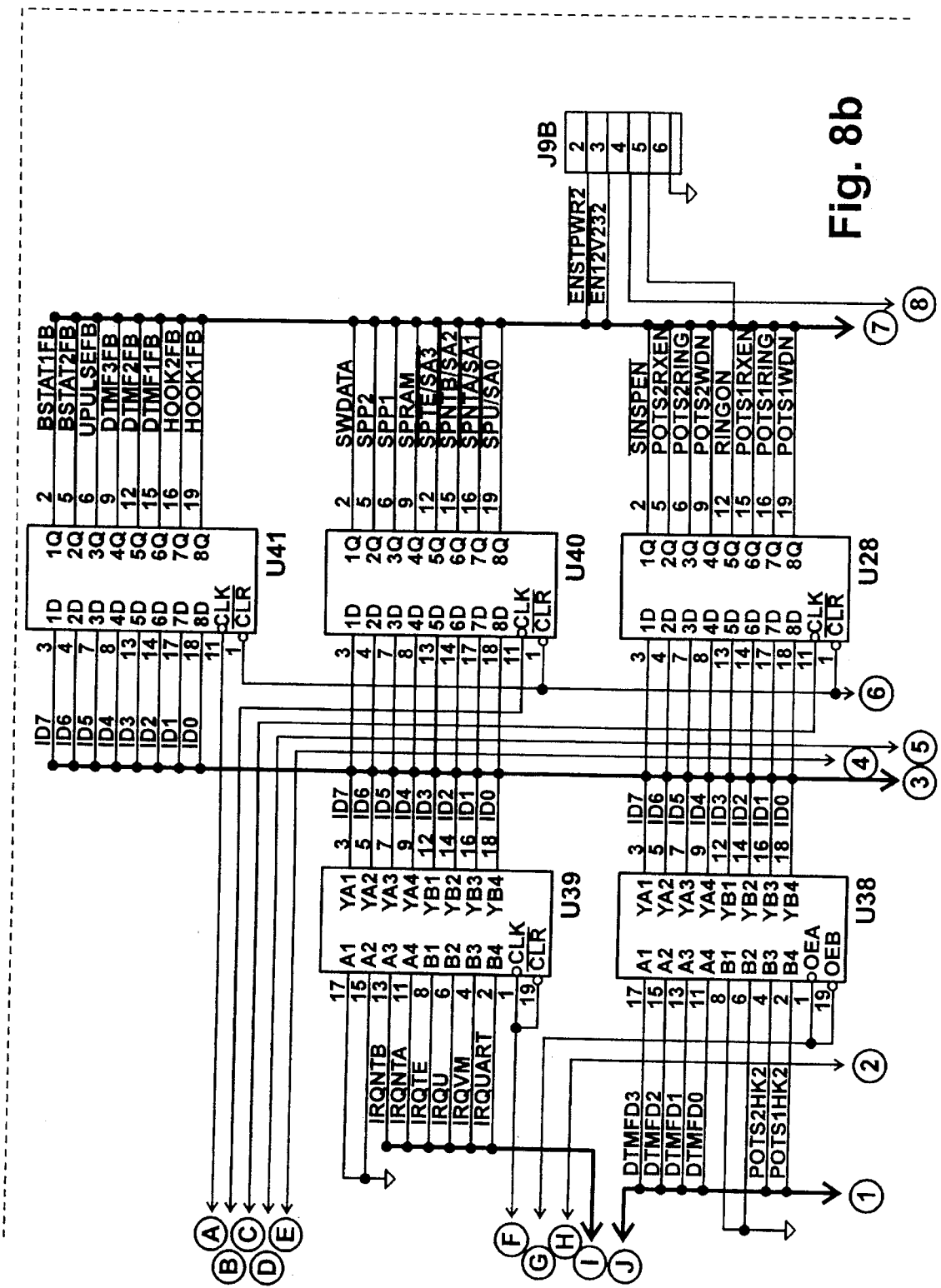
Figure 8C:
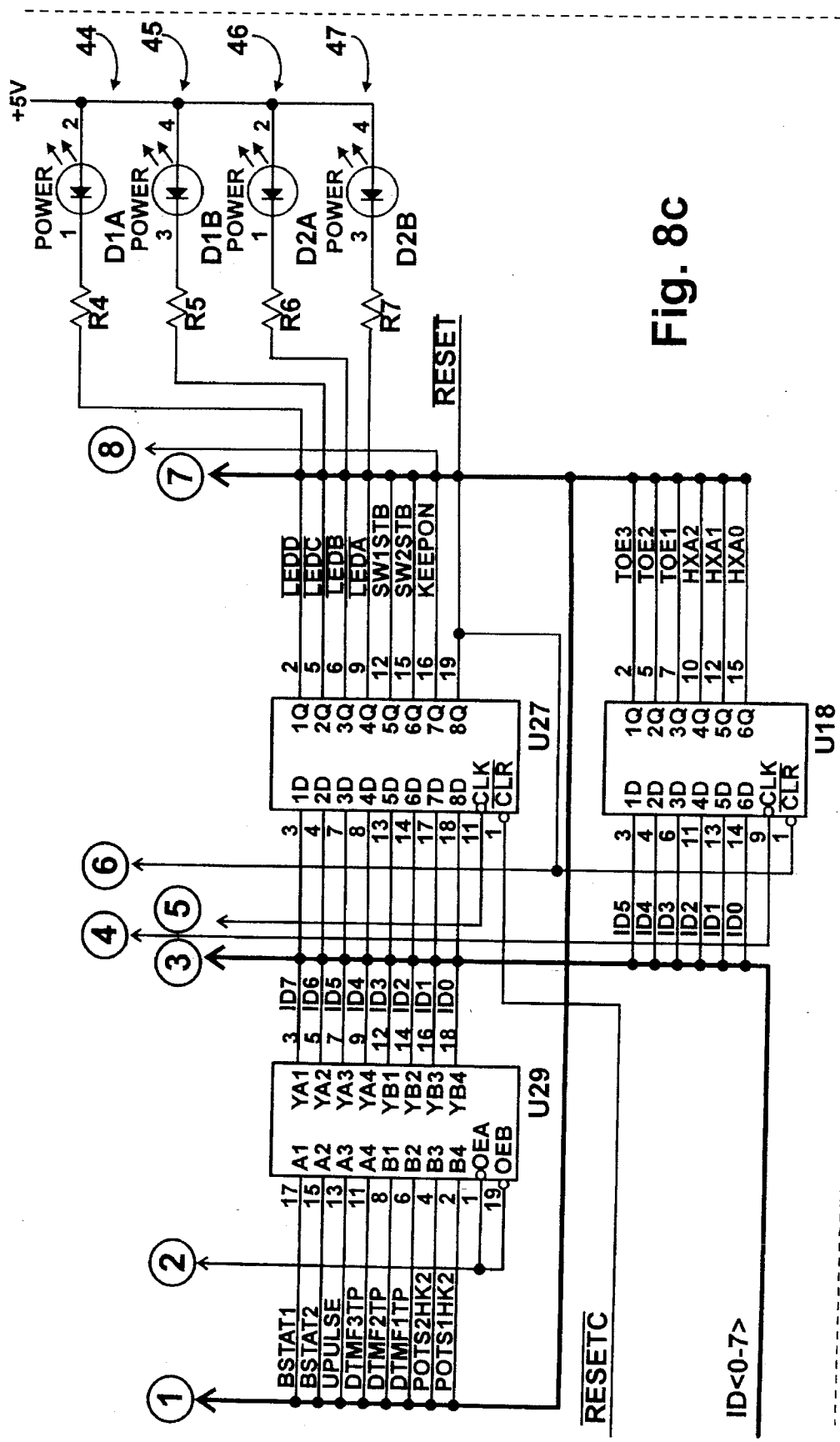

With continued reference to FIGS. 5 and 8, the outputs of line drivers U39, U38 and U29 are connected in common to the ID7–ID0 conductors on data bus 90. The line drivers U39, U38 and U29 supply signals on their input pins A1–A4, B1–B4 to their output pin YA1–YA4, YB1–YB4 when each driver is enabled. The D-type flip-flops U27, U28, U40 and U41 are latches which hold their 1Q–8Q outputs to the data signals at their 1D–8D inputs at the positive transition of their respective, "sequentially" generated clock signals.

Integrated circuits U41, U40, U28 and U18 are cleared by a reset signal output from integrated circuit U27, which reset signal is generated following the power reset output by inverter U15A. The output LEDs 44–47 are driven by respective output signals of integrated circuit U27. LED 44 is illuminated according to the private exchange 20 power status 95 as described in greater detail in International Application NO. WO95/21485, entitled POWER SUPPLY FOR PRIVATE BRANCH EXCHANGE Published Aug. 10, 1994. LED 45 displays the U interface status. LED 46 and LED 47 are status indicators which are illuminated under software control.

Figure 9B:
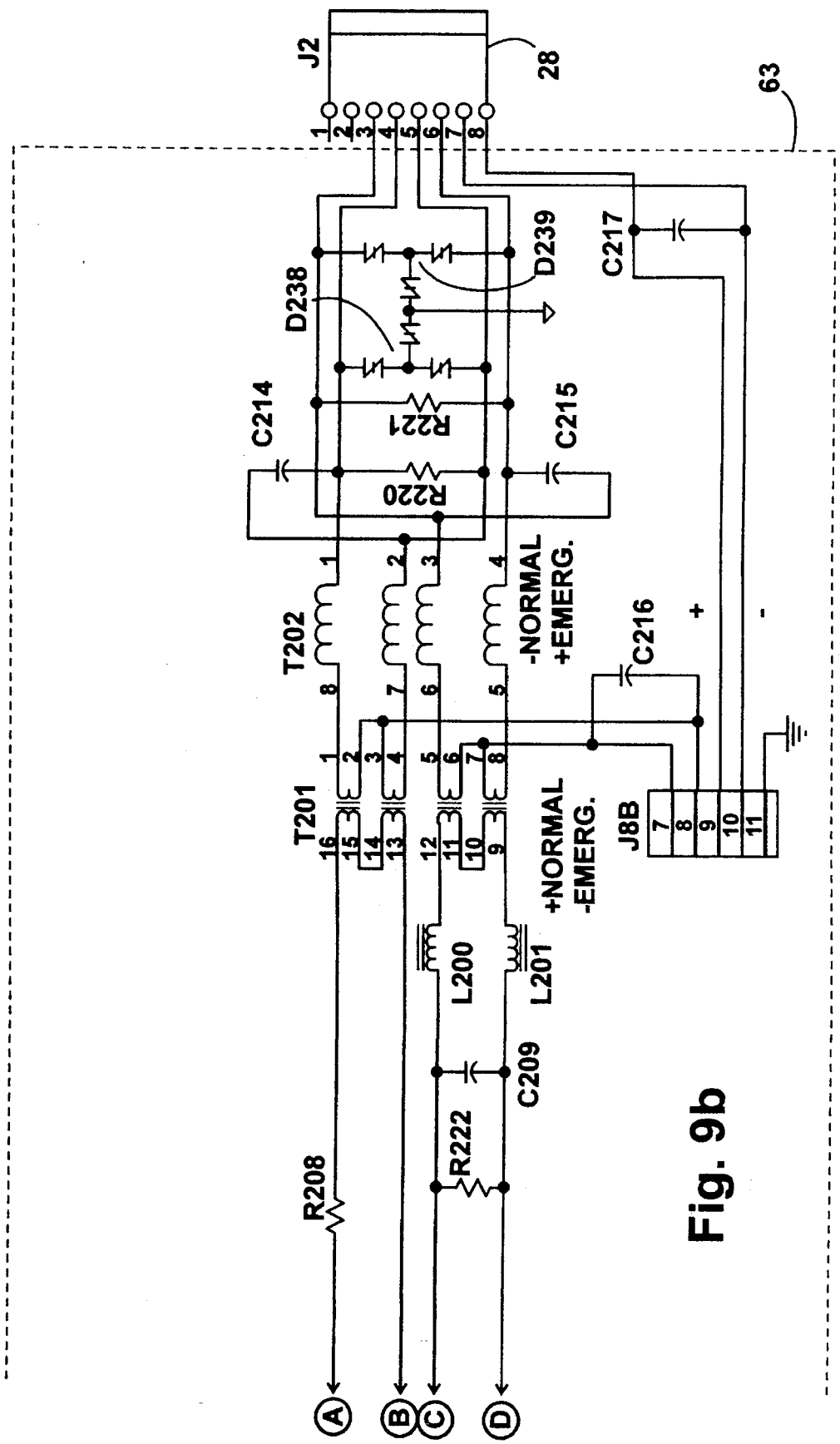
Figure 9D:
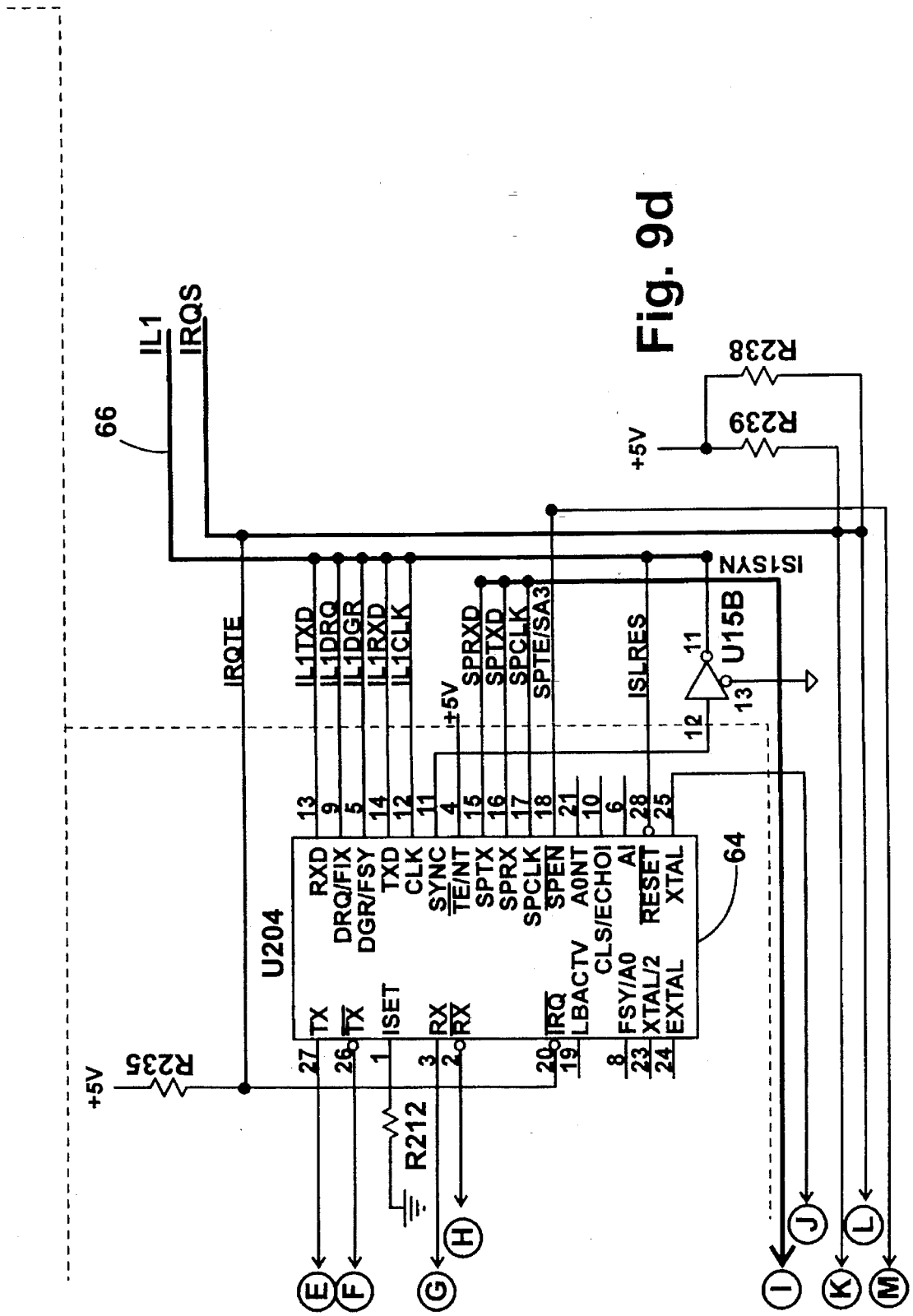
Figure 10A:
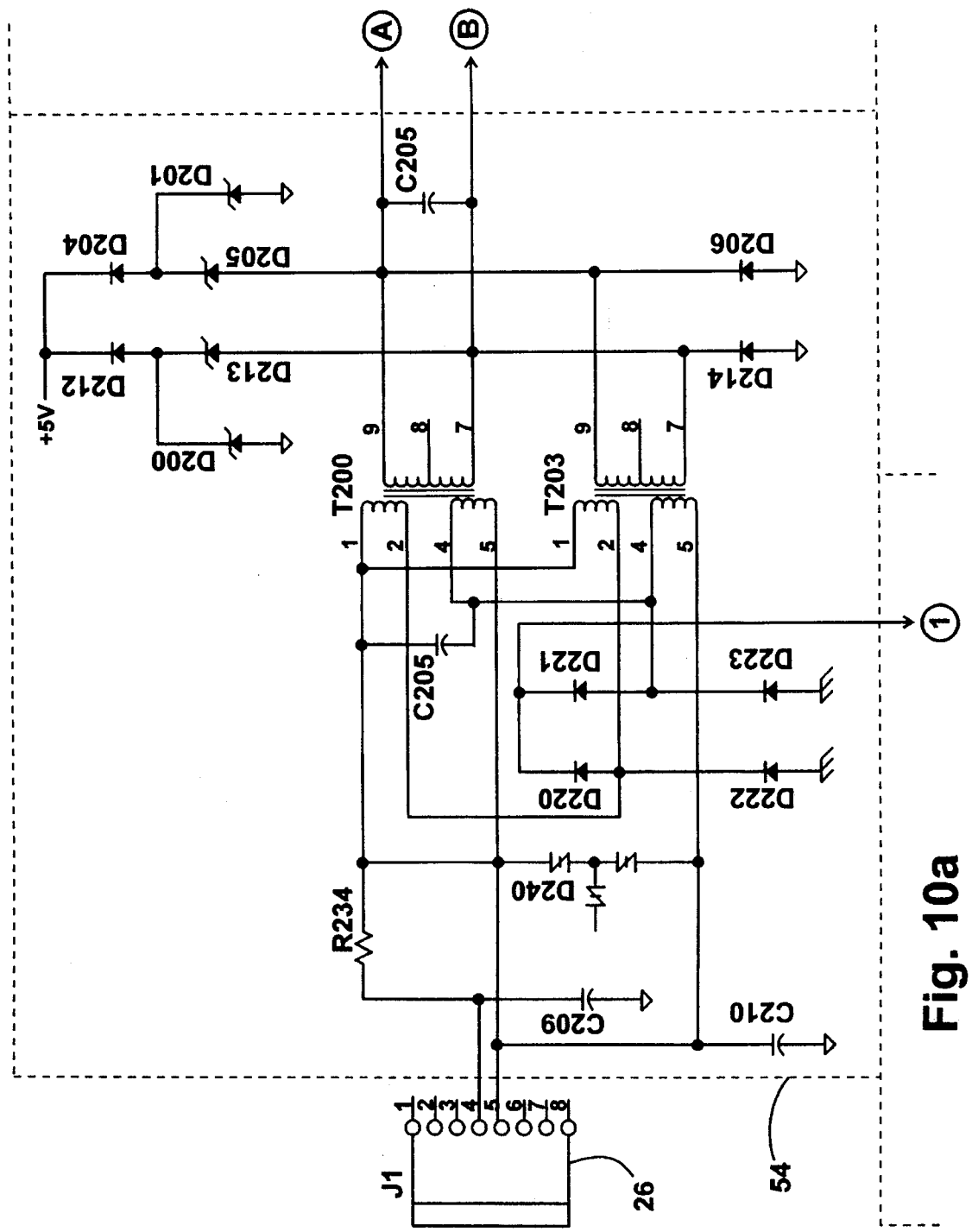
Figure 10B:
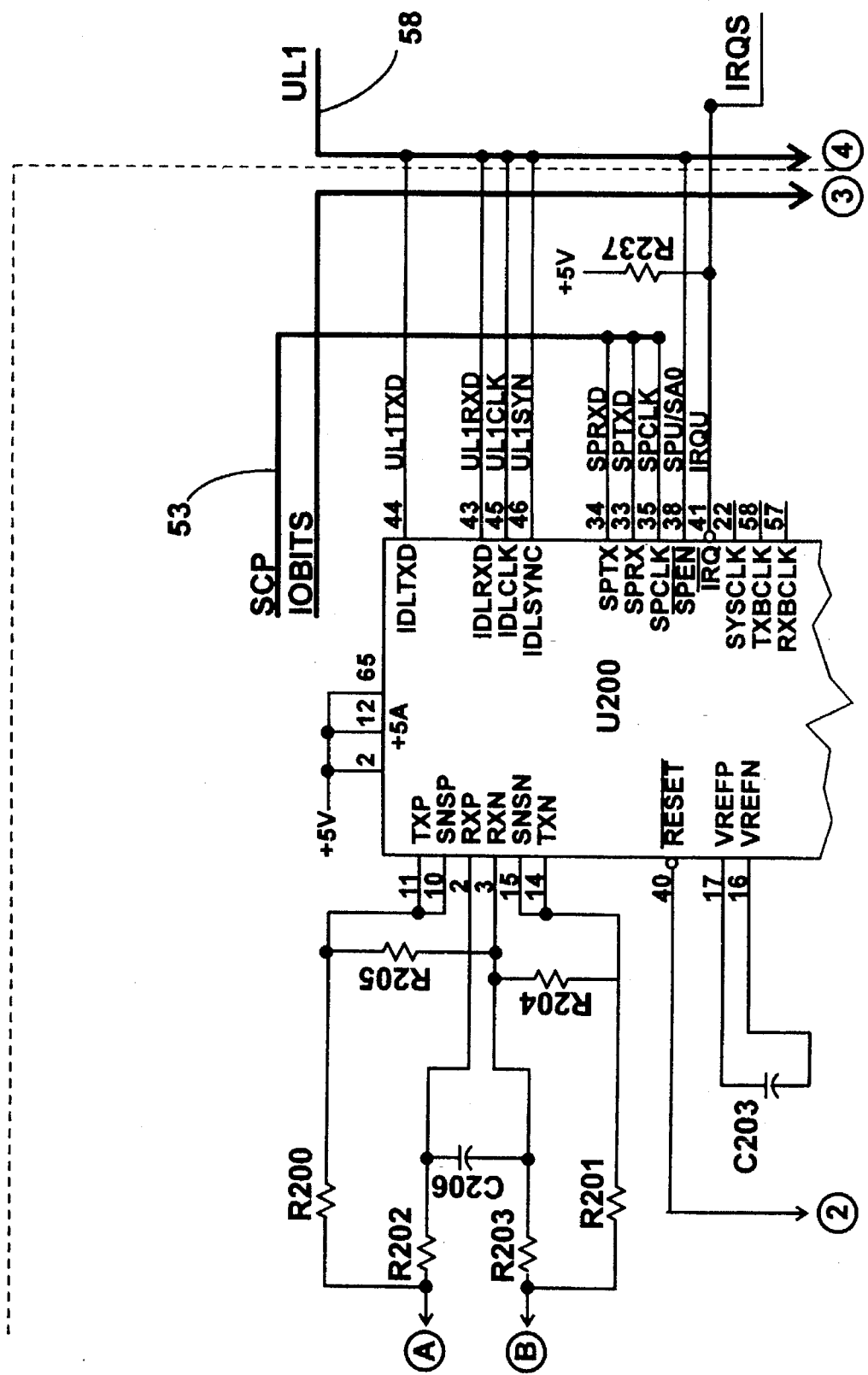
Figure 10C:
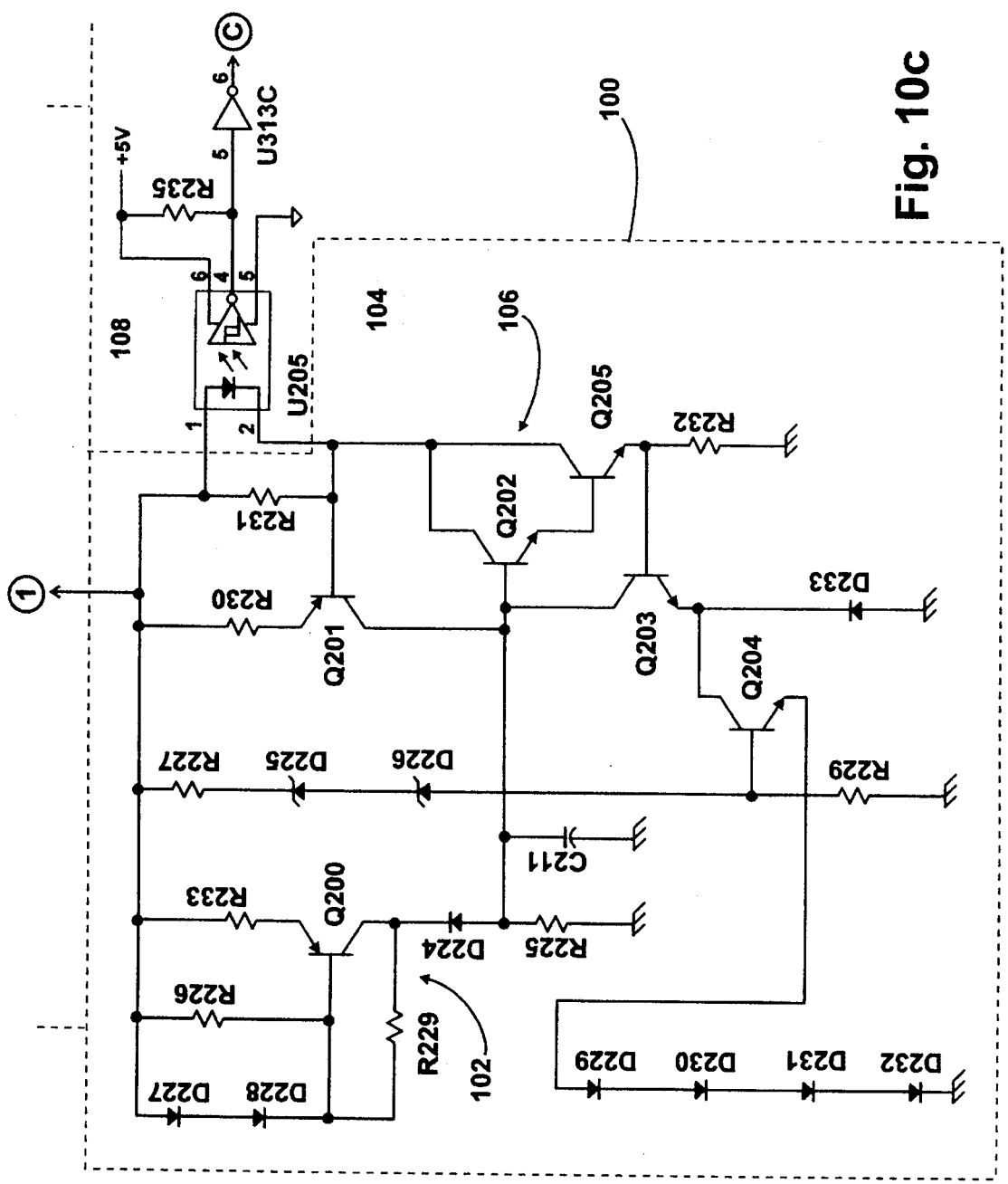
Figure 10D:
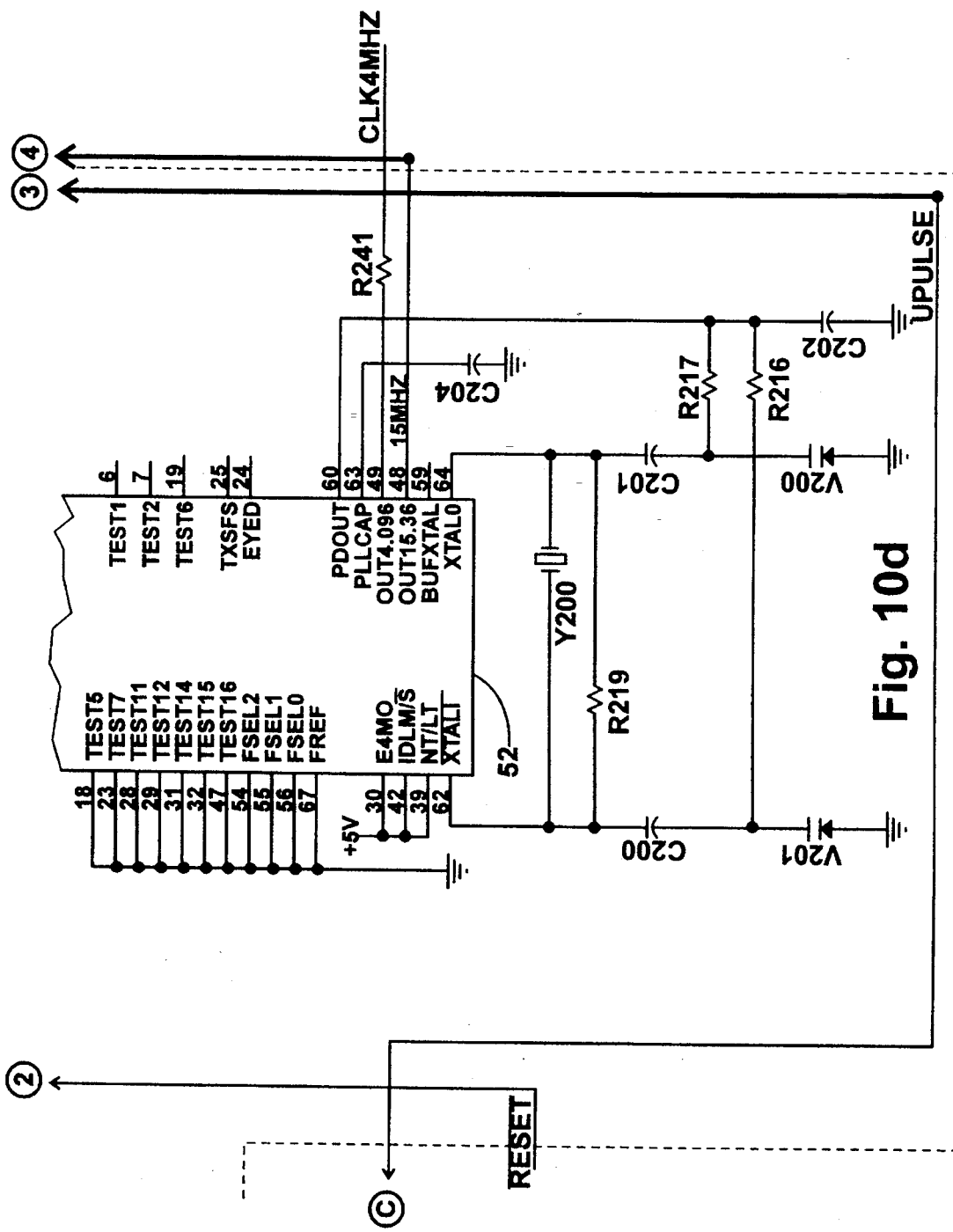
Figure 11A:
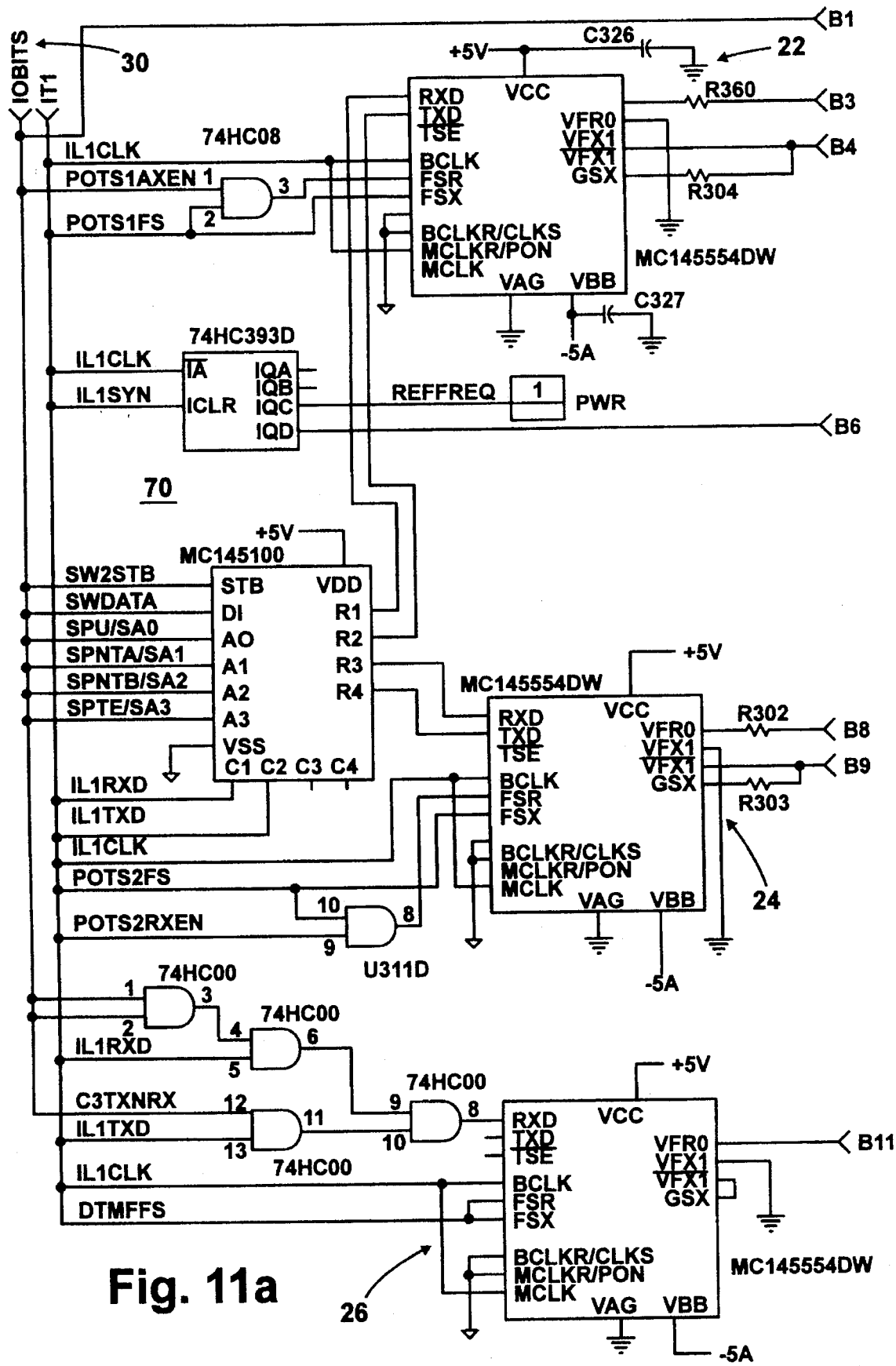
Figure 11B:
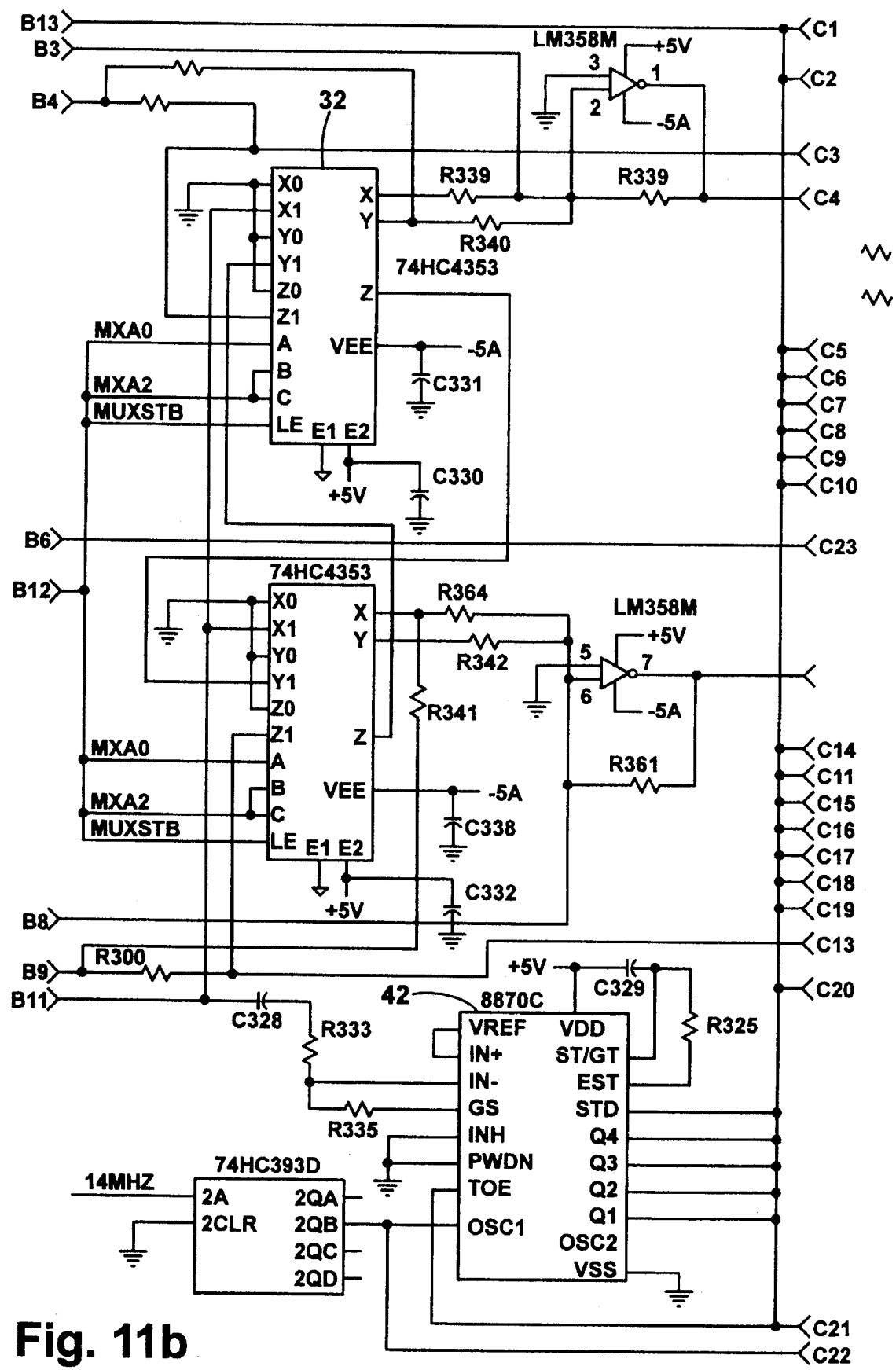
Figure 11C:
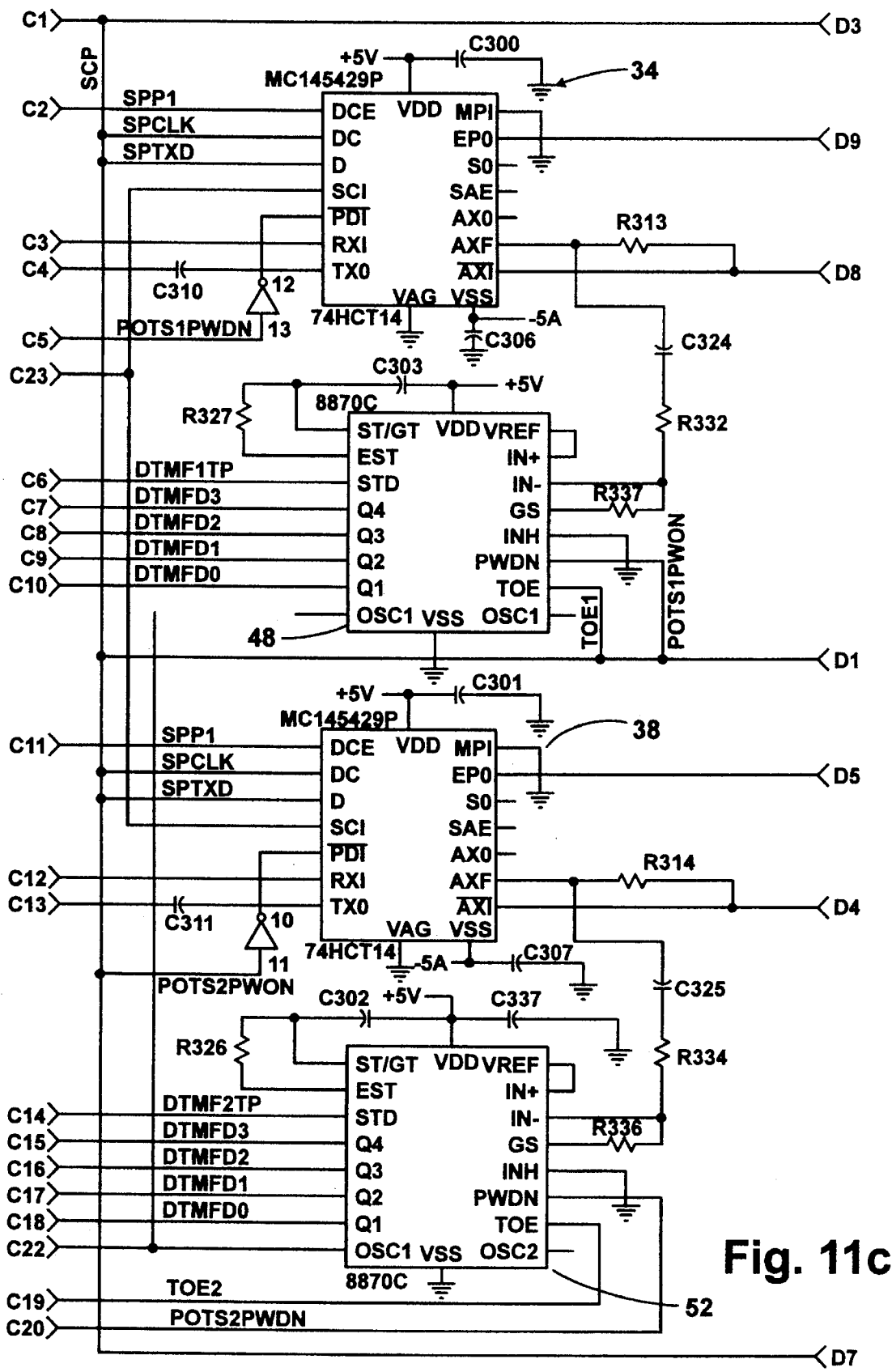
Figure 11D:
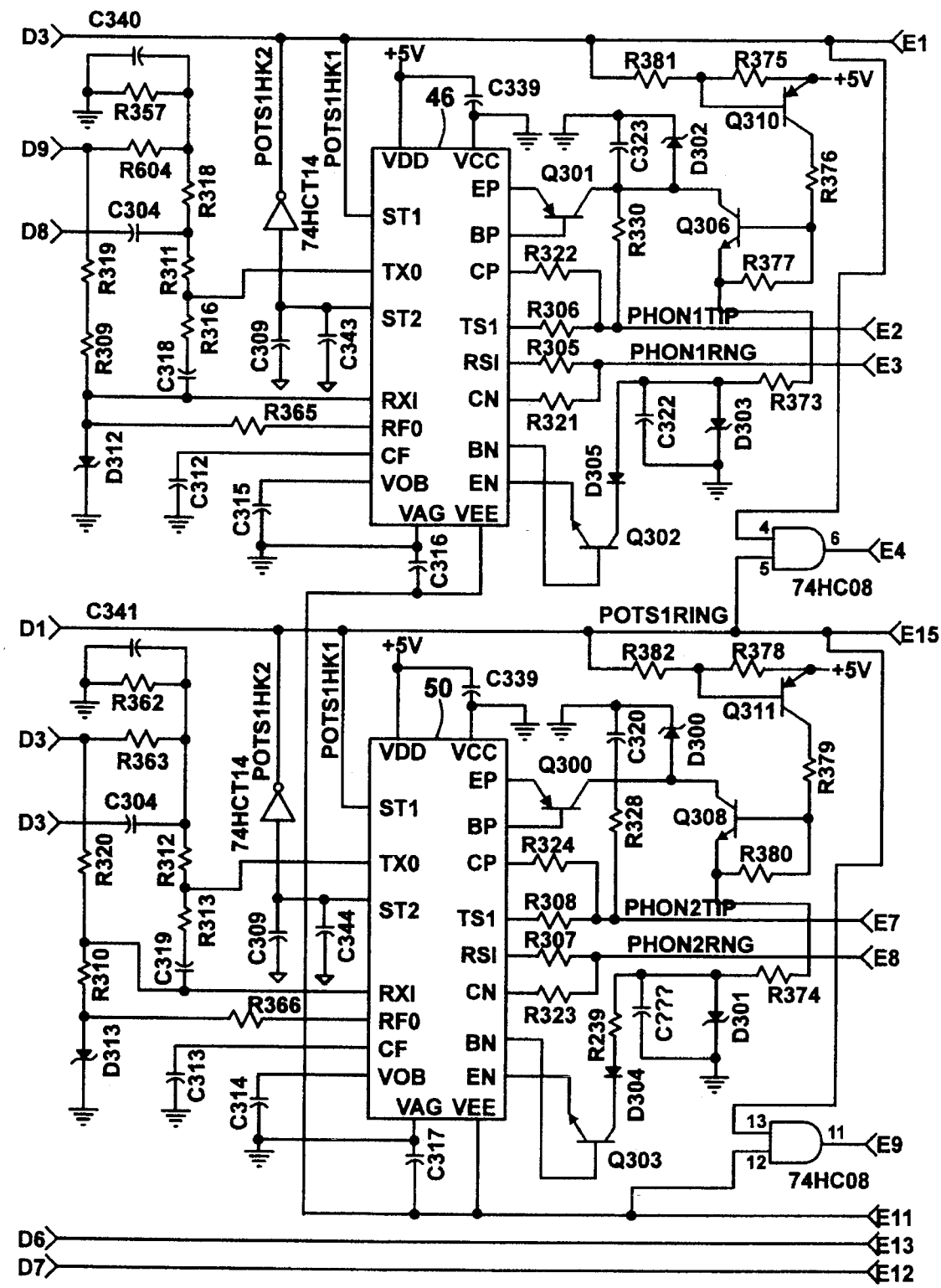
Figure 11E:
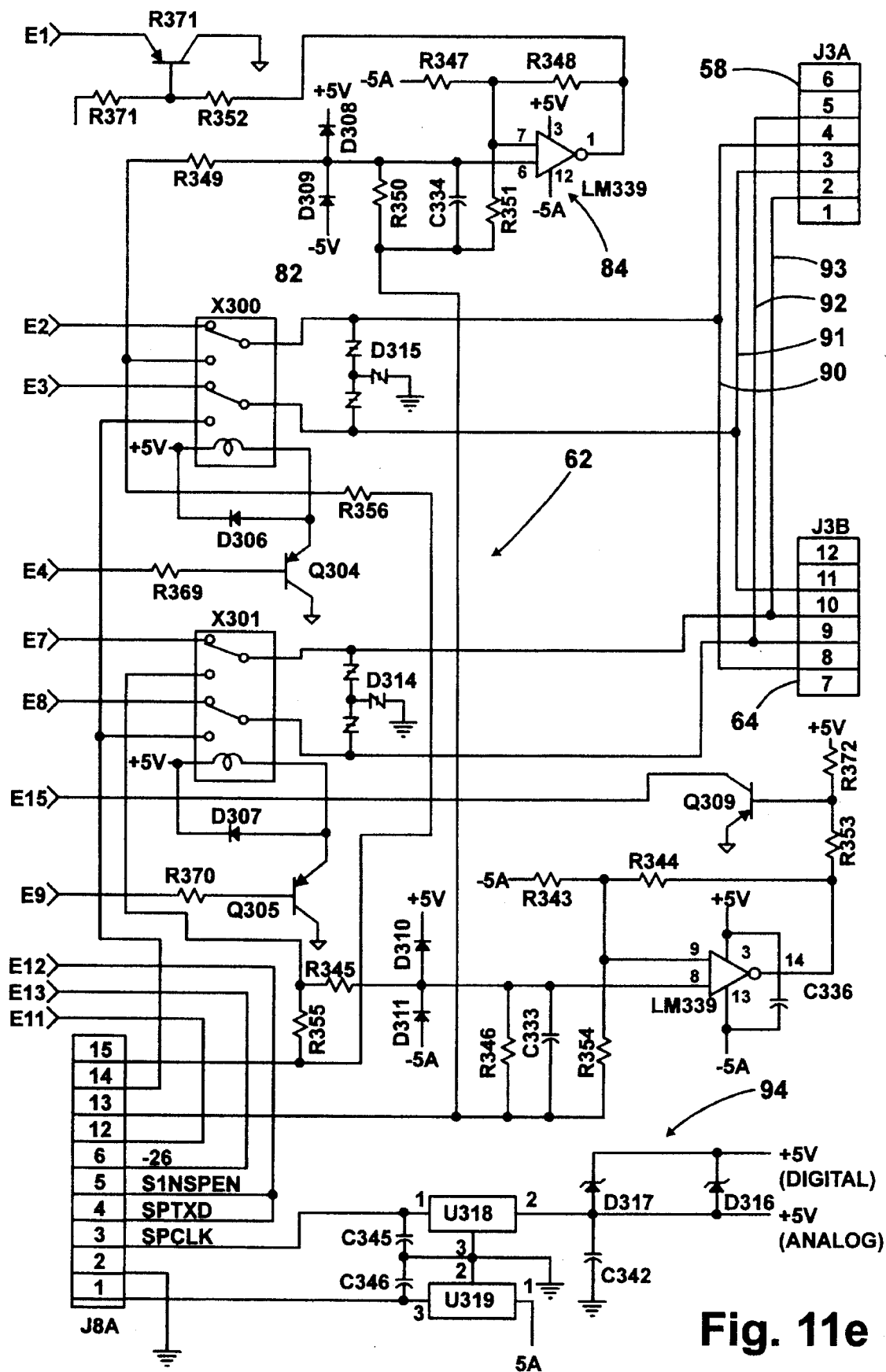
Figure 12A:
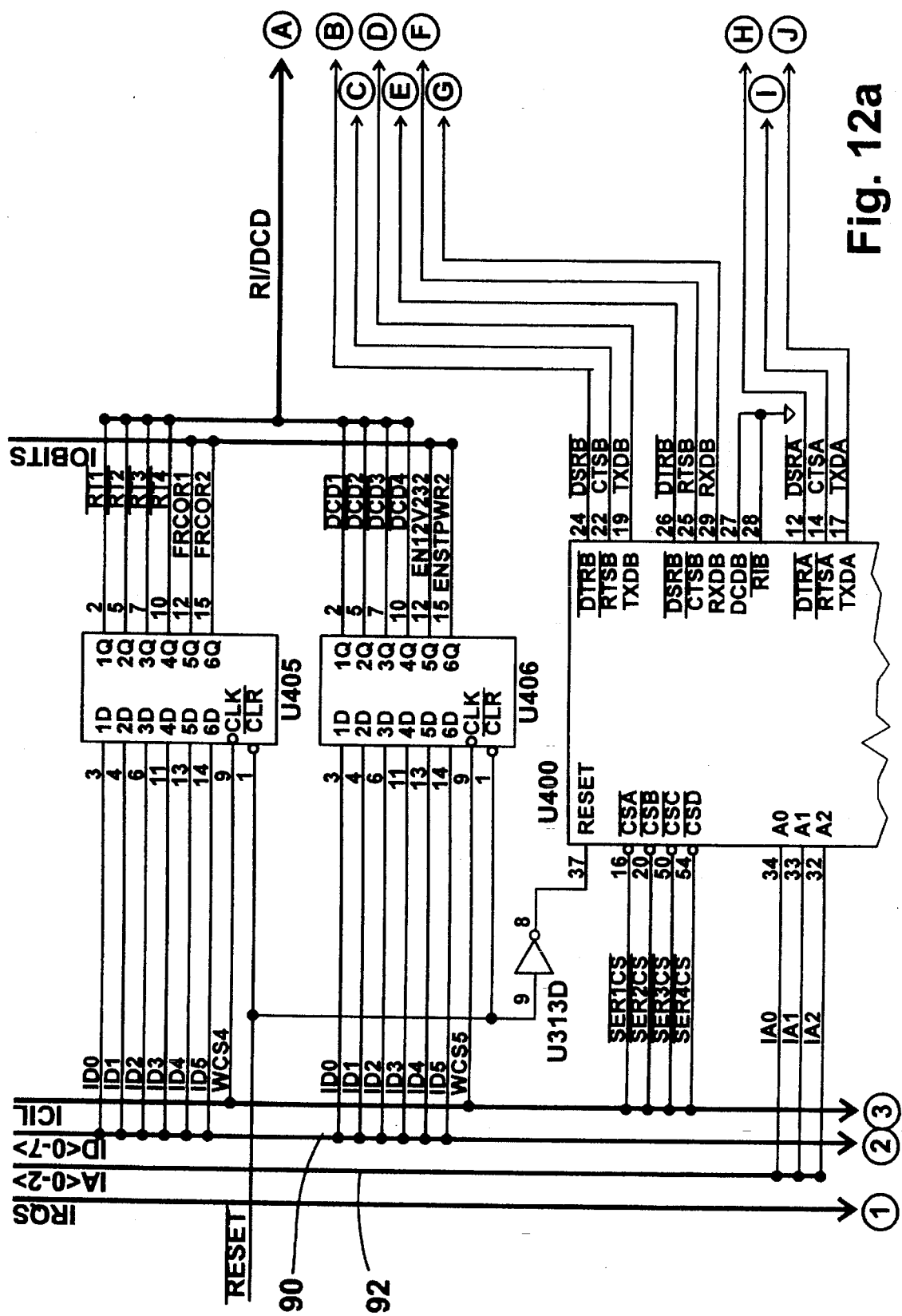
Figure 12B:
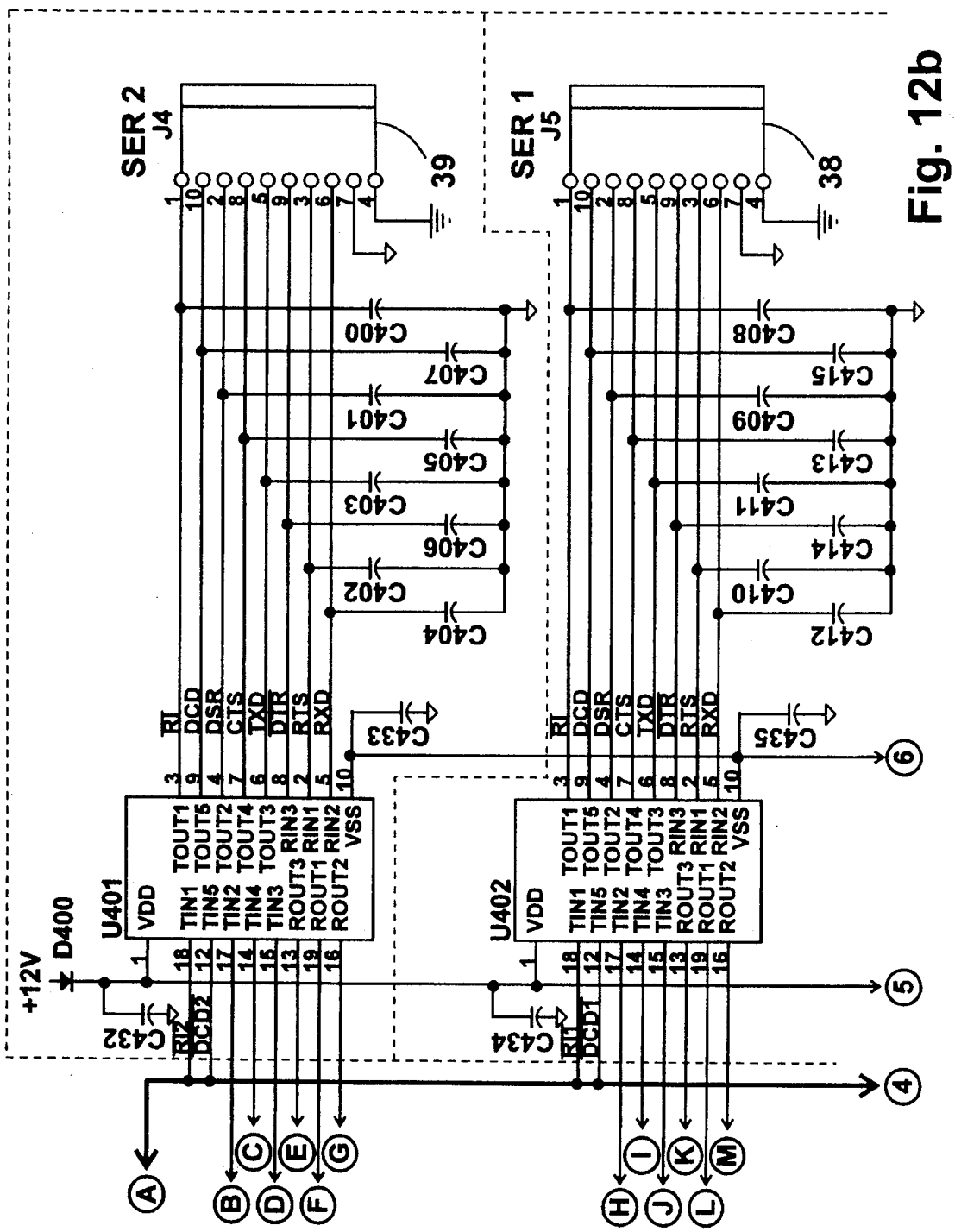
Figure 12C:
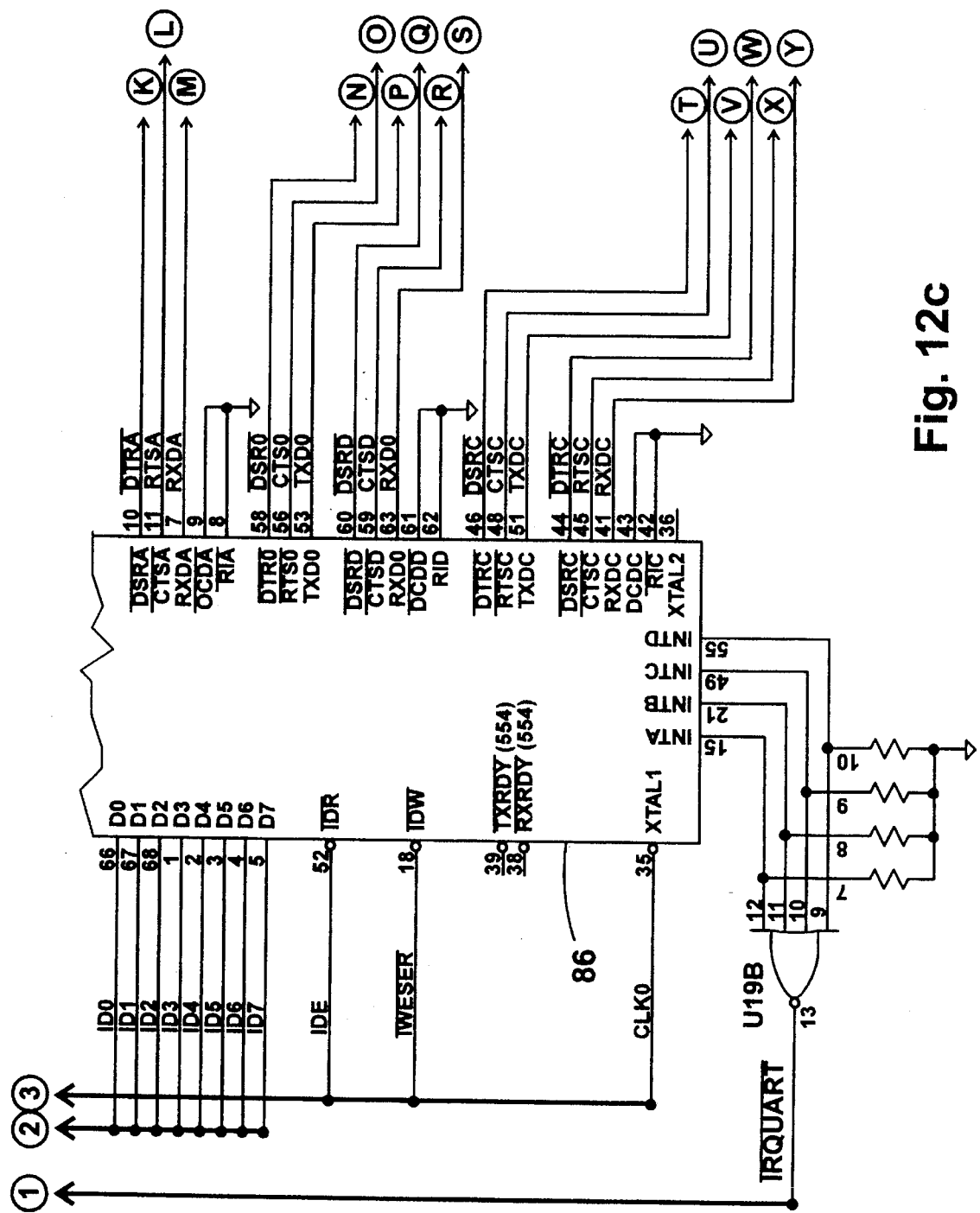
Figure 12D:
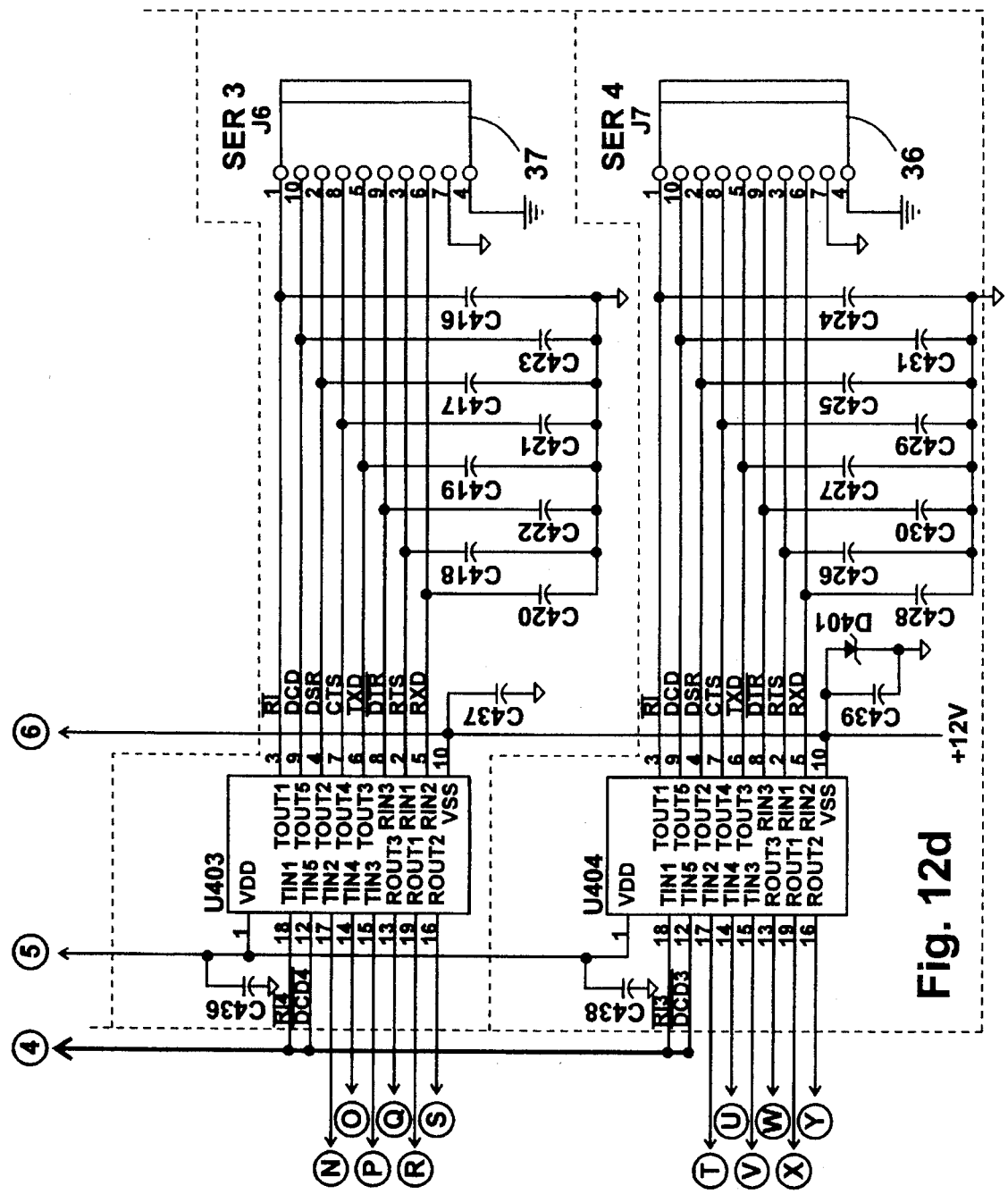

Interrupt logic for microprocessor U1 (FIG. 5) is provided by logic circuits U29, U30, U41, U34A and U34B (FIG. 6). Input PB11 of microprocessor U1 is coupled to an ORgate U34A, which receives interrupt signals from the data I/O ports 36–39 (FIG. 12; IRQUART), the U-port module 52 (IRQU; FIG. 10), and the voice mail microprocessor 82 (FIG. 6; IRQVM). Input PB10 of microprocessor U1 is connected to the output of ORgate U34B, which receives an interrupt from each of the S/T port module 60 (IRQNTA; FIG. 9), the S/T local module 62 (IRQNTB), and the TE module 64 (IRQTE). Pin PB9 is connected to comparator U30 through an inverter U14A. Integrated circuit U30 is a comparator receiving 8 bits (pins 3, 5, 7, 9, 12, 14, 16 and 18) from flip-flop integrated circuit U41 (FIG. 8). These 8 bits indicate the preexisting states (states stored in microprocessor U1) for the hook switch on analog line 1 (conductors 71 connected to port 30), the hook switch on analog line 2 (conductors 73 connected to port 31), each of the DTMF detectors (the active/inactive states of DTMF detectors associated with interface 70, 72 and DTMF detector 75), the U pulse which is the detection of significant low-frequency voltage/current on the U pair for low-level "out-of-band" signalling, and each of the battery status indicators BSTAT 1 and BSTAT2. The value of these eight bits are compared with the 8 bits input to comparator U30 at pins 2, 4, 6, 8, 11, 13, 15, 17. These eight bits have the present conditions of each of these eight state indicators. If the present conditions of one or more of the state indicators changes, the preexisting condition will be different from the present value. The comparator will detect the difference between the 8 present state indicators and the 8 preexisting state indicators. This detected difference will result in an interrupt being generated at the output of comparator U30. The state indicator that has changed will be identified by reading the output of integrated circuit U29. The microprocessor U1 then changes the status of U41, so that a future state indicator change may be detected. In this manner, the 8 bits from U41 and the 8 bits output to U29 directly correlate and meet at the comparator U30 to feed input PB9 of microprocessor U1.

The voice mail processing system 76 (FIG. 6) is implemented using a Dallas DS2132 voice mail processor and a Motorola HC68HC05P7DW processor. Pins 24 and 27 of the Dallas DS2132 are connected to the PCM bus 66 (FIG. 3), and are the PCM output and PCM input to the voice mail system for the local PCM bus 66. Pins 16 and 20 of the answering machine (FIG. 6) processor 77 are connected to pin 11 (serial data out) and pin 12 (serial data input) of microprocessor 82 by two wire serial bus 80. Compressed PCM signals representing speech signals and processor status/command signals are present on serial bus 80. Pin 2 of microprocessor 82 is an interrupt pin which is connected to the voice mail sync. signal VMAILFS, described in greater detail hereinbelow. The answering machine processor 77 and the voice mail microprocessor 82 are responsive to the signal VMAILFS signal to transmit or receive the proper PCM bus time slot B1 through B4. The answering machine processor 77 includes a main clock input at pin 13, at which a 14.31818 MHz clock signal output from oscillator 94. Processor 77 also receives a data clock signal which is output from a NANDgate U16C, one input of which is a serial data clock signal output from pin 13 of the voice mail microprocessor 82 and the other input of which is an enable signal output at pin 20 of the microprocessor 82. As indicated above, the parallel output pins PA0–PA7 of the voice mail microprocessor 82 are connected to PA0–PA7 pins of the core microprocessor U1. Requests to the microprocessor U1 are passed through the latch U32A. This dedicated voice mail microprocessor 82 serves the function of creating a queued parallel interface to interchange compressed PCM data and other command/status information with the core microprocessor. In order to provide direct memory access through the microprocessor, the DACK, DREQ and DONE signals create a handshaking protocol between the core microprocessor U1 and the voice mail microprocessor 82, and latch U32A to effect incrementing of the DMA address as the data is written into, and read out of, the DRAM memory by the voice mail microprocessor 82.

Figure 24:
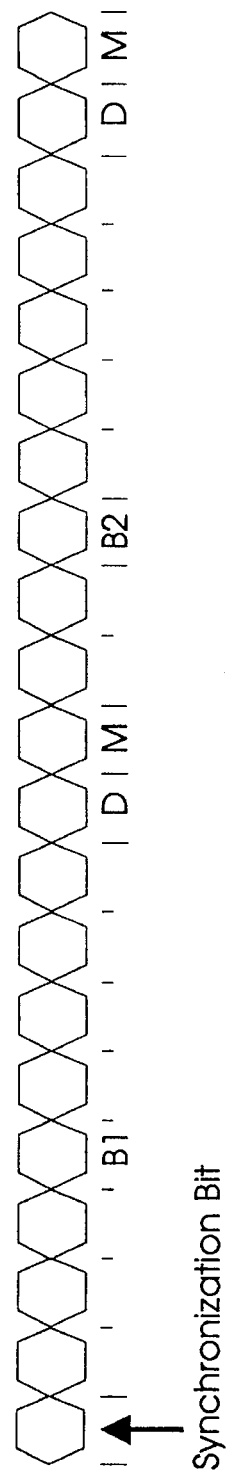
FIG. 24 is a timing diagram for an ISDN frame including the B1, B2, D and M bits.

The network PCM bus 58 (FIG. 3) is formatted to the network CCITT standard and operates at a 2.048 MHz clock rate. It includes frame sync. that occurs for one clock pulse before the start of each 125 microsecond frame. Each frame includes 20 bits that follow the frame sync., which 20 bits consist of eight data bits for the B1 channel, one data bit D, one maintenance bit M, eight data bits for the B2 channel, one more data bit D and one more maintenance bit M (FIG. 24). The maintenance bits, in accordance with ISDN CCITT standards, are used for B channel contention, extra control channels, and frame alignment. The local PCM bus 66 is formatted the same as the network PCM bus with respect to the sync. bit and the first 20 bits of each frame.

The immediate invention includes a novel system for assigning the B1, B2, B3 and B4 time slots to analog interface 70, analog interface 72, voice mail system 76 or DTMF detector 75. The time slot assignor, or timing control circuit, 78 includes a sync. signal generator which generates an enabling signal for each of these four source/destinations of signals on the local PCM bus. To generate these four sync. signals POTS1FS, POTS2FS, DTMFFS and VMAILFS, the time slot assignor receives IL1SYN signal (the sync. signal preceding B1 in the ISDN system) and the IL1CLK signal, which is at the bit rate of data on the ISDN network. The system uses a decade counter U20 (FIG. 6) having ABCD inputs connected to ground (0000) and a decade counter U21 having ABCD inputs connected to (0100). The IL1SYN signal causes the two counters to load their respective ABCD input values before counting is initiated. The QC output of counter U21 will be high, which is used as the enable P input for both counters. The enable T input for counter U20 is held high, so it will count to ten at the clock rate of the IL1CLK clock signal. Outputs QA, QB and QC of counter U20 are input to NORgate U13A, such that the output of NORgate U13A will be low for counts of 0 and 8 and high for counts of 1–7 and 9. Output QD will be high for counts of 8 and 9, and low for counts of 0–7. The carryover output of counter U20, which is high only when counter U20 is at a count of 9, is connected to the enable T input of counter U21. Each time counter U20 reaches 9, counter U21 will count 1. Thus, the first time counter U20 reaches 9, counter U21 will output a high logic level for one clock pulse on outputs QA and QC. This count of one immediately precedes the B2 time slot because U20 counts at the bit rate of the data signal on the ISDN network. The second time the counter U20 counts to 9, counter U20 outputs a high level on outputs QB and QC. This transition of U21 immediately precedes signal B3. The third time counter U20 counts to 9, the carryover pulse on output pin 15 of U20 will cause counter U21 to count to 7, such that QA, QB and QC outputs of counter U21 will have high logic level signals. The fourth time U20 counts to 9, and counter U21 is incremented, output QC goes low, which disables counters U20 and U21. These counters remain disabled until the IL1SYN pulse preceding the B1 channel reloads the counters, and the counting process repeats.

Circuit U22 uses the pulse signals from NORgate U19A, output QD of counter U20, output QA of counter U21, output QB of counter U21, the IL1SYN signal, and the clock signal IL1CLK to generate a B2FS pulse, immediately preceding the B2 time slot, a B3FS pulse immediately preceding the B3 time slot, and a B4FS signal immediately preceding the B4 time slot. The IL1SYN signal immediately precedes the B1 time slot. Using the SA0, SA1, SA2 and SA3 signals, the crosspoint switch U23 routes the IL1SYN signal, the B2FS signal, the B3FS signal and the B4FS signal to any one or more of the analog interface 70 (POTS1FS), the analog interface 72 (POTS2FS), the DTMF detector 75 (DTMFFS) and the voice mail circuit 76 (VMAILFS). When one of these pulses is applied to one of these devices immediately before a time slot, that device inputs and/or outputs the data signals on the local PCM bus in that time slot. Thus, if the IL1SYN signal is routed to VMAILFS, the signal in the B1 time slot will be associated with the voice mail system 76. If the ISDN device assigns the B1 time slot to a call using POTS line 1, the IL1SYN signal will be routed through switch U23 to POTS1FS. On the other hand, for instance, if an analog telephone on POTS line 1 goes Off-Hook, the microprocessor U1 software will define that that line will communicate over channel B3 until such time as the local exchange assigns a B1 or a B2 time slot. Accordingly, B3FS signals will be routed to POTS1FS, and the internal communication involving a station on POTS line 1 will take place on the B3 channel. Additional software will selectively put B1 data from microprocessor U1 into slot B3 for sound generation. This allows the B1, B2, B3 and B4 time slots to be assigned to the CODEC for line 1 or line 2, the DTMF detector 75 or the voice mail processor 77. Additionally, cross point switch U23 can be programmed to route B3FS to both POTS1FS and VMAILFS, thereby effecting communication between POTS line 1 and the voice mail system 76. Each of the sync. signals is a short frame sync. (that is only one clock pulse long), and occurs immediately preceding the data for the assigned slot itself. Alternatively, a long frame sync. which envelopes the data (from the beginning to the end of the eight data bits in a B channel) could be used.

The U interface module 52 (FIG. 10) includes a commercially available U interface device, such as the commercially available MC145472FU integrated circuit. Alternatively, the Motorola MC145572FU integrated circuit can be utilized. Pins 2, 3, 10, 11, 14 and 15 of integrated circuit 52, which include the two-wire U boundary transmit and receive conductors, are connected to interface circuit 54. Interface circuit 54 connects the U interface module 52 to the RJ-45 port. The system interface circuit 54 includes conventional protection and isolation circuitry, such as transformers T200 (FIG. 10) or T203, filtering circuit capacitors C205, C206, C209, C210 and resistors R200–R205, and coupling and protection diodes D200, D201, D204, D206, D210, D211 and D212. DC and low frequency AC signals across decoupling capacitor 207 are rectified by diode bridge diodes D220–D223 and input to the sealing current circuit 100. The sealing current circuit 100 includes current sources and current sinks implemented using transistor Q200–Q205 and effect the required ANSI sealing current functions. ANSI definitions require that the sealing current circuit cut-in at approximately 35 volts, which in this invention is set by Zener diode D224 as driven by the current source 102. Current source 102 includes transistor Q200, resistors R226, R229, R233, and diodes D227, D228. When the voltage exceeds 35 volts, the current from current source 102 turns on Darlington pair Q202, Q205, which sinks current under the control of transistor Q203 and diode D233. The current source 104 around transistor Q201 will latch the current sink 106 into a conductive operating level using light emitting diode 108 of optical coupler U205 as a voltage reference which sets the unlatched current level. The optocoupler U205 also generates an output signal supplied through an inverter U313C to microprocessor U1 when a current is present on the local exchange two-wire pair 56. Optocoupler U205 is preferably implemented using commonly available MOC5008 or H11LI integrated circuits which create input hysterisis. Input hysterisis reduces noise and prevents chattering on the slow edges of the current wave form on the two-wire pair 56. A Zener diode pair D225 and D226 limit the reference voltage fir transistor Q203 to reduce the current in transistor Q205 when the DC voltage output by rectifiers D220–D223 exceeds 60 volts. This current limitation reduces the heat dissipation of Q205 when larger voltages are present on pair 56. A capacitor C211 connected to the base of transistor Q202 provides a time constant to slow the changes in sealing current, so that circuit 100 does not output a signal which disturbs the high speed data active on the U wires 26 when circuit 100 is sinking a sealing current.

Pins 43–46 of U interface module 52 (FIG. 10) are connected to the four-wire network PCM bus 58 (FIG. 3). The connection to the PCM bus includes the transmit (TXD; FIG. 10) pin, the receive (RXD) pin, the PCM bus clock, and PCM bus sync. signals. These four pins are connected to pins 11–14 of the S/T port module 60 (FIG. 9) and S/T local module 62. Modules 60 and 62 are preferably provided by Motorola integrated circuits MC145475DW, and are strapped in an "NT1 Star" mode. This connection allows more than one ISDN terminal equipment device to share the network PCM bus 58 and communicate with the local exchange using the CCITT standard protocol while supplying electrically isolated S/T interfaces. Pins 33–35 of integrated circuit 52 and pins 15–17 of integrated circuits 60 and 62 are connected to the microprocessor U1 to receive the receive enable signal SPRXD, the transmit enable signal SPTXD and the clock signal SPCLK. Each of these three signals is communicated over the serial bus 53 and output from serial controller 55. An input pin 38 of integrated circuit 52 is connected to microprocessor U1 to receive a SPU/SAO enablement signal when U-port module 52 is to communicate commands or data over the serial peripheral control bus. Similarly, integrated circuits 60 and 62 have input pins 18 connected to receive respective enablement signals SPNTA/SA1 and SPNTB/SA2 tom microprocessor U1. Each of the S/T and U controllers include an input connected to receive a reset signal from the output of data latch U27 when a system-wide reset is generated.

The S/T port module 60 (FIG. 9) includes pins 2, 3, 26 and 27, which include two transmit pins and two receive pins. These pins are connected through interface circuit 63 to the S/T interface port 28. The interface circuit 63 includes conventional protection components D238, D239, transformer windings T202 and T201 and filtering provided by inductors L200, L201, capacitors C208, C214, C215, resistors R222, R214, R213, R206–R209, R213–R216 and protection diodes D202, D207–D211, D215–D218. The current set input at pin 1 of integrated circuit 60 is connected to ground through resistor R210. The interrupt pin 20 of integrated circuit U203 is connected to the interrupt bus to generate the interrupt request NTA signal IRQNTA for microprocessor U1 (FIG. 5). Additionally, the integrated circuit 60 echo input pin 10 is connected to the echo input pin 10 of integrated circuit 62 and to pin 8 integrated circuit 60. Pin 6 of integrated circuit 60 is connected to pin 8 of integrated circuit 62. Interrupt pin 20 of integrated circuit 62 is connected to the microprocessor U1 and generates the interrupt grant signal IRQNTB for interrupting microprocessor U1. The four-wire output pins 2, 3, 26 and 27 of local S/T module 62 are connected to the four-wire pins 26, 27, 2 and 3 of TE module 64. The two-wire side of local TE 64 includes an IL1TXD (the RXD pin), pin 13, and IL1RXD pin 14 (connected to the TXD pin), the IL1CLK pin 12, the request pin 9, the grant pin 5, and the sync. pin 11, which are connected to the local PCM bus 66. The request and grant pins are used for communicating D channel access requests between the TE module 64 and microprocessor serial controller 55. The interrupt pin 20 of TE module 64 is connected to the microprocessor U1 to output the IRQTE signal for the microprocessor interrupt logic. Pins 15–17 are connected to the serial bus 53 to receive the serial controller RXD, TXD and clock signals. The reset input pin 28 of integrated circuit 64 is connected to microprocessor U1 to receive a reset signal therefrom. The SPTE/SA3 enable signal is input to 18 of integrated circuit 64 to control the TE module serial operation. This novel back-to-back connection of the S/T interface modules 62 and the TE module 64 allows more than one device to share the local PCM bus 66 and allows the private exchange to access to the network PCM bus properly. In this way, access to the ISDN data stream is provided while allowing fully functional S/T output through TE module 64.

The power supply connections for power generator 50 (FIG. 3) to the interface circuit are provided through the connectors J8 and J9 (FIGS. 6, 8, 9 and 11). Connector J8 (see FIG. 9) includes low power pins 7, 8 (having a current of approximately 10 milliamps) driven through the data transformers T201 to appear as the phantom DC power potential between the transmit and receive data pairs at port 28. The polarity of this power supply indicates a CCITT defined emergency power condition, such that it is to be used only by designated low power TEs. Two pins 9, 10 of connector J8 are connected to pins 7, 8 of port 28, and allow up to 8 Watts of available power to be output, but only during primary power operation. Other voltages and control signals on connectors J8 and J9 are used internally. The power supply generator 50 is described in International Application NO. WO95/21485, entitled POWER SUPPLY FOR PRIVATE BRANCH EXCHANGE Published Aug. 10, 1995.

The analog interfaces 70, 72 (FIG. 3) between the analog ports 30, 31 and the local PCM bus 66 are described in greater detail in International Application NO. WO95/2149, entitled PRIVATE EXCHANGE POTS LINE INTERFACE, filed on Published Aug. 10, 1995, the disclosure of which is incorporated herein by reference. Accordingly, these interfaces are not described in greater detail herein. However, some aspects of these interfaces are described herein for convenience. The analog interfaces each include CODECs U300–U302 (FIG. 11) connected with the local PCM bus 66. CODECs U301 and U302 are connected to the local PCM bus 66 through a cross point switch U310. Switch U310 selectively connects one of the IL1RXD and IL1TXD conductors of local PCM bus 66 to the TXD and RXD pins of U301 or U302 so that the CODECs can drive/receive on either line for sourcing and sinking data to/from any other PCM device. The cross point switch U310 is controlled by the strobe signal on pin 7 and the SA0–SA3 routing signals. Integrated circuits U301 and U302 are connected to receive the IL1CLK clock signal at their clock input pins 10 and 9. Pin 12 of CODEC U301 is connected to receive the POTS line 1 enable signal POTS1FS. Pin 5 of CODEC U301 is connected to the output of ANDgate U311A. The inputs of ANDgate U311A are connected to POTS line 1 sync. signal and receive the POTSIFS and the POTS line 1 receive enable signal POTS1RXEN. Pin 5 of the integrated circuit U1 has a high logic level only when the POTS1 receive signal and the POTS line 1 enable signal are both at a high logic level. Similarly, integrated circuit U302 receives the POTS line 2 enable signal POTS2FS at pin 12. Pin 5 of integrated circuit U302 is connected to the output of ANDgate U311C. The inputs of ANDgate U311C are connected to receive the POTS2FS signal and the POTS line 2 receive enable signal POTS2RXEN. The receiver of CODECs U301 and U302 may be disabled by turning off (logic low level) the receive enable signal data such that CODECs will only output data in PCM and input analog signals for a monitor function. A third DTMF detector U309 is connected to the analog output pin 3 of CODEC U300 and receives DTMF signals from the local PCM bus 66 which originated at a remote location (an outside party). These signals include input DTMF commands for use by the private exchange in processing calls. This CODEC receive pin 6 is connected to the output of NANDgate U320C. The input of U320C is connected to the output of NANDgate U320B and U320D. The system may select one of two PCM data streams IL1TXD or IL1LXD to be the input to U300 using NANDgates U320A–U320D. The third CODEC U300 has input 5 connected to receive the DTMF 3 enable signal DTMFFS from time slot assignor 78 and clock inputs connected to receive the IL1CLK signal. Each of the analog lines also generates the POTS line 1 hook status and the POTS line 2 hook status signals, as described in the co-pending application (DAL02 P-302). Additional signals communicated with the analog interface include the ringing signal injection and the force Off-Hook injection commands FRCOH1 and FRCOH2.

The analog interfaces also include analog switches U314 and U315 for directly connecting analog lines 1 and 2 to provide an analog conference connection. Current summing is performed at the input of the CODECs so that analog conference signals may be input to the local PCM bus 66 from either CODEC U301 or CODEC U302. Current summing is also preformed for input signals to the analog phone lines. An additional switch in switches U315 and U314 allows the output at pin 3 of the third CODEC U300 to be connected to either analog phone line for tone insertion, voice mail monitoring, or message playback from the voice mail system 77.

The analog interfaces 70, 72 further include Telephone Analog Interface Circuits (TAICs) which have several analog path modes. In this system the TAICs are used primarily for operational amplifier isolation between the phone line and the digital network CODEC and gain control of signals from the digital output to the analog telephone. The gain of the TAIC integrated circuits are such that they have a range of +6 dB to −15 dB, and may be adjusted in 3 dB increments. The recovered analog receive signal from the internal op amp in the TAIC is routed to DTMF detector U308 and U307 for lines 1 and 2, respectively, to sense the number and symbol entry from the standard phones connected to the analog ports. The rotary phone input will be sensed as Off-Hook pulsing and detected by systems software which monitors the level and pulse-width of Off-Hook and On-Hook signals to determine if pulse signals are dial pulses, and if dial pulses, what number is being dialed. A divide by four generator U321B generates a 3.579545 MHz DTMF detector clock from the 14.31818 MHz clock signal used by the telephone answering machine.

The data ports 36–39 (FIG. 12) are connected to four RS232 transceivers U401–U404, respectively. The RS232 transceivers are implemented using commercially available Motorola MC145405 integrated circuits. Each of these ports U401–U404 includes five output pins 3, 4, 6, 7, 9 connected to the RJ45 jacks and three input pins connected to a respective RJ45 jack of ports 36–39. The transceiver pins 2–9 are connected to ground by capacitors C400–C407. These capacitors filter noise spikes on the pins of port 36 or pins 2–9 of transceiver U401. Each of the transceivers is wired similarly, and accordingly, only transceiver U402 is described in greater detail herein. Transceiver U402 receives an output Q of a first latch in U405 at pin 18 as an RS232 ring indicator signal. An output signal at pin 5 of a latch in integrated circuit U406 is supplied to the pin 12 of transceiver U402 as an RS232 data carrier detect signal. Pin 17 and pin 14 of transceiver U402 are connected to output pins 12 and 14 of the quad serial controller, which have DSR and CTS signals required for communication with a data port on a digital device. Pin 15 of transceiver U402 is connected to pin 17 of quad transceiver U400 and has the serial received data for output to port 36 thereon. All live of these pins are passed through the transceiver to the output pins 1, 2, 8, 5 and 10 of port 36. Pins 3, 6 and 9 from the port 36 are connected to the quad serial controller through transceiver U402. Pins 3, 6 and 9 of port 36 are connected to pins 2, 5 and 8 of transceiver U402. The output pins 13, 16, 19 of transceiver U402 are connected to pins 7, 11 and 10 of quad serial controller U400. These three pins include the DTR signal, the RTS signal and the serial data to transmit.

The quad serial controller U400 (FIG. 12) includes a reset input pin 37 connected to receive the reset signal from integrated circuit U27. Pins 16, 20, 50 and 54 are connected to integrated circuit U26 to receive the port select signals for the first port SER1CS, the second port SER2CS, the third port SER3CS and the fourth port SER4CS. Pins 66–68 and 1–5 of quad serial controller U400 are connected to the data bus 90 to input/output data to/from the microprocessor U1. The output enable signal is input to pin 52 of the quad serial controller U400. The clock signal is input to pin 35 of the serial controller. The interrupt signals from any one of the four ports are output through a NORgate U19B which outputs the IRQUART interrupt, which is a serial port interrupt applied to the microcontroller through ORgate U34A. The three address pins 32–34 of quad serial controller U400 are connected to the address bus 92 conductors IA2, IA1 and IA0.

Figure 13:
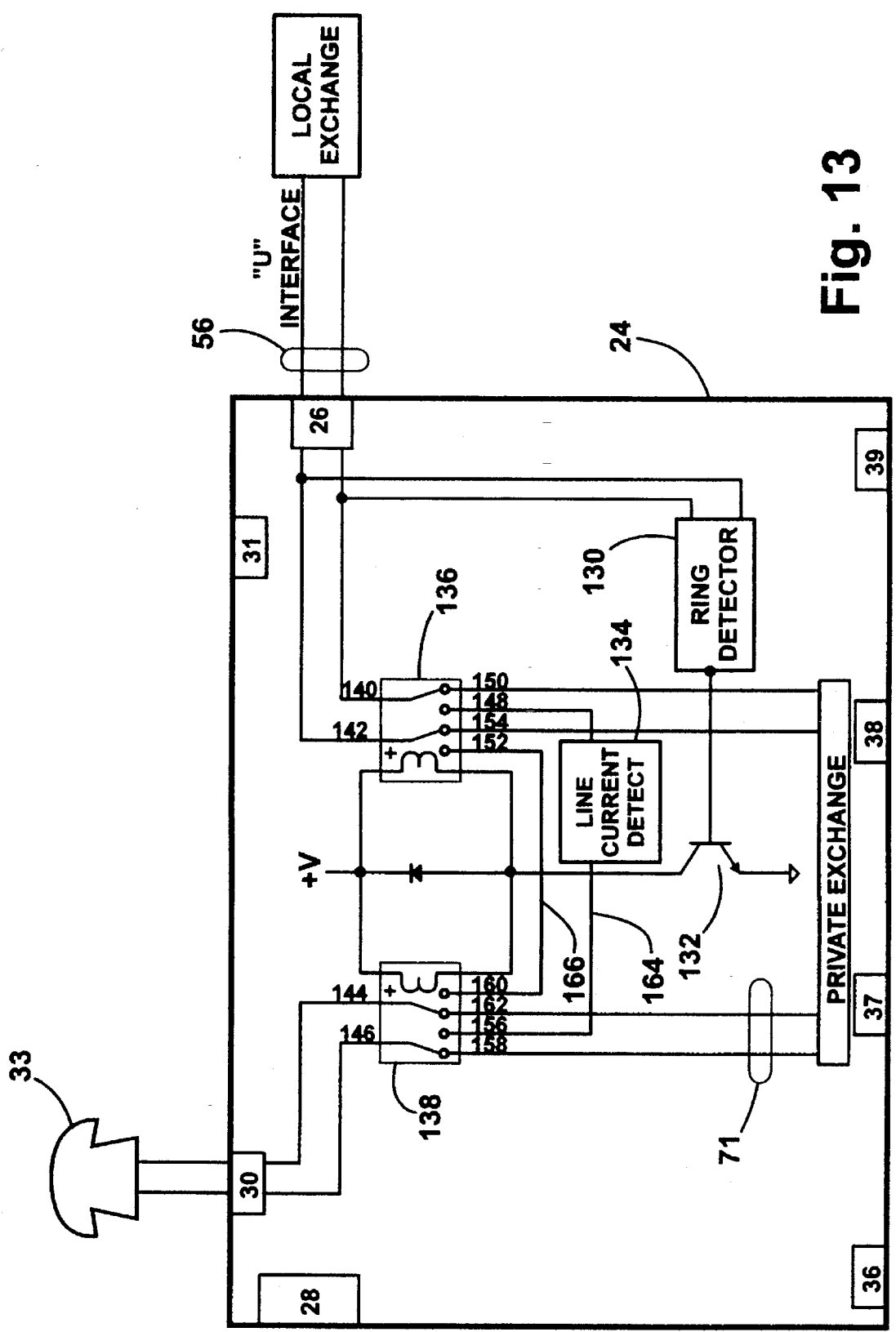

The private exchange 20 can include a private exchange circuit bypass 129 (FIG. 13) which connects the analog port 30 directly to the U-port 26 when the local exchange is a plain old telephone service exchange. To provide this feature, a sensor 130 is connected to port 26, which in turn is connected to the local exchange LE. Sensor 130 detects a ringing voltage signal on the two-wire pair 56 which is only present if the local exchange is a POTS exchange. Sensor 130 may be provided by any suitable commercially available ringing signal detector, such as an optically isolated voltage detector connected across the two-wire pair 56. The output of sensor, or detector, 130 is connected to the base of transistor switch 132. The transistor drives the coils of relays 136, 138 from a voltage supply +V. The coil of relay 136 is coupled to switches 140 and 142. The coil of relay 138 is connected switches 144 and 146. When the sensor 130 detects that the POTS exchange current is present, switch 132 is turned on allowing the current to flow through coils 136 and 138. These coils cause switches 140, 142, 144 and 146 to connect the pins of port 26 to contacts 148 and 152 and the pins of port 30 to contacts 156 and 160. Contacts 148 and 156 are directly connected by conductor 164 and contacts 152 and 160 are directly connected by conductor 166. Port 26 is thus connected directly to port 30. Additionally, if a user on port 30 goes Off-Hook and the private exchange has not yet established a valid digital connection, relays 136 and 138 will be activated to put the analog phone straight through to the local exchange LE. When the user hangs up at port 30 as detected by loss of line current (through detector 134) at the end of the current call, switches 140, 142 are connected to contacts 150, 154 and switches is 144, 146 are connected to contacts 158 and 162. The analog port 30 is thus connected through the private exchange circuit 24 and the private exchange circuit 24 is connected to the U-port 26. This ability to switch between the direct connection of the analog port to the POTS exchange is a significant advantage because the user typically does not know the exact time that the service provider will switch over from a POTS interface to a ISDN local exchange LE. The circuit bypass of the present invention automatically detects the change from a POTS exchange to an LE exchange by the telephone company, and provides the appropriate connection which allows the analog telephone set connected to port 30 to operate for either exchange. An analog phone connected to port 30 may thus communicate over either interface independently of the user's knowledge of whether the private exchange or the ISDN exchange is currently connected to port 26.

A possible usage of the exchange is illustrated in FIG. 4. This illustration shows six ISDN terminal equipment TE1 or terminal adaptors TA connected to the S/T port 28. Two analog telephones are connected to the analog ports 30 and 31, and four digital devices are connected to the digital ports 36–39. Although one analog device is connected to each analog port, each line is typically powered to support up to five total ringer loads (equivalences, or REN) These analog devices are connected in parallel on each line, although a distinctive ring signal can be provided for each telephone for the user to identify which device is being called. Additionally, it is envisioned that more than one digital device could be connected to each data port.

Figure 14:
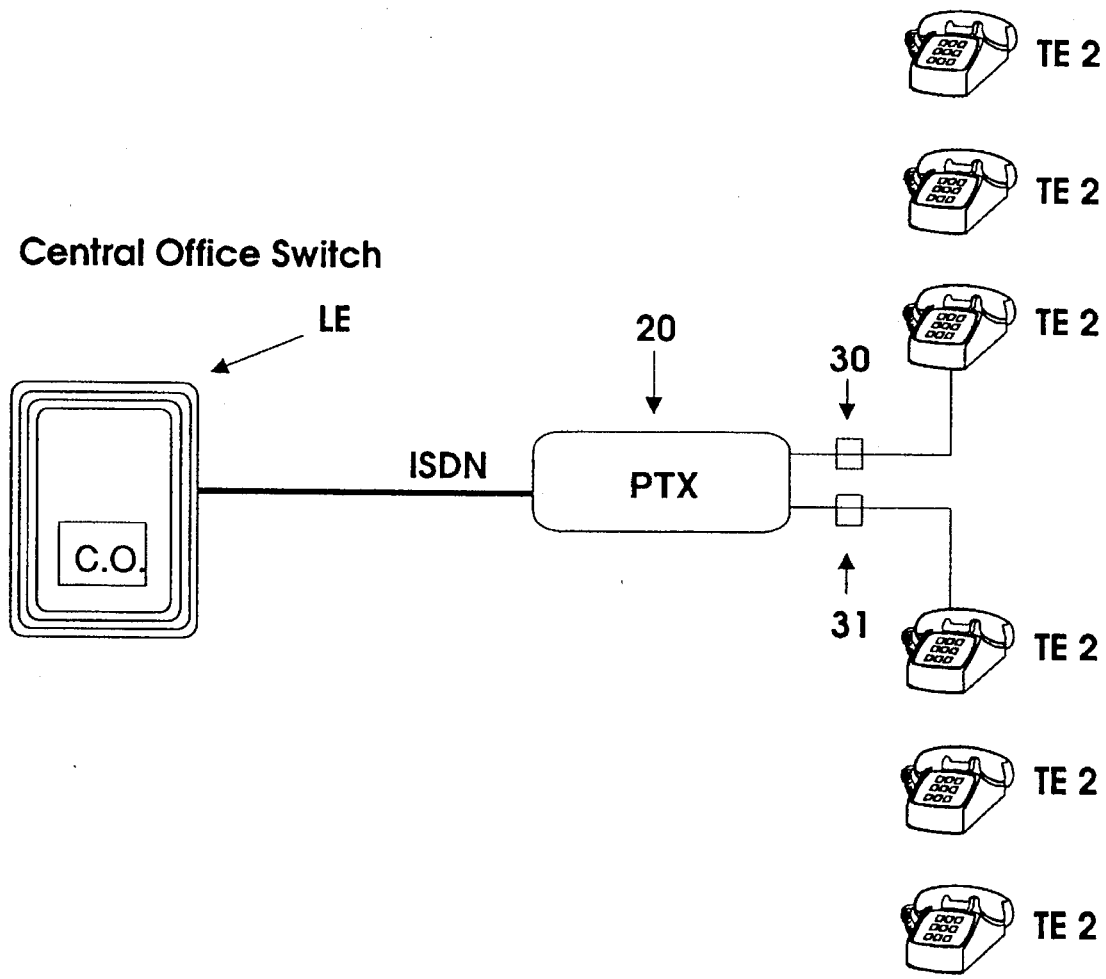
FIG. 14 is a schematic representation of a residential or small business application of the private exchange according to FIG. 1.
Figure 15:
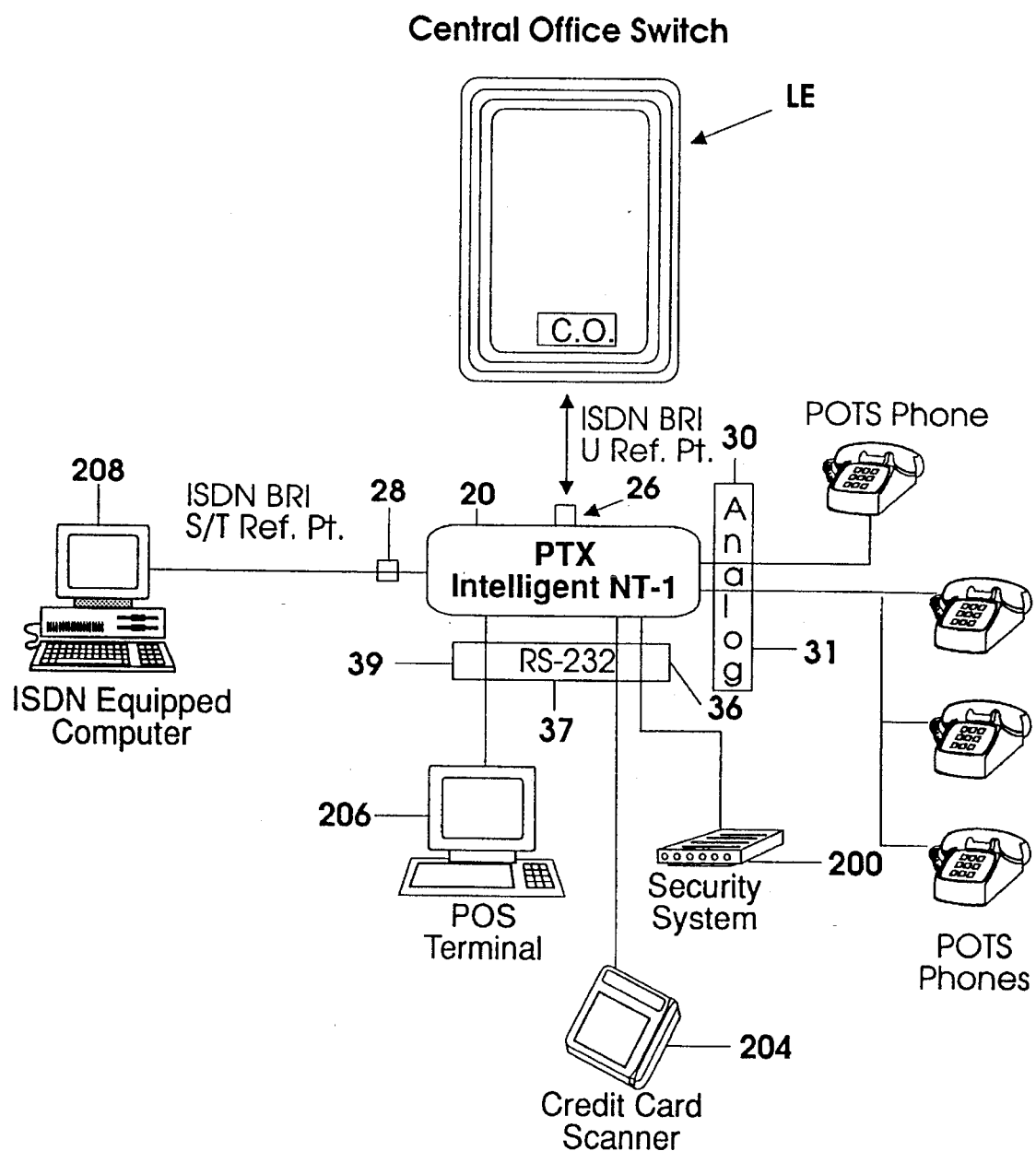
FIG. 15 is a schematic representation of a small business application of the private exchange according to FIG. 1.
Figure 17:
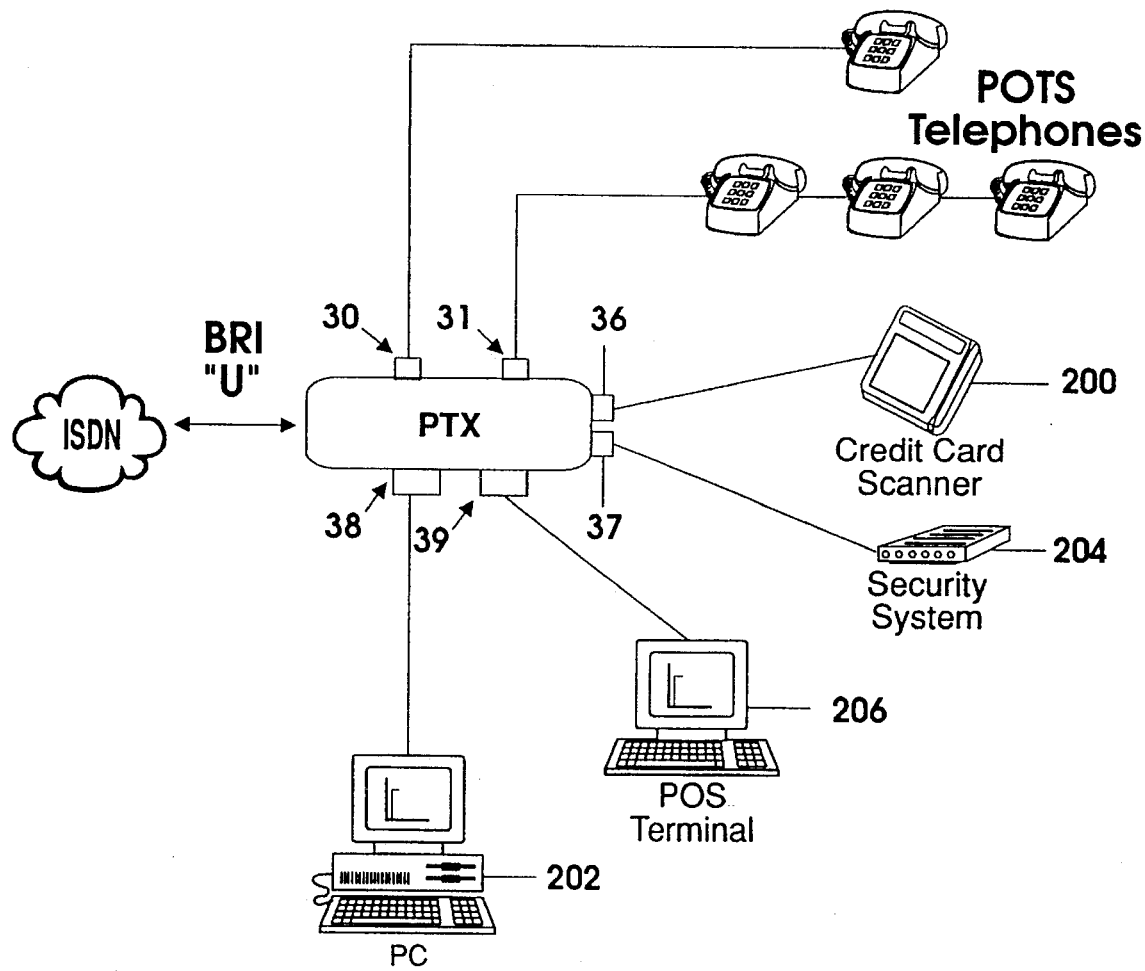
FIG. 17 is another schematic representation of a small business application of the private exchange according to FIG. 1.

A general residential and small business environment using a plurality of terminals TE2 is illustrated in FIG. 14. Terminals TE2 are connected to ports 30 and 31. In a typical small business environment, such as that illustrated in FIG. 15, the private exchange 20 has one POTS phone TE2 connected to port 30 and three POTS phones connected to port 31. A security system 200 (a security controller connected to various alarm sensors) a credit card scanner 201 and a conventional computer 204 are connected to data ports 36, 37 and 39. The S/T port 28 is connected to an ISDN compatible computer 208. This system allows a small business, such as a store, to provide a plurality of analog POTS phones, and to implement ISDN communication with both ISDN data equipment and non-ISDN data equipment through the private exchange. This is particularly advantageous since the small store does not have to purchase ISDN phones and ISDN security system, credit card scanner, and computer in order to connect these devices to the ISDN network central office LE. Another small business application is illustrated in FIG. 17. This system is identical to the system of FIG. 15, except that the personal computer 202 is not ISDN compatible, and thus is connected to a serial data port.

Figure 16:
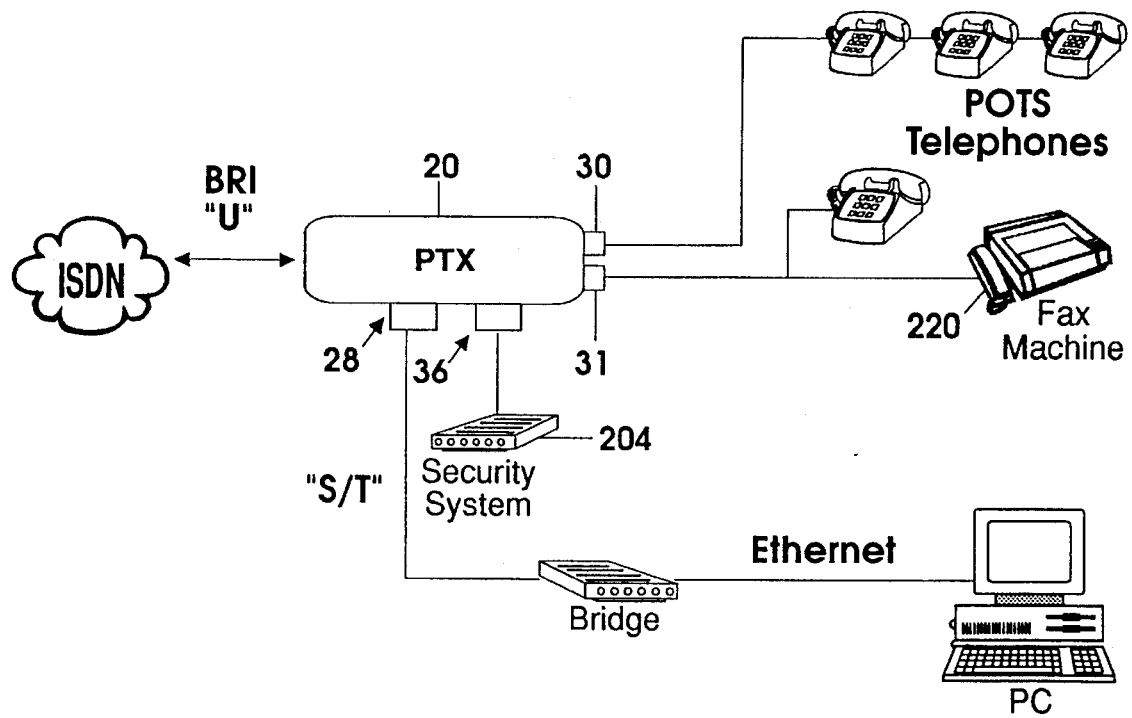
FIG. 16 is another schematic representation of a residential application of the private exchange according to FIG. 1.

A residential application is illustrated in FIG. 16. This residential application utilizes POTS telephones connected to port 30. A POTS phone and a facsimile machine 220 are connected in parallel to the analog port 31. A security system for the residence is connected to one of the data ports 36. A personal computer on a larger network is connected to the private exchange 20 S/T port 28 through a protocol-converting bridge device.

Figure 18:
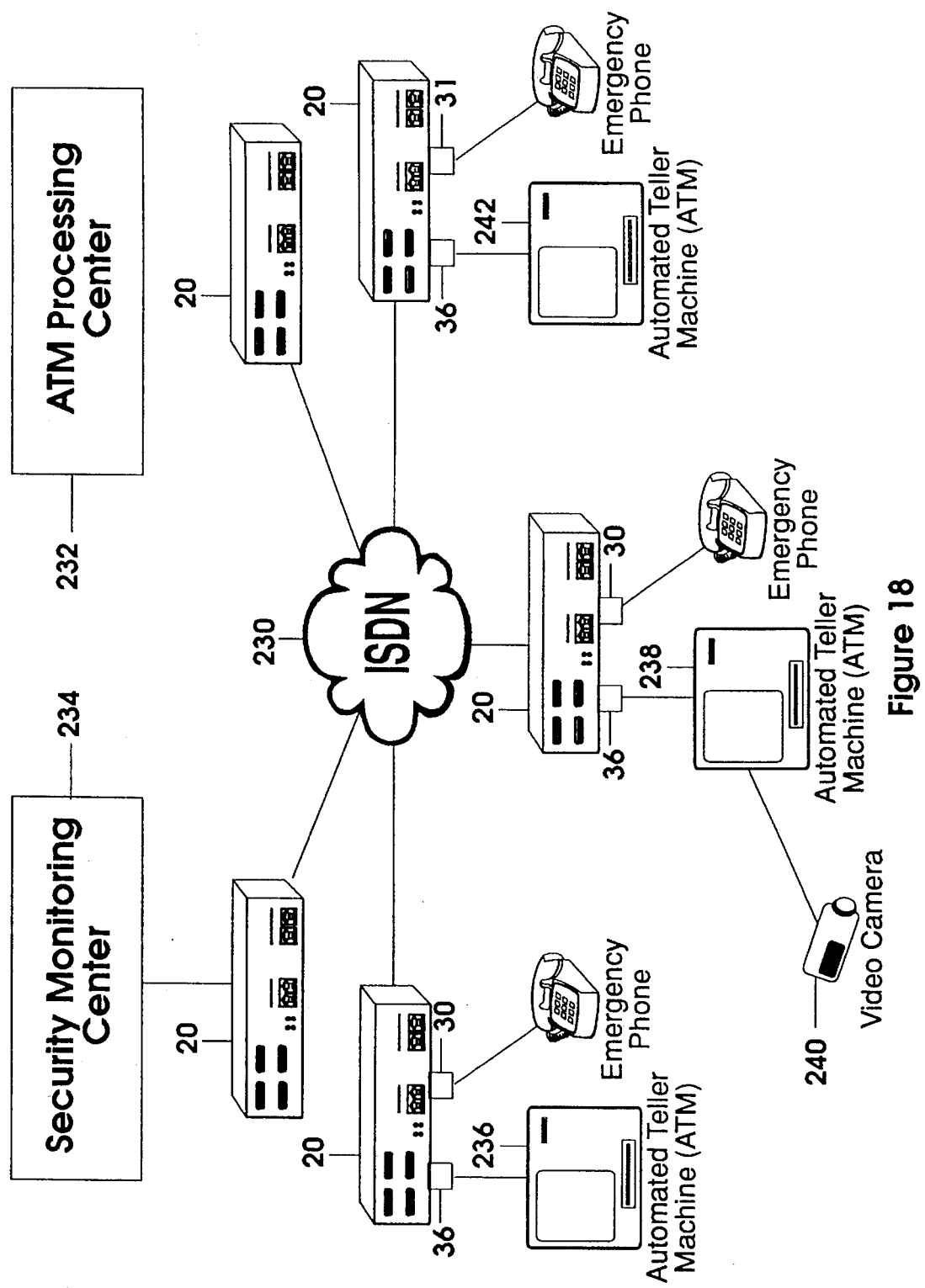
FIG. 18 is an ATM application of the private exchange according to FIG. 1.

A particularly advantageous ATM system is depicted in FIG. 18. This system uses five private exchanges 20 connected to an ISDN network 230. One of the private exchanges 20 is connected to the ATM processing center 232. Another ISDN private exchange 20 is connected to a security monitoring center. The other three private exchanges 20 are located at respective banks having automatic teller machines. The automatic teller machine 236 is connected to one private exchange data port 36. An emergency phone is connected to port 30 of private exchange 20. Another bank has a video camera 240 connected to an automatic teller machine 238. The automatic teller machine 238 is, in turn, connected to data port 36. An emergency POTS is also connected to analog port 30. At the other bank, automatic teller machine 242 is connected to port 36. An emergency telephone is connected to port 31 of that private exchange 20. This ATM system provides an analog and digital network to be established for the security monitoring center, the ATM processing center, and a plurality of banks.

Figure 19:
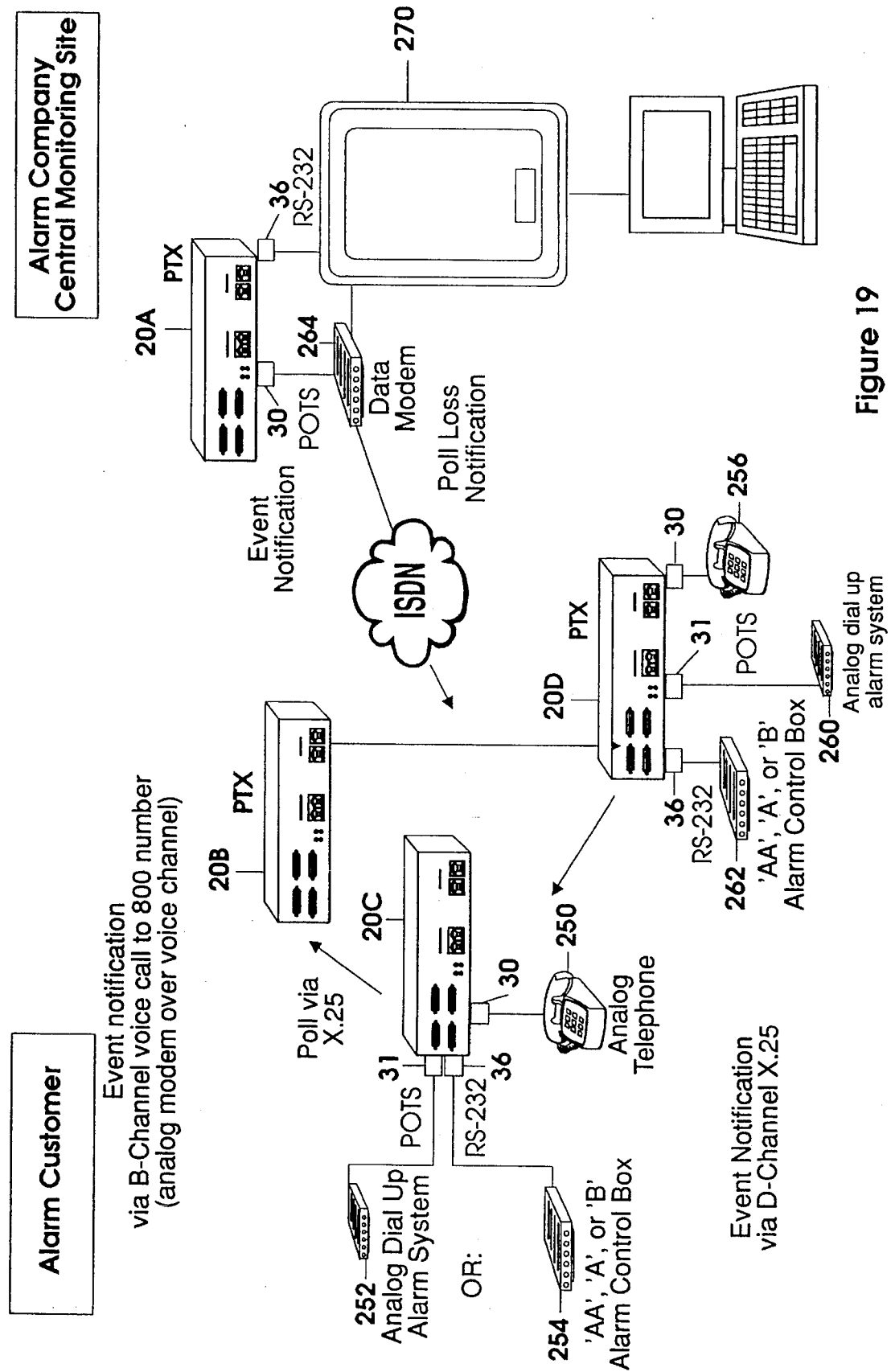
FIG. 19 is a schematic representation of a security alarm network employing a private exchange according to FIG. 1.

Another envisioned application of the private exchange is a security alarm network. The security alarm network is illustrated in FIG. 19 and is implemented at a private exchange 20A, a private exchange 20B, a private exchange 20C and a private exchange 20D. Exchanges 20B, 20C and 20D are connected to the ISDN network. The alarm customer includes an analog telephone 250 connected to port 30 of private exchange 20C. The customer also has an analog dial-up alarm 252 connected to analog port 31. A digital alarm control 254 is connected to a data port 36. The alarm system also includes a private exchange 20D connected to an analog telephone 256 at port 30. An analog dial-up system is connected to analog port 31. An alarm control box 262 is connected to a data port 36. At the alarm company, a data modem 264 is connected to the ISDN network. An output of the data modem 264 is connected to port 30 of private exchange 20A and a data output is connected to the control computer 270. The control computer 270 is connected to a data port 36 of exchange 20A to communicate data therebetween.

It can be seen from FIGS. 14–19 that a great deal of versatility is provided by the private exchange according to the present invention.

The operation of the system will initially be described with reference to FIGS. 1–12. Initially, it is noted that there are two analog POTS lines provided through ports 30 and 31. Each of the analog POTS lines can have up to five analog POTS ringer-equivalence loads connected thereto. If one of the analog devices on line 1 goes Off-Hook, e.g., an analog telephone handset is lifted off the cradle, the microprocessor U1 assigns the B3 channel on the local PCM bus 66 for analog interface 70. The microprocessor sets up to create the dial tone signal from memory 83 and outputs the PCM signal onto the local PCM bus 66. The dial tone signal will be output from the microprocessor U1 in the B1 channel time slot. This B1 signal will be shifted into the B3 time slot by shift register U24. The output of shift register U24 will be selected by PLA U22 as the IL1TXD signal as the TX302B3 signal from microprocessor U2 will be the active signal. The B3FS signal will be routed to the POTS1FS output of crosspoint switch U23 such that POTS line CODEC U301 is enabled during the B3 time slot. The PCM signal is thus applied to CODEC U301. If a telephone connected to POTS line 2 goes Off Hook, the POTS line 2 CODEC U302 is similarly assigned channel B4 and CODEC 72 is enabled by sync. signal B4FS being output on POTS2FS pin of crosspoint switch U22. If a call input to the private exchange 20 from a remote location is requested to input DTMF signals to control processing by microprocessor U1, for example, the remote caller is requested to input a control code to the microprocessor by a message stored in DRAM. To effect a call routing for a desired operation, the microprocessor U1 will output an address SA0–SA3 to switch U23. This incoming signal from the remote location will be on channel B1 or B2 as already assigned by the local exchange. If the signal is on channel B2, the B2FS signal will be routed to the DTMF FS output pin 10 of crosspoint switch U23 under the control of the address signals such that the user's input commands will be applied through CODEC U300 to the input of a DTMF detector U309. DTMF detector U309 will, in turn, output coded key number signals which are supplied to integrated circuit U38 which inputs the U38 signals onto the data bus for processing by microprocessor U1.

The voice mail system 76 may communicate with analog ports 30, 31 or TE terminal 64. Analog ports 30 and 31 will communicate with the voice mail processor in the B3 and B4 time slots. The TE module 64 will communicate with the voice mail processor in the B1 and B2 time slots, since the TE terminal communication is employed when a remote caller is using the voice mail system. Regardless of the source of the signals on the local PCM bus 66 which communicates with the voice mail system 76, the core microprocessor U1 will delegate the direct memory access function to the voice mail microprocessor 82 so that the core microprocessor may perform other functions. This is accomplished, as described above, using a handshaking technique wherein each time data is read out from, or input to, voice mail microprocessor 82, microprocessor U1 increments its address on pins IA0–IA23 from a starting address to an ending address. When the microprocessor U1 reaches the ending address, direct memory access will be terminated. The voice mail microprocessor 82 may then request additional memory access if additional data is to be stored for a particular voice mail operation.

As indicated above, the voice mail system 76 may be accessed from externally of the private exchange 20. To access the voice mail from externally, a call is made to the private exchange identifying the address of the voice mail processor 76. The microprocessor U1 generates a control signal through U23 which indicates that the incoming signal is routed to the voice mail system 76. The call is thereafter processed through the digital answering machine 76. The voice mail microprocessor 82 is controlled by microprocessor U1 such that it generates voice prompting signals which are stored in memory 83 and request that the calling party take certain actions. For example, the voice prompting will suggest that actions include entering a code which allows all messages for that user to be replayed. The user may alternatively gain access from a local station when they are Off-Hook, as described in greater detail hereinbelow.

The memory 83 uses a variety of memory types. ROM memory is used for storing permanent software which allows other software instructions to be dynamically stored. FLASH ROM is used to store large blocks of program instructions, which may be changed on an infrequent basis, such as operating protocols. EAROM is used to store critical parameters which may be changed infrequently by the user. Protected RAM is used to store data changed frequently such as rate tables. Also stored are routing information, current call status, current session information, and the like. The DRAM is used for voice mail, and flawed DRAM is used because it is less expensive and missing a few bits will not seriously degrade a stored message.

More particularly, the private exchange according to the preferred embodiment includes a message based operating system (OS). The OS provides multi-tasking, memory management, timer services, inter-task communication through messages, and system logging. The OS provides foreground, background and interrupt level processing. Foreground processing is through messaging, background processing is through poling when the system is idle, and interrupts are executed in response to an external device (e.g., the serial port interrupt). Each time a task is initiated, it continues to run until the message is completely processed. Additionally, although the OS is utilized in the illustrated embodiment, those skilled in the art will recognize that any suitable operating system could be used for microprocessor U1.

The system utilized for the microprocessor U1 and U-port module 52 includes software for managing signaling and data packets on the ISDN local loop. This traffic uses the D channel, as noted above. The underlying software components of the private exchange which implement signal management and data packet transfer is based on software available from Telesoft, Inc., for the Motorola ISDN microprocessor U1 illustrated in the preferred embodiment. However, this code has been modified in order to provide the novel system disclosed herein.

Communication involving the local exchange and the S/T ports must be in accordance with CCITT standards. Thus, the software utilized in the U-port module 52 and the microprocessor U I utilizes protocols, frame formats, cycle redundancy checks and bit stuffing procedures dictated by Q.921 recommendations of the CCITT.

The microprocessor U1 uses three layers of software and is implemented using C++ objects. The network layer signalling establishes, maintains and terminates network connections between two terminating ends. The protocol used is specified by CCITT recommendation Q.931, which describes signalling message content and usage. Each supported protocol (AT&T 5ESS Custom, National ISDN-1, and National ISDN-2) has different signalling requirements which are handled by the network layer signalling. The network layer packet is at the terminal data level. It provides connection establishment, sequencing, flow control, reset and similar functions to communicate with the network layer signalling according to procedures described in CCITT recommendation X.25.

The network layer packet and the network layer signalling are interfaced by a coordinating layer. This coordinating layer communicates the ISDN management operations, which include TEI administration, error handling, and so on.

The Telesoft software provides services typical to a standard ISDN terminal, but are limited to servicing one ISDN terminal. This software allows simultaneous voice and data connections, but does not allow two simultaneous voice connections. The present invention uniquely provides simultaneous support for two analog telephones on the two B channels. The private exchange 20 also creates two ISDN terminals using the TE local module U302 and the microprocessor U1. In order to support multiple terminals, the microprocessor provides respective software resources for each terminal. Upon initialization, two analog terminal objects are created by the software. Thereafter, each of these private exchange terminals communicates with the microprocessor U1 by sending messages to its respective terminal object. The terminal objects, in turn, communicate with the higher level software which implement the ISDN signalling and routing operations.

The microprocessor U1 uses each terminal object to process incoming switch messages from the coordinating module and performs messaging and data packet communication. The microprocessor uses the terminal objects to process incoming LE switch messages for the respective analog and digital ports and invoke higher level routines as necessary. These nay include call appearance objects (during a call) or appropriate PAD objects. The terminals also create new call appearance objects to handle incoming calls and invoke higher level resources, as needed. The same set of terminal objects handle messages from the higher level software which generally formulate a message for the switch and send it to the coordinating entity.

The coordinating entity interaction with the switch for voice calls is based on call appearances, and data calls through logical channels, called ISDN service objects. Every call known to the private exchange microprocessor U1, whether initiated externally through the local exchange or initiated internally through a local subscriber station, is treated by the microprocessor as an ISDN service object. The object maintains all pertinent information about the data or voice call, such as the connection ID corresponding to the call, the private exchange resource that owns the call (e.g., line 1, line 2, data ports 1, 2, 3 or 4, or voice mail), the B channel to which the call is attached (i.e., B1 or B2) and the controlled condition of the call, which may for example, be muted or on hold. Each ISDN service object is owned by an individual user resource. A user resource is an analog telephone, the voice mail system, a digital port or the pager system. In the private exchange, each individual resource is controlled by an object for that resource. This object maintains all information about the resource's status. For example, a line may be: On-Hook, Off-Hook waiting for disconnect completion, or Off-Hook with an active call appearance connected. The resources also include the current ISDN service objects and any ISDN service objects that are on hold.

Each analog line has a corresponding line object, as described briefly above, and a corresponding line control object controlling the POTS hardware interface. The line object processes signal inputs tom the line control which include hook-switch flashes, going Off-Hook, going On-Hook, and keypad or dial pulse entry. The line object also processes messages from the switch for call appearances which have been routed to the line (i.e., a call which identifies the particular number associated with a line). The line object also implements the user telephone interface. The microprocessor U1 uses the line object to determine the mode that the line is in and initiates the correct sound for the line based on that mode. The sounds include ring back, dial tone, a busy signal, and POTS sounds, as well as prompting signals. These sounds are stored in memory 83 for microprocessor U1 in a PCM format such that when they are output through an analog interface 70 or 72, the desired analog sound is generated by the analog telephone. The user will thus believe that they are connected to a POTS exchange.

The microprocessor U1 uses the line objects to perform call management, such as taking a call off hold, ringing the telephone when the user hangs up with the call on hold, and initiating special services such as all transfer and conferencing. The line objects are also used by the microprocessor to invoke the menu command objects needed to process user commands. In most cases, the line object will communicate directly with the appropriate call appearance object. Once the new call appearance object is associated with the appropriate line object, the call appearance object and the line object are attached. Thereafter, when a new message comes from the local exchange for a call appearance, the line object is invoked directly from the call appearance object.

If one of the line objects is initiating a call, microprocessor U1 allocates a new call appearance from the terminal with a matching billing number, and then invokes the appropriate method of the call appearance object to perform the call setup with the local exchange. Thereafter, whenever the microprocessor U1 wants to work with a call appearance object, it invokes the line object and call appearance object directly. Similarly, whenever the microprocessor U1 wants to work with a line object, it invokes the line object from the call appearance object directly.

The microprocessor U1 line control is a fairly low level hardware driver for the line. It provides initialization of the SLIC, the CODECs and the DTMF detectors. The line control methods perform functions such as connecting/disconnecting line 1 or 2 from the particular B channel, volume control and ringing generation control. The line control also effects line event handling. Thus, the line control is responsible for determining when a state change has occurred such as On-Hook to Off-Hook transition, Off-Hook to On-Hook transition, DTMF key actuation, and dial pulsing. The line control sends the appropriate event message to the attached line object.

When the microprocessor U1 constructs a line object, it creates and attaches a new user command object. Whenever the microprocessor is in dial mode for a line, each keystroke received for the line object is sent to the attached user command. The microprocessor uses the user command to process the keystrokes according to user interface rules, private exchange menus, and accepts commands and arguments. Once a valid menu command, short cut key command, or extension dial sequence has been input, the microprocessor uses the line command object to invoke the handling routine required for the command processing object. If the keystrokes cause the microprocessor U1 to enter the call mode, the microprocessor outputs appropriate status, using the line object, to process the call. The microprocessor U1 uses the user command to provide audible feedback which may be in the form of voice prompting or error and accept tones.

In operation, for an incoming call which originated from the local exchange switch, the incoming signal is input through the S/T modules 62, 64 to the serial controller 55. The serial controller 55 invokes the terminal message handler in microprocessor U1 to route the message, responsive to which a call appearance object is created by microprocessor U1 to handle the new call. Information about the incoming call is stored in the call appearance object. A message about the connection request is then sent to the user resource object which decides what to do with the call and invokes the appropriate resource specific objects. More specifically, the user resource invokes a method route to the resource and the call routine object to determine what specific resource should receive the incoming call. The user resource object then invokes the appropriate method to signal the resource object.

The message handler also includes routines to change the call routing configurations, routines to handle user initiated events (e.g., On-Hook), sound generation requests, and keypad activities from the line control object.

Figure 20:
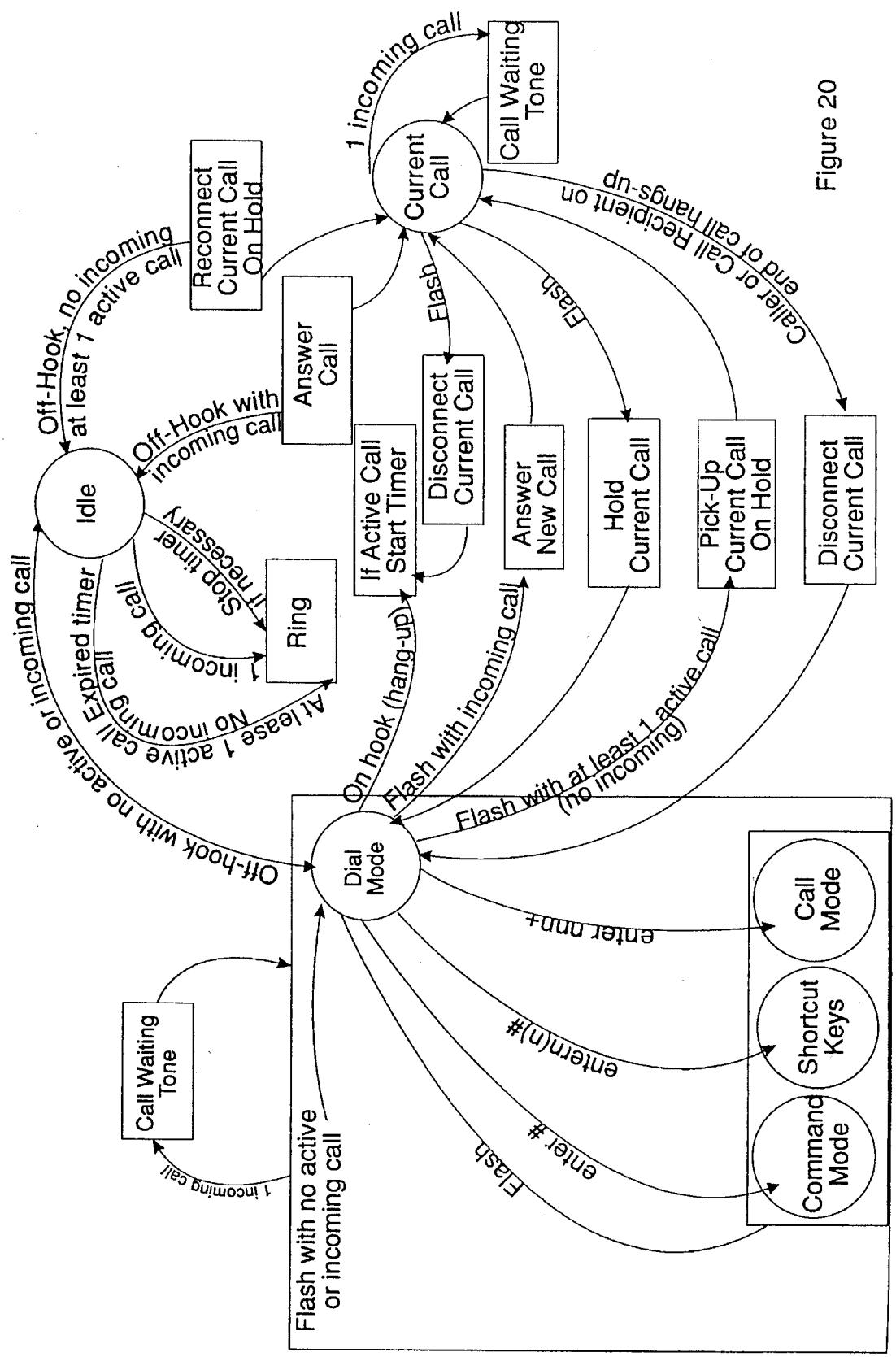
FIG. 20 is a state diagram representing operation of the controller according to the invention.

The operation of the private exchange will now be described in greater detail with reference to FIG. 20, which is a state diagram for the private exchange upper-level line handling of a line object. The following terminology will be helpful to understanding the state diagram. An active call state means that an active call has been accepted at its destination, which may be local acceptance of an incoming call or remote acceptance of an outgoing call. A call is considered active even if it is not currently being accessed (e.g., when it is on hold). A current call is an active call if it is currently being accessed, which means that the caller and recipient are interconnected in a communication mode. A current call on hold is the last current call which was put on hold by the user flashing the hook switch. Call management instructions are keystrokes providing a desired operation, as described in greater detail hereinbelow. Call management entries may be effected when a current call is on hold. The incoming call is a call originated by an outside caller coming into the PTX system. An outgoing call is a call initiated by a user of the local exchange to an outside party. A caller is a person placing a call. A call recipient is a user accepting a call.

When a POTS line 1 or a POTS line 2 phone is "Off-Hook," the line object is in the dial mode before an input command is made. As indicated in FIG. 4, it enters the dial mode if the phone goes Off-Hook with no active or incoming call. The microprocessor U1 will then provide dialtone to the Off-Hook analog telephone by downloading the appropriate PCM signals to the local PCM bus 66, which PCM signals are converted into analog signal by CODEC U301, U302 and result in appropriate analog call progress signals (ringing, busy tone, etc.) on the analog line. To generate these call progress tones, the PCM encoded signals are stored which duplicate the analog signals from a POTS exchange when converted to analog. The sync. signals POTS1FS or POTS2FS output from U23 will continue to enable the CODEC associated with the Off-Hook telephone line. From the dial mode, the user can enter a telephone number to be called (seven or more digits), enter the all management instruction mode, or access a command mode (including access to the voice mail system 76). If the user dials an external number, three or more digits, the number will be processed by the microprocessor U1. Microprocessor U1 will make a request for connection to the local exchange LE. The local exchange LE will assign the B1 or B2 time slot to the call upon granting the call request. If the call is not able to be completed, a local busy signal is issued, as described above. If the call is accepted by the remote call recipient, communication begins in the B1 or B2 time slot allocated by the local exchange LE. The call then becomes a current call.

The system can also receive incoming calls from the local exchange LE and modules 62, 64 through the network PCM bus 58. These incoming calls will be routed to the device identified by the incoming call request. Thus, if an incoming call request is directed to the number associated with POTS line 1, a ringing signal will be generated on POTS line 1

(RING). When a device POTS line 1 goes Off-Hook while the ringing signal is input to that analog line, the call is accepted (ANSWER CALL). The private exchange then enters a current call mode for that line. If there is an incoming telephone call during a current Call Mode, a call waiting tone is output to the port (30 or 31) whose line object is in the call mode. This signal provides an audible indication that there is an incoming call for the analog line. Following a call waiting tone, the called party can flash the hook switch which places the current call on hold and the private exchange enters the Dial Mode for that line. The user can then flash the hook switch again to answer the incoming call, at which time the private exchange will return to the current call mode with the previous call on hold. In the current call mode, the system may go On-Hook (which is to hang up causing the private exchange to Disconnect the Current Call). If there is an active call when the disconnect occurs, the microprocessor starts a timer. If there is no active call when disconnect current call state is entered, the private exchange enters the idle mode for the line and the timer is not started. If the user disconnects the current call while the active call is on hold, the active call timer will be started. After this timer times out, the microprocessor U1 will apply a ringing signal on the line which placed that active call on hold. When a telephone on that line goes Off-Hook, the active call on hold is reconnected and becomes a current call, the line object enters the current call mode for that line.

If the remote party hangs up before the local party goes On-Hook, the private exchange 20 microprocessor U1 disconnects the current call, and the private exchange enters the dial mode, and the active call timer will start if there is still an active call. If the private exchange is in the dial mode for one of the lines and there is no incoming call but there is an active call on hold, and the local user flashes the hookswitch, the active call on hold becomes a current call. If an incoming call occurs with all the telephones associated with port 31 or 32 On-Hook, the telephones connected to that port will ring until the caller goes Off-Hook.

From the dial mode, the user can enter a command mode, a call management instruction, or a call mode, as described in greater detail hereinbelow. In the command mode, the call management instruction, or the call mode, the call waiting tone is issued to the Off-Hook party when an incoming call occurs. The party may thereafter continue with their activities by ignoring the call waiting tone or flash the hookswitch to accept the incoming call and enter the current call mode.

Figure 21:
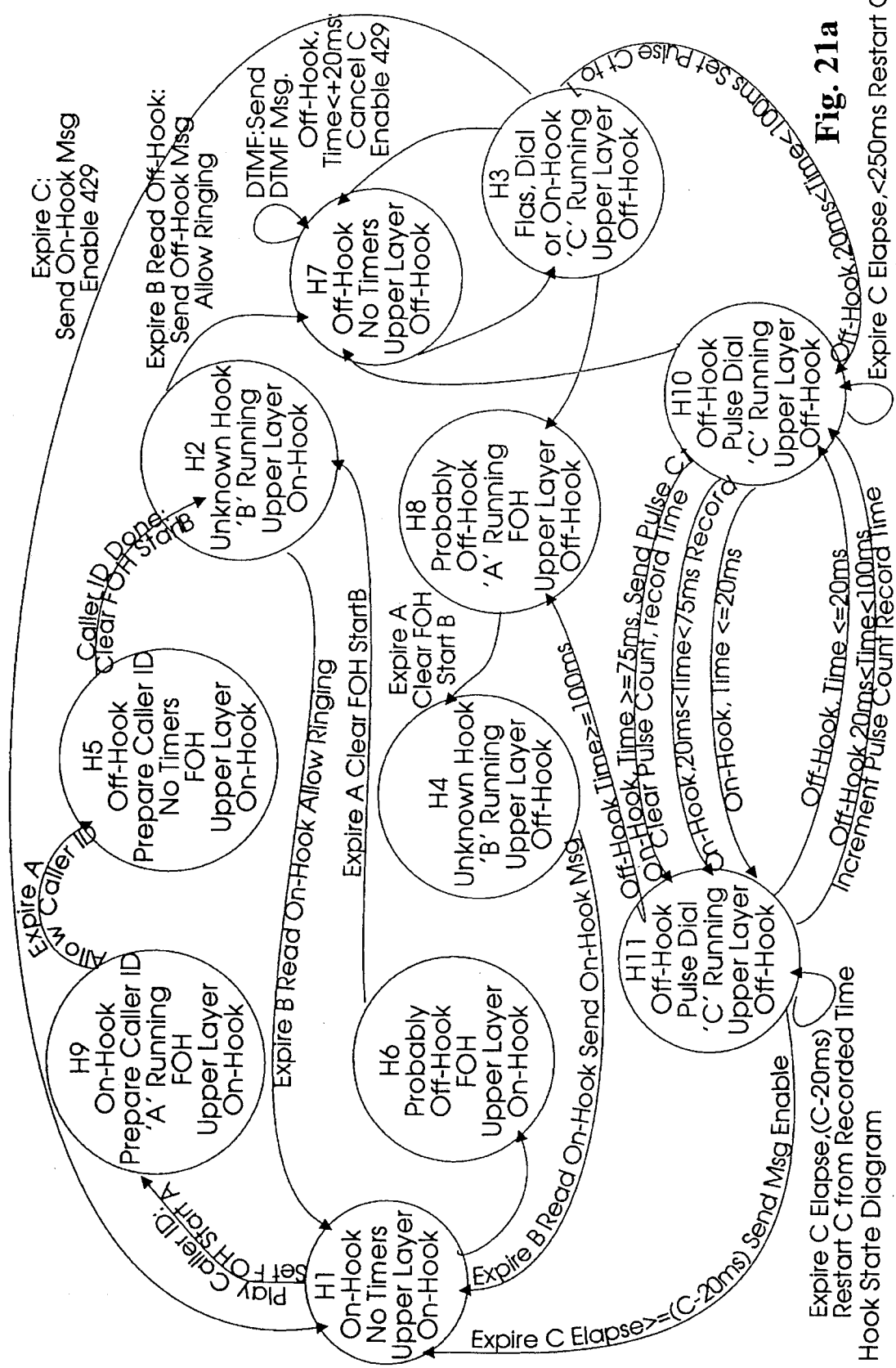
FIGS. 21a and 21b are state diagrams showing hook status monitoring for an analog port.
Figure 22:
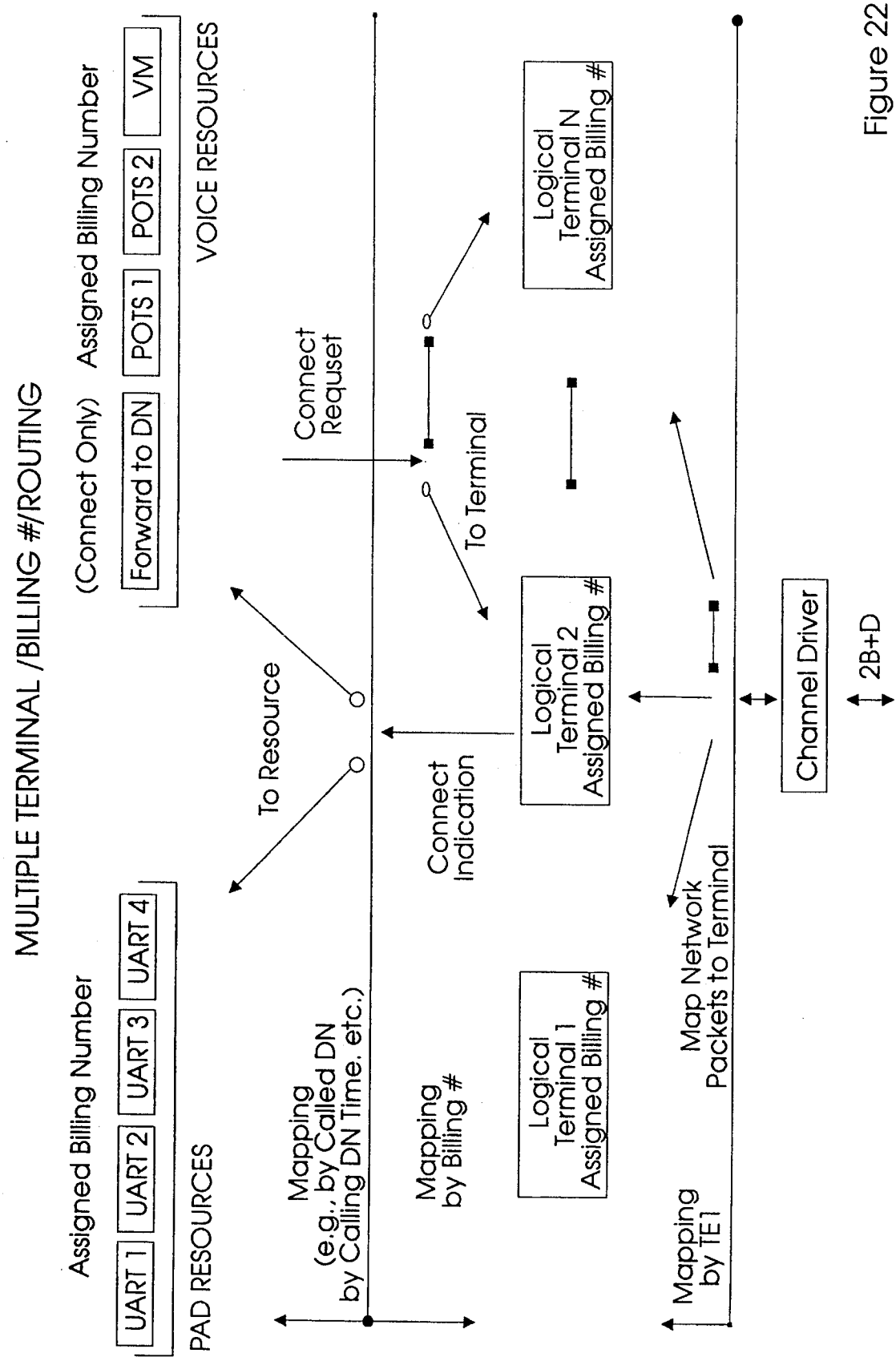
FIG. 22 is a flow chart of call routing.

The line control objects include eleven states for determining dial pulse hook states, and flashes. These states are identified by the references H1–H11 in FIGS. 21a and 21b. The line control object in microprocessor U1 for an analog subscriber line will be in state H1 when the local analog POTS lines 1 and 2 are On-Hook, the upper layer line object is not active, and the timers A–C are not running. From this state, when a call is incoming from the local exchange LE (FIG. 23), the 40 msec. timer A is started running with the forced Off-Hook current applied across the analog interface, and the caller ID is prepared, as represented by state H9. Upon expiration of timer A, the line control object for the analog line is allowed to go to an active state H5, where the analog line is electrically Off-Hook, to allow signal generation on the line. Caller ID is played to the analog line by downloading the constructed caller ID from memory 83 (FIG. 3) to the local PCM bus 66. At the conclusion of the caller ID, timer B is initialized, the forced Off-Hook condition is cleared, and the line control object enters state H2. From state H2, if the microprocessor U1 reads On-Hook condition at the expiration of timer B, the line control object returns to condition H1. If at the termination of timer B, the microprocessor U1 reads on On-Hook condition, an Off-Hook message is sent to the upper-level line object. The line control object then proceeds to state H7.

It should be noted that state H2 may also be entered from state H1 through state H6. State H6 is entered upon an analog device changing to an Off-Hook state. The forced Off-Hook condition is entered for 40 msec. (timer A) to allow the SLIC to power-up and ringing is prohibited. When timer A times out, the forced Off-Hook is terminated, timer B is initiated, and the line control object enters state H2.

In state H7, the timers A–C are disabled, the POTS line 1 or the POTS line 2 analog devices are Off-Hook, and the local exchange is Off-Hook. DTMF messages may be transmitted without leaving this state. Upon an On-Hook condition being detected state, H3 is entered, a timer C is started, and the TAIC '429 sound-output is disabled to silence the line. If the On-Hook condition is sustained for the 1 second time period of timer C, the On-Hook message is transmitted to the upper level, the TAIC '429 associated with the POTS line is reenabled, and the analog line control object returns to state H1. On the other hand, if Off-Hook is detected before the expiration of timer C, the signals are dial pulses or a hook flash. If the time period is less than or equal to 20 msec., timer C is disabled, and the line control object returns to state H7 (the On-Hook condition is switch bounce or other noise). If the time period is between 20 msec. and 100 msec., the time of the first pulse is recorded, the pulse count is set to 1, and the line control object goes to state H10. If the time period is greater than or equal to 100 msec. and less than 1 second, the flash message is sent, timer C is canceled, timer A is started, the forced Off-Hook current is started to stabilize the new Off-Hook transition, and '429 IC for the analog line is reenabled. Line Control Object (LCO) will thereafter proceed to state H8.

In states H10 and H11, the dial pulses are counted. If timer C elapses before 250 msec. has elapsed from the recorded time, C is restarted from the last recorded time. This provides an overall "last-digit" timeout of 250 msec. to 1 second to terminate the last digit of a pulse-dial stream. The terminal will count the number of pulses having a width between 20–75 msec. Upon the expiration of the 250 msec. time window, the pulse count is complete and the count is converted to a digit message which is the number dialed. The terminal then returns to state H7, with the IC '429 is enabled.

From state H10, there are three paths to state H11. If in state H10 an On-Hook time exceeds 75 msec., indicating the end of a pulse sequence, before the expiration of timer C, the current pulse count is a digit message which is the number dialed. The pulse count is cleared, the time is recorded, and the LCO enters state H11. If the On-Hook time is greater than 20 msec., but less than 75 msec., the LCO goes to state H11 after recording the time (this is part of a pulse dial). If the On-Hook time is less than 20 msec., the LCO goes to state H11, but ignores the time (it is assumed to be switch noise).

In state H11, the microprocessor U1 will restart timer C if it expires in a time period which is less than 20 msec. less than its maximum length (1 second). The timer is restarted from the last recorded time and is used to give a running timeout for the final digit or for an On-Hook reset. If an Off-Hook condition of less than or equal to 20 msec. is detected in state H11, the controller switches over to state H10, ignoring this pulse. If the Off-Hook condition is greater than 20 msec. and less than 100 msec., the pulse count is incremented as a valid pulse, the time is recorded, and the LCO returns to state H10. On the other hand, if in state H11, the On-Hook elapsed time is greater than or equal to timer C–20 msec., TAIC IC '429 is reenabled, an On-Hook message is sent, and the LCO returns to state H1, as the phone was placed On-Hook during pulse dial (presumably to abort the dial sequence). If in state H11, the Off-Hook time is greater than, or equal to, 100 msec, a hook flash is detected, C is canceled, timer A is started, the forced Off-Hook is set, TAIC '429 is reenabled, and microprocessor U1 enters H8. At the expiration of timer A, the forced Off-Hook is cleared, timer B is initialized, and state H4 is entered. If at the expiration of timer B, the line is Off-Hook, the LCO returns to state H7. If at the expiration of timer B the LCO is back On-Hook, the LCO returns to state H1.

Digital call progress tones, including a dial tone, a busy tone, a ringing tone and a call waiting tone, are typically generated within communications devices via hardware. The present invention provides a digital network compatible communications device as inexpensively as possible to cost effectively service a small number of ports. The immediate invention generates progress tones and caller ID services via software, avoiding the cost of hardware, and thus permitting the system to be manufactured within stringent cost requirements without sacrificing functionability.

The call progress tone patterns, consisting of tone frequency, amplitude and cadence, were taken as listed in CCITT Fascicle 11.2. Some tones, such as a dial tone, are produced from the summation of two frequencies.

Digital sound is produced by sampling the analog form of the sound 8000 times per second. The 8000 samples come from Nyquist's Theorem stating that the sampling rate be at least twice the highest frequency, which for phone communications is approximately 4000 Hz. Each sample is then encoded via an algorithm that a receiving CODEC (coder/decoder) will recognize, allowing conversion of the digital samples back into analog form. In North America, this encoding algorithm is known as u-Law encoding.

The software generation of digital sound thus becomes an exercise in properly deriving the numerical value for the analog form of the sound, and correctly providing the u-Law encoding for each sample. A sample set is produced and stored so that it may be transmitted repetitively, allowing the sound to be played for any multiple of the time to play the single sample set. The sample set size is balanced by several factors: the amount of storage required to store the sample set (which should be minimized), the rate of transmit complete interrupt processing (which should not be too frequent), and the inclusion of an entire period of the sound (or sounds) waveform(s).

The analog form of the sound, for sampling purposes, was generated via appropriate sine waves. For example, a call waiting tone is produced by a signal with a frequency of 440 Hz, which may be described by $SIN(880*\pi*t)$, where t is in seconds. The amplitude of this frequency was required to be −13 dbm0. This is the decibel magnitude comparison to the magnitude of a signal with 1 milliwatt of power across 600 ohms of resistance. A manual provided the reference value for normalized amplitudes of a maximum 3.17 dbm0 for a maximum normalized amplitude of 8159, allowing the calculation of the normalized amplitude of 3932 for 0 dbm0. Knowing the amplitude for 0 dbm0 allows the normalized amplitude calculation given any required dbm0 value. The −13 dbm0 required for a call waiting tone is thus calculated to be 197 normalized amplitude units. Thus, the call waiting tone analog equation becomes $197 * SIN(880*\pi*t)$. At 8000 times per second, a sample set of 1/10 of a second requires 800 samples, and so t is run from 0/8000 to 799/8000 to produce normalized amplitudes. These amplitudes are, in turn, run through an algorithm allowing the pseudo-logarithmic encoding of amplitudes, producing the u-Law encoded sample byte values used for transmission.

For a dial tone, whose sound is the combination of 350 Hz and 440 Hz signals (and also at −13 dbm0), the combined period is 1/10 of a second, and thus 800 samples were calculated to provide a dial tone u-Law encoded sample set of digital data. Transmission of a sample set, or more generally of a digital sound, is accomplished as follows. Say that a phone handset is detected as going Off-Hook. It is desired that a Dial Tone be digitally transmitted to the CODEC receiving for a POTS phone so that a dial tone is heard at the phone. The 1/10 of a second of data (800 sample bytes) is broken into groups of data allowing the 800 samples to be spread over all of the RAM buffers available for transmission. The reason for splitting up a sample set over multiple RAM buffers is to allow the uninterrupted transmission of the digital data by a dedicated handler, such as a DMA device, while allowing parallel processing of transmit complete interrupts for transmitted RAM buffers. At any time, there are RAM buffers available for transmission, allowing transmit complete RAM buffer processing to proceed asynchronously with continuous RAM buffer transmission. There are currently 4 RAM buffers used for dispersing a digital sound sample set.

With regard to the immediate implementation, the call process tones may be separated into type types: those that require continuous play, and those that require periodic play. Among the first set of tones developed, only a dial tone requires continuous play. The difference in implementation between these two groups is that the tones with periodic play require timing services to obtain their periodicity, combined with proper termination of the sound portion of each cycle, while continuous tones do not. For example, a busy tone requires a sound for a burst of one-half of a second each second. Given that the sample set for a busy tone sound is 1/20 of a second—400 bytes of sample data, two things are done for busy tone transmission: first, the data is mapped across all 4 RAM buffers, at 1/80 of a second (100 bytes of data) per RAM buffer, and second, a one second timer is started. The four RAM buffers are each marked with a repeat play count of 9 (for a total transmission count of 10 times); with the result that each RAM buffer will be marked for retransmission 9 times during transmission complete interrupt processing. When cycling through the RAM buffers in a circular manner, a LAST RAM BUFFER status bit must never be set for a RAM buffer until the 80th RAM buffer in the play is reached. The LAST RAM BUFFER status bit signals an end-of-message condition which forces synchronization data to be transmitted, which would otherwise interrupt the continuous data stream needed for the busy tone. The repeat count field associated with each RAM buffer allows the tracking of when to set the LAST RAM BUFFER status bit. Thus, after ½ second of busy tone data transmission, the tone stops, the transmission channel is idle, and ½ second later, the previously set 1 second timer expires. At this time the process is repeated; ½ second of busy tone data transmission is begun and another 1 second timer is started.

Call progress tones, played continuously or periodically as described above, are transmitted until such time as some external event requires their cessation. For example, the dial tone may be stopped when the phone handset is placed on hook or a digit is dialed. At the time of such an external event, the DMA'ing of RAM buffers is stopped and any outstanding timers are canceled for periodic tones.

The call progress sample byte data set sizes are currently as follows:

- 800 bytes—shared by both confirmation tone and dial tone
- 400 bytes—shared by both busy tone and reorder tone
- 200 bytes for audible ringing tone
- 800 bytes—shared by both call waiting tone and busy verification tone.

This is a total sample set size for the above tones of 2,200 bytes.

Caller ID is a voiceband data transmission mechanism for presenting the calling number to a called party between the first and second rings of a call. The information on caller ID was obtained through Cermetek Microelectronic's Application Note AN-107, Caller Id—A Technology of the 90's, and through Bellcore's Technical Reference TR-NWT-000030, Voiceband Data Transmission Interface Generic Requirements.

Bellcore's specifications indicate that when data transmission follows power ringing, such data transmission shall occur during the long silent interval between the first and second power ringing patterns, and that the duration of this silent interval shall be between 3.6 and 4.4 seconds. Furthermore, data transmission shall not begin until a silent interval of at least 500 msec. has elapsed after the first power ring.

Bellcore continues to describe the data transmission format for a single data message frame (the caller ID message will be transmitted as a single data message frame, as opposed to a multiple data message frame). Message types include caller ID, message waiting indicator, message desk information and test for caller ID. Single data message frames start with a channel seizure signal, followed by a mark signal, a message header (which includes message type and message length), message data and an ending checksum field.

Data transmission characteristics include a modulation type of continuous-phase binary frequency-shift-keying (BFSK), a mark (Logic 1) of 1200±12 Hz, a space (Logic 0) of 2200±22 Hz, a carrier level of −13.5 dbm at the point of application to the loop facility into a standard 900 ohm test termination, a transmission rate of 1200±12 baud (1 bit per symbol), and an application of data as serial, binary and asynchronous.

The general transmission technique is keyed by the even distribution of the caller ID message data over multiple RAM buffers. The reason for splitting up a sample set of digital transmission data over multiple RAM buffers is to allow the uninterrupted transmission of the digital data by a dedicated handler, such as a DMA device, while allowing parallel processing of transmit complete interrupts for transmitted RAM buffers. At any time, there are RAM buffers available for transmission, allowing transmit complete RAM buffer processing to proceed asynchronously with continuous RAM buffer transmission.

The channel seizure signal consists of a block of 300 continuous bits of alternating space bits and mark bits (0s and 1s—¼ of a second at 1200 baud). The subsequent mark signal consists of 180 mark bits (150 msec. at 1200 baud). The message type for caller ID (binary 00000100) follows the mark signal. Then comes the message length byte (whose length includes the message data but excludes the ending checksum byte), the message data, and lastly, the checksum byte. Between each of the message type and the message length, the message length and the message data and the message data and the checksum word may occur from 0–10 mark bits. This time may be used for on the fly construction of message data.

A calling number should be known before the time that the power ringing of a phone is started. Therefore, before power ringing is enabled, and even up to ½ second after the first power ring, the entire digital caller ID message may be constructed for continuous transmission at ½ second after the first power ring.

A minimum BFSK sample set is derived from the following general observations: first, that the 2200 Hz space bit (Logic 0) has a phase synchronization every 6 space bits (i.e., for a continuous space bit stream, the phase shift of the space bit frequency resynchronizes with the baud rate every 6 space bits); second, that the 1200 Hz mark bit has the same frequency as the baud rate, and thus completes exactly one complete 1200 Hz period for each bit; and lastly, that at 8000 samples per second, there are 6-⅔ samples per bit, and thus every three bits (regardless of bit logic), there is a sample phase shift resynchronization with the baud rate. These observations in general allow the construction of a minimum BFSK sample set of 240 bytes of data. For each of a possible 6 phase shifts for space bits, there are 3 sample phase shift data sets; two distinct sample phase shift sets of 7 bytes each and one distinct sample phase shift set of 6 bytes. This is 20 bytes for each of the 6 phase shifts for space bits, or 120 bytes of data for space bits. Since the baud rate matches the mark bit frequency, the mark bits mirror the space bits with a possible 6 phase shifts, each mark bit starting and ending at the same amplitude that the last space bit left off at. Thus, similarly, a minimum of 120 bytes of sample data are needed for mark bits.

The channel seizure signal of ¼ second requires 2,000 samples. Assuming a starting phase shift of 0 for the first bit in the signal, a relatively small sample set of 80 bytes may be mapped over the 4 RAM buffers, 20 bytes per RAM buffer with a repeat factor of 24 for each RAM buffer. The 80 bytes as a repeatable sample set is derived from the following observations: 300 bits of alternating 0s and 1s can be broken into 25 binary sequences of 010101010101 (12-bits). Six phase shifts for a 2200 Hz space bit resynchronization with the baud rate is encompassed, along with 4 times a sample phase shift resynchronization (once every 3 bits). At 6-⅔ samples per bit, we therefore need 80 bytes of sample data. For the 4 RAM buffers at a replay count of 24 times each, before the 100th RAM buffer is transmitted, the RAM buffer after the last channel seizure signal RAM buffer must be prepared and ready to go with the start of the mark signal to allow the uninterrupted DMA'ing of the caller ID message through the RAM buffers to continue.

The mark signal, consisting of 180 mark bits (requiring 1200 samples), will have data repetitively mapped to RAM buffers with each RAM buffer consisting of some multiple of 20 samples (which covers the sample phase shift of 3 transmitted bits). Again, before the last mark signal RAM buffer is transmitted, the rest of the caller ID message should be constructed and mapped to the next RAM buffer to allow the uninterrupted DMA'ing of the caller ID message through the RAM buffers to continue.

The rest of the caller ID message may be preconstructed from the minimum sample data set of 240 bytes described above, by running the data, in byte order, and from least significant to most significant bit order within each byte plus start and stop bits, bit by bit through an encoding constructor. The message data is ASCII encoded. The message length is computed from the message data which contains the date, time and the calling number. The checksum byte is computed. The encoding constructor starts with an initial space bit (2200 Hz) phase shift of 0, as the carrier seizure signal and mark signal have transmitted an integral multiple of the 6 cycle space bit phase shifts. The encoding constructor thus maintains a modulo 6 space bit (logic 0) counter which counts on space bits but not on mark bits, initialized to 0. A second modulo 3 sample phase shift counter changes on each bit processed, determining which sample phase shift group of data for a bit to choose. This counter is also initialized to 0, as the carrier seizure signal and mark signal have combined to transmit an integral number of groups of three bits (the cycle length for sample phase shifts). Thus, for each bit, there are 18 distinct possible sets of data if a mark bit and 18 distinct possible sets of data if a space bit, and the appropriate set of sample data is chosen based on a jump table whose index is the product of the two counters. Any set of data chosen for a bit is either 6 or 7 bytes of data, depending on the sample phase shift. Each bit is thus run through the encoding constructor, attaching either 6 or 7 bytes of u-Law encoded digital transmission data per bit, and the entire message portion of the caller ID message is encoded into a single RAM buffer. This last RAM buffer has its last ram buffer status bit set and is transmitted after the last mark signal RAM buffer (but must be ready for transmission before the last mark signal RAM buffer has transmitted to allow the uninterrupted DMA'ing of the caller ID message to continue).

The private exchange 20 also includes a voice prompting system. This voice prompting system is used with an analog telephone in order to program private exchange 20 to control the handling of incoming calls, outgoing calls and configuring analog ports 30, 31 and digital ports 36–39. For example, when an incoming call is input to the private exchange, the directory number of the incoming call is linked to a terminal destination or an operation. It is envisioned that the private exchange will be delivered with a standard set of default operating parameters which implement standard calling and voice mail access.

The following is a list of private exchange operating features described in greater detail hereinbelow. The features include the following modes of operation:

I. Dial Mode
A. Command Mode
   1. Configuration
      a) Base System Setup
         (1) Switch Type
            (a) AT&T 5ESS custom
            (b) National-1
         (2) Set National Switch Type
            (a) AT&T 5ESS
            (b) NT DMS-100
         (3) Set System Time
      b) Terminal Setup
         (1) Supplementary Services
         (2) Set Voice/Data Service Profile Identification (SPID)
         (3) Set Voice/Data TEI Assignment
            (a) Fixed
            (b) Automatic
            (c) Not Active
         (4) Set Voice/Data Billing Number
         (5) Set B-Channel Data SPID
         (6) Set B-Channel Data TEI Assignment
            (a) Fixed
            (b) Automatic
            (c) Not Active
         (7) Set B-Channel Data Billing Number
         (8) D-Channel TEI Assignment
            (a) Fixed
            (b) Automatic
            (c) Not Active
            (d) Signalling TEI
         (9) 2-Way LCI for D-Channel
            (a) Minimum
            (b) Maximum
      c) Line Setup
         (1) Set Billing Number
         (2) Call Waiting Enable/Disable
      d) Serial Port Setup
         (1) UART Enable/Disable
         (2) Protocol
            (a) X.28
            (b) AT
         (3) Baud Rate
         (4) Data Length (bits)
         (5) Stop Bits
         (6) Parity
      e) T3POS PAD Setup
B. Call Management Features
   1. Call Waiting
   2. Retrieve Call
   3. Disconnect
   4. Transfer
   5. Adjust Volume
   6. Mute/Unmute
   7. Conference
   8. Drop
C. Call Mode
D. On-Hook Data Transmission Interface FIGS. 25–43 are flowcharts illustrating the key strokes which are entered to utilize the features of the private exchange, as described in greater detail hereinbelow.

Figure 25:
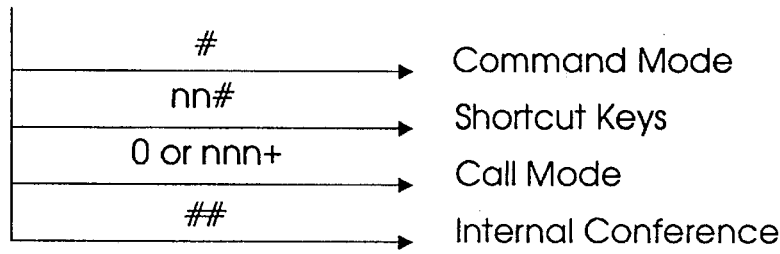

The detailed description of the user's actuation of the POTS telephone set through the digital controller will now be described. As described above, when the telephone line goes Off-Hook, the microprocessor outputs a dial tone and the microprocessor is in the dial mode for that line. The dial mode is the starting point for all private exchange functions. From dial mode, the user may access the command mode, the call management instructions, or place a call to an outside line (call mode)(FIG. 25).

Call mode is entered when an external telephone number is being dialed. Call mode begins when the user types three or more sequential numerical digits and continues until the call is picked up at its destination. When answered, the call becomes a current call. The microcontroller will cancel the call mode if it detects an On-Hook condition.

Figure 26:
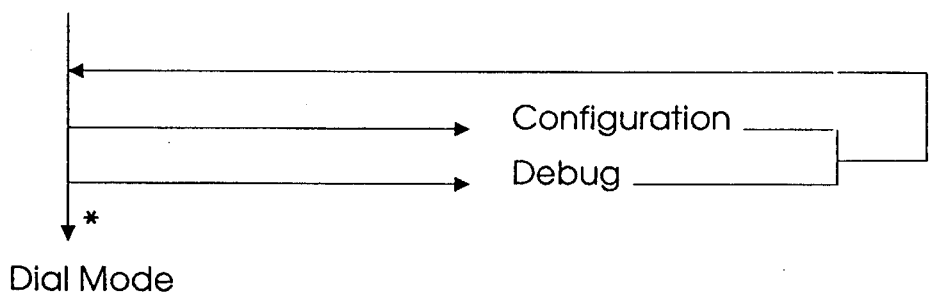
Figure 27:
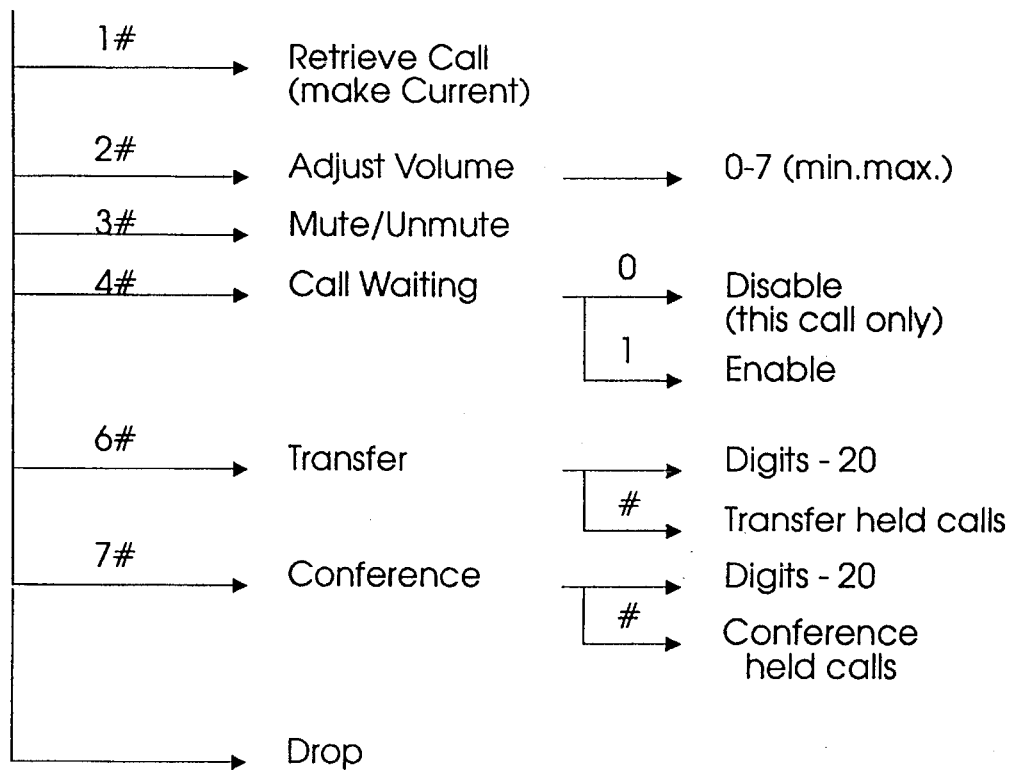
Figure 28:
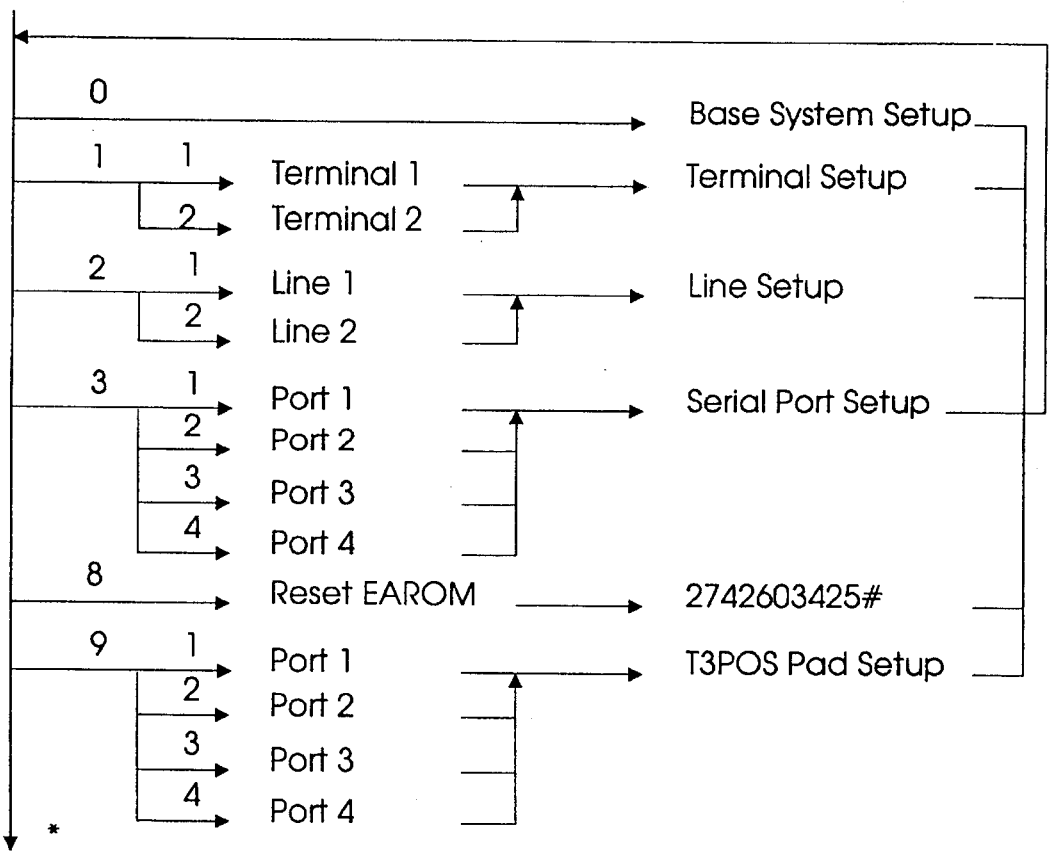
Figure 29:
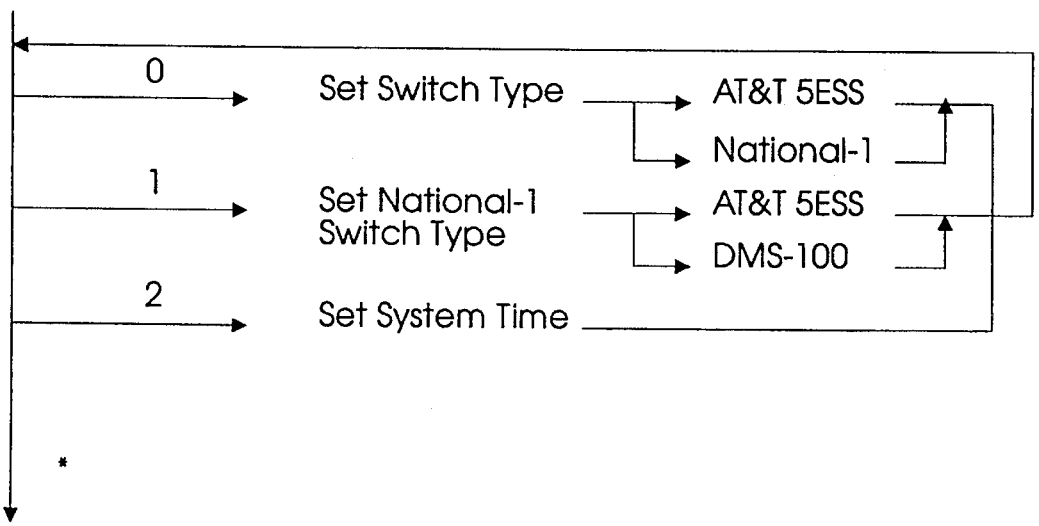

The microprocessor is responsive to the DTMF #key input while in the dial mode to enter the command mode (FIG. 26). In the command mode, the user may enter a debug option or a configuration option. The debug option provides a menu for downloading operational data to the serial ports 36–39 and resetting operating data. Upon selecting the debug option, the microprocessor U1 awaits input in the form of DTMF signals.

In the configuration option (FIG. 28) the microprocessor generates voice prompting menu signals and awaits user responses in the form of DTMF signals to select a set of configuration options. Upon selecting the set configuration option, a submenu is available, with additional choices related to the specific configuration option to be selected. Some submenus provide a further set of submenus by which specific configuration options are selected. After submenu options are selected, the microprocessor U1 awaits data input signals which specify particular values related to the specific configuration option selected. When the data signals are input, the microprocessor U1 carries out the operation. This microprocessor menuing operation will continue until the desired configuration option is completed, and the microprocessor U1 exits the configuration mode. Thus, while in the configuration mode, the microprocessor loops back to the beginning of each submenu until it is controlled to exit the submenu by backing out to the menu.

Still more particularly, the microprocessor U1 backs up to the beginning of a submenu, or a menu when the asterisk (*) key of an analog POTS device is actuated. If the * signal is detected when the user has begun entering data related to a specific configuration option, the microprocessor backs up to the beginning of the last menu or submenu entered. If the * signal is detected when the microprocessor U1 is at the beginning of a menu or submenu, the menu or a previous submenu will be selected.

The microprocessor U1 exits the command mode upon the occurrence of either one of two events. The microprocessor U1 saves all command mode settings automatically when the microcontroller exits upon either of these two events. The microprocessor U1 will exit the command mode responsive to the * signal as noted above. The microprocessor U1 will also exit the command mode if a flashing of the hook switch or an On-Hook signal is detected.

Command mode may be exited at any point in the command mode menuing hierarchy without detrimentally effecting the ensuing operation of the private exchange. After exiting the command mode, the user is in dial mode unless there is an incoming or active call.

While in the command mode, when an incoming call is present, a call waiting tone is output by microprocessor U1. The microprocessor will not take any further action with respect to the call unless it detects a hook-switch flash or an * sequence is entered. If a hook-switch flash is detected while in the command mode, the microprocessor U1 saves the changes and accepts the call. If the microprocessor U1 detects an * sequence, it backs out of command mode and saves the changes. Upon detection of a hook-switch flash the microprocessor completes the incoming call.

Call management instructions (FIG. 27) provide the ability to control calls which are in progress. Call management instructions include call retrieval, call transfer, conference, call drop, volume adjustment, and mute/unmute. Upon detecting a hook-switch flash during a call, the microprocessor puts the current call on hold. When the call is placed on hold, the microprocessor U1 goes into the dial mode, at which time the call management instructions may be entered. With the exception of volume adjustments which apply to all calls, the call management instruction is applied to that current call on hold, unless a different call which was active on hold, or incoming, is made the current call before the call management entry is made. The system allows up to eight active calls per line, one of which will be a current call (which may be on hold) and the others of which will be noncurrent calls on hold. All incoming and outgoing calls are assigned individual call numbers based on the lowest available number (1–8) when a call comes into the private exchange. For example, the first three calls are assigned call numbers 1–3. If call number 2 is disconnected, the next incoming or outgoing call will be assigned call number 2. The calls are thus stacked by microprocessor U1. The current call is at the top of the stack and all other calls in the stack are below that call. When in the call mode, the microprocessor U1 places the current call on hold when a hook-switch flash is detected. The microprocessor U1 takes the call off hold when a hook-flash is detected on a line which is on hold, unless there is an incoming call, which incoming call becomes the current call. The microprocessor U1 disconnects the current call when a line goes On-Hook and the call is not on hold. The next call on the stack then becomes the current call. The call at the top of the stack is the current call for a telephone line whenever the line goes Off-Hook. The microprocessor generates a ringing signal on a line with an active call on hold to remind the user that they left a call on hold when the line is On-Hook.

The call waiting instruction allows the user to accept an additional call when one or more calls are currently active. When a new call comes in during an active call, the microprocessor outputs a call waiting tone to the telephone line. This beep-like tone is supplied to the called party regardless of the mode that the line is in (e.g., the command mode, the call mode, or the dial mode), and the calling party hears normal ringing. The microprocessor U1 accepts the additional call through the call waiting feature after detecting a hook-switch flash (if in call mode the current call is put on hold) and the new incoming call becomes the current call.

The microprocessor U1 retrieves a call from the active stack and makes it the current call responsive to a hook-switch flash using a retrieve call command. This occurs responsive to the call management instruction sequence 1#, followed by a call number. The microprocessor U1 makes the indicated call (identified by the call number) the current call, and moves the other calls lower on the stack.

The microprocessor will selectively disconnect a call. If the microprocessor detects a hang-up of the telephone (upon the user pressing and holding down the receiver button) the current call is disconnected if it is not on hold.

Microprocessor U1 will also transfer calls. The transfer option results in forwarding of a current call to a specific directory number. The microprocessor U1 transfers a call upon detecting a flash (responsive to which the current call is put on hold); detection of the call management instruction sequence 6#, entry of the specific destination number; and the DTMF tone for the # button. Additionally, the microprocessor U1 transfers the second call on the stack to the top call on the stack following the sequence 6##.

The volume of the signal output to the telephone set may be adjusted using a call management instruction. The volume is adjusted by changing the gain in the TAIC IC U303 or U304. The volume of the TAIC is changed from dial mode by the microprocessor after receipt of the following sequence: the volume adjustment call management instruction sequence 2# and the volume level, which will be between 0 and 7. When the volume is input, the microcontroller adjusts the TAIC to the indicated level. If there is a current call, it is taken off hold.

The microcontroller may also control the analog interfaces to mute and unmute the signals on the analog line using the CODECs. When the mute is enabled, the outgoing sound transmission for the current call is silent, although the user still hears incoming sounds. This is done by disabling the TXD output of the CODEC, which can be accomplished by disconnecting the TXD output of a CODEC from the IL1RXD conductor of the local PCM bus 66 at switch U310 (FIG. 11). The mute feature is canceled when the call is disconnected or when the unmute function is selected. The mute feature is implemented by microprocessor U1 when it detects: a flash (responsive to which the microcontroller places the current call on hold and place the analog telephone line in the dial mode), and detection of the mute call management instruction sequence 3#. Thereafter, the muted call is taken off hold. The microprocessor unmutes a call when the above procedure is followed while a call is muted, or if the analog line goes On-Hook.

The call management option instructions may be used to effect a conference function which connects multiple parties. It should be noted that analog ports 30 and 31 are connectable through conference circuits U314 and U315 without involving the local exchange. This will occur when the sequence ## is entered from the dial mode. However, conferencing can also take place through the local exchange using the telephone service conferencing subscription service provided by the local exchange. The microprocessor accesses the network conference subscription when the 7## sequence is detected from one of the analog ports. Upon detection of the 7## sequence from dial mode, the two calls on top of the stack are conferenced with the local port. The sequence 7#N from dial mode, wherein N is a directory number up to 20 digits long, will conference a call on hold, the directory number, and the analog port. An error message is preferably provided by the microprocessor to an analog port when an incorrect directory number is entered. The conference is viewed by the local exchange switch as a single call, such that each analog port is limited to a single conference call at any one time. However, each line may have its own conference call at any time. The 7## or 7#N# sequence from dial mode can be used to add additional parties to the conference. Additionally, when the device connected to an analog port 30, 31 flashes, other conferenced parties can still communicate. When the user disconnects (goes On-Hook), the conference call is terminated. If the microprocessor detects flashing or hanging-up during conference setup, the adding of the party is aborted. New calls are disconnected and existing calls remain on the stack.

A drop option allows the user to disconnect the most recent person added to a conference call (last in is first out). A call is treated as a conference call so long as the analog private exchange line is communicating with a remote party after other parties are dropped out. The conference is terminated when all remote parties are disconnected.

The configuration option (FIG. 28) provides a menu enabling the user to configure and use the features of the private exchange system. Before using the private exchange to place or receive calls, the microcontroller is set up by the user entering the configuration menu to initialize the system. The menu includes base system settings, terminal setup, line setup, serial port 36–39 setup, and T3POS PAD setup.

Figure 30:
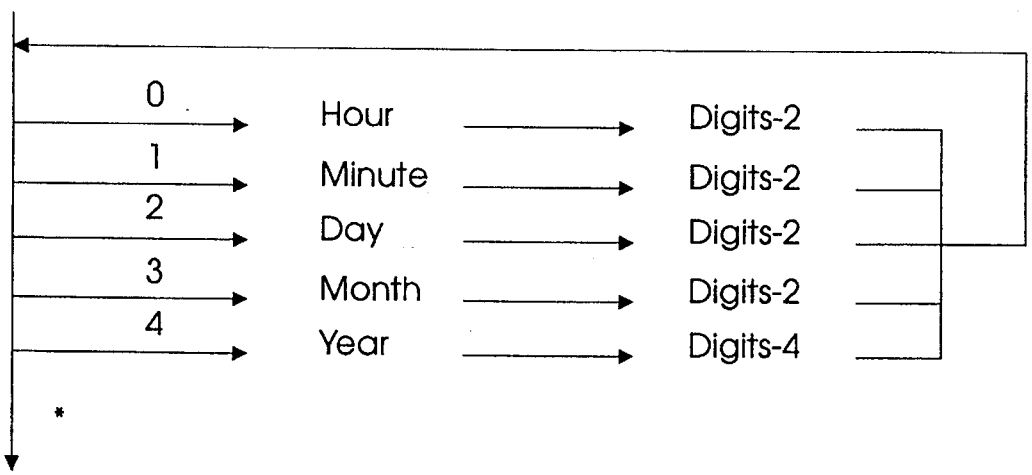

The base system setup submenu (FIG. 29) selection provides an option by which the user inputs commands to configure the ISDN line. The controller sets up options such as the switch type and the system time (FIG. 30).

The base system setup submenu (FIG. 29) allows the user to set the switch type of the microcontroller to communicate with the local exchange switch. The local exchange switch types include the AT&T 5ESS and the National-1. The National-1 switch type may be interfaced to an AT&T 5ESS or the Northern Telecomm DMS-100. Additionally, the System Time is set from the Set System Time submenu (FIG. 30) which is entered through the Base System Setup submenu.

The switch type is the type of switch that the local exchange uses to service the private exchange. Information about the switch type may be obtained from the service provider or determined using the novel method described herein. The private exchange supports a number of exchange types. For example, AT&T 5ESS and Northern Telecomm TDMS100 are the most common types of switches used in the local exchange. Commercially available software such as National-1 protocol allows switching software from various vendors to communicate with a switch from any other manufacturer.

Figure 31:
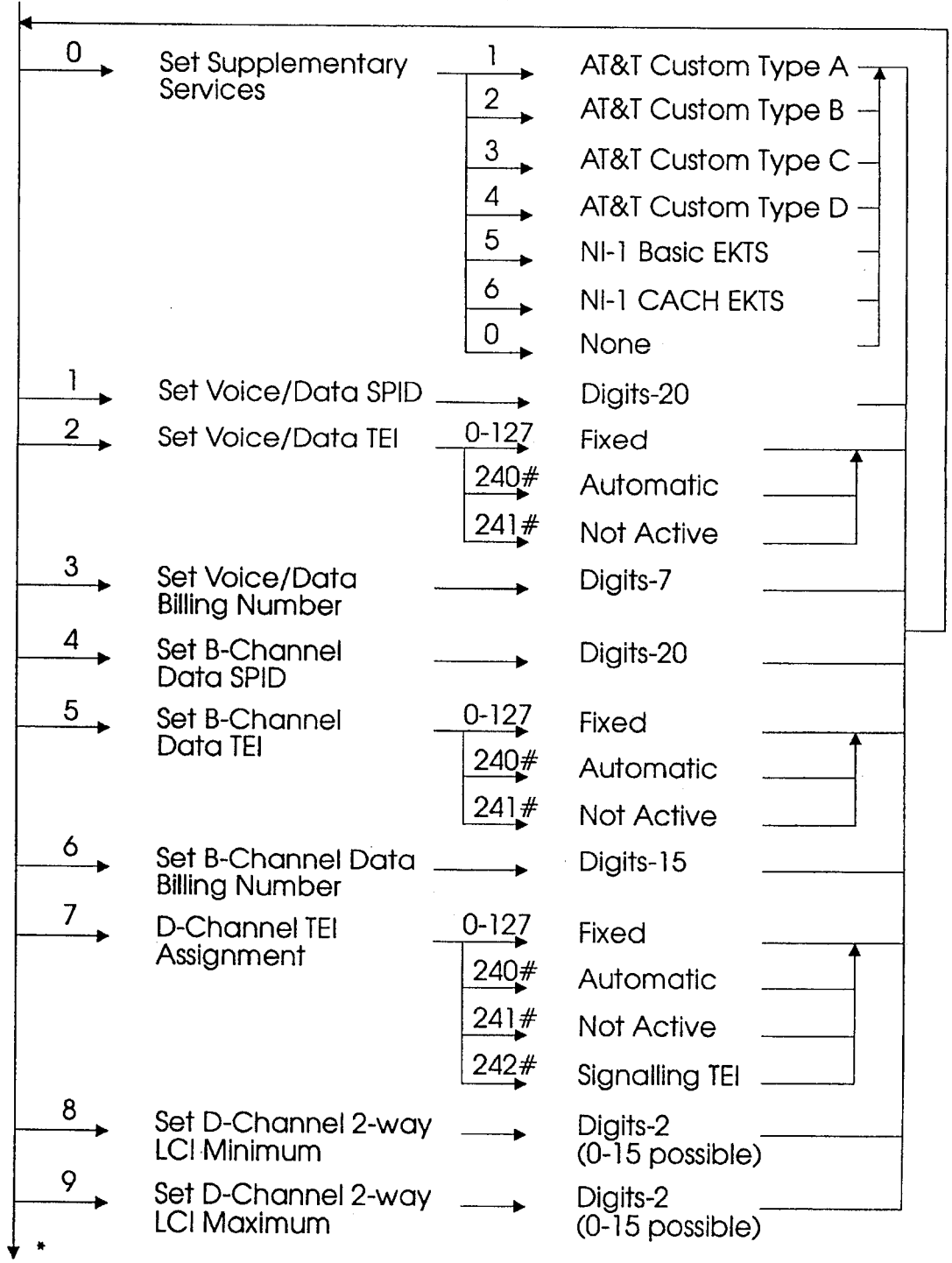

The terminal setup submenu is illustrated in FIG. 31. The terminal submenu includes service profile identification (SPID), supplementary services, terminal endpoint identifier assignments and local channel interface settings. The service profile identification is a set of numbers used by the B1 and B2 channels to define the channels to the local exchange.

Supplementary services are additional services such as hold, conference, and call forwarding offered to an ISDN customer by the local exchange. Supplementary services are always present if activated at the switch. Although the specific features may differ between service providers, supplementary services generally provide the user with the ability to connect and disconnect new calls when one or more calls exist.

The terminal end point identifier (TE1) assignment is a simplified identifier defining B1, B2 and the D channels to the ISDN local exchange switch. Three settings are available for all channels: fixed; automatic; and terminal end point identifier not active. For the D channel, a signalling terminal end point identifier setting is also available. The fixed terminal end point identifier option allows the user to specify a specific number. This number must correspond to the switch number supplied by the service provider. The automatic option allows the switch to define the terminal end point identifier assignment. The not-active setting indicates that a terminal end point identifier assignment is not available.

The logic channel interface for the "D" channel is supplied by the integrated service digital network service provider (i.e., at the local exchange). Before using the private exchange to place or receive a call, the microcontroller is programmed with the billing directory numbers for analog lines 1 and 2. Thereafter, when a call comes in for the primary directory number, the microprocessor U1 automatically routes the call to the appropriate number. To have the incoming call routed elsewhere, a route directing option must be stored in the microprocessor U1. The modified primary directory option enables the user to add, change, or delete the main directory number used for either line.

Figure 23:
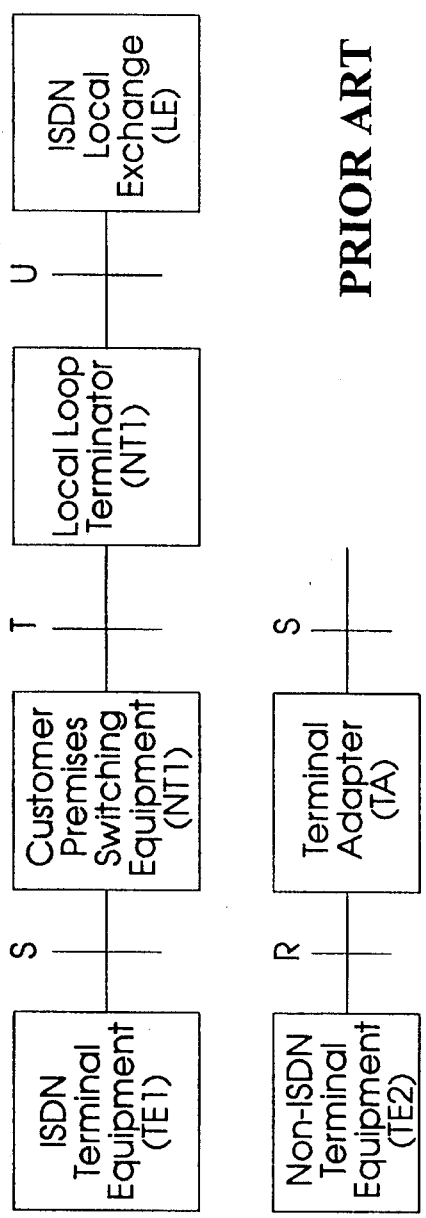
FIG. 23 is a circuit schematic in block diagram form of an ISDN network according to the prior art.

The microprocessor U1 routes signals from the ISDN local exchange to the ports in the private exchange. With reference to FIG. 23, the 2BIQ-encoded signals input through the U-port interface model are directed to one of the TEI terminals, which are logical terminals in the controller. The call is assigned a billing number. The call will then be routed by called destination, calling destination, time of data, or other criteria, to one of the resources. The resources include the UART ports 1–4, the voice mail, POTS line 1, POTS line 2, or a call forwarding number. An additional source is DTMF 75 which receives dial tone signals on the local PCM bus through CODEC U300. The private exchange thus maps by terminal, billing number and additional criteria.

The billing directory number is the number to which all transmissions are billed. Before placing or accepting calls, the user must configure the line and the terminal which will have the same billing directory number. Thereafter, when a call comes in, it is automatically routed to the configured line.

A local channel interface (LCI) for the D channel is supplied by the ISDN service provider. The minimum and maximum values are required.

Figure 32:
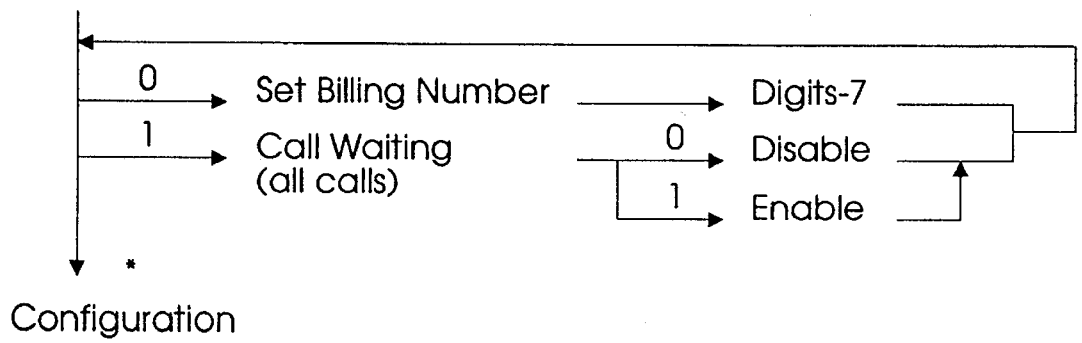
Figure 33:
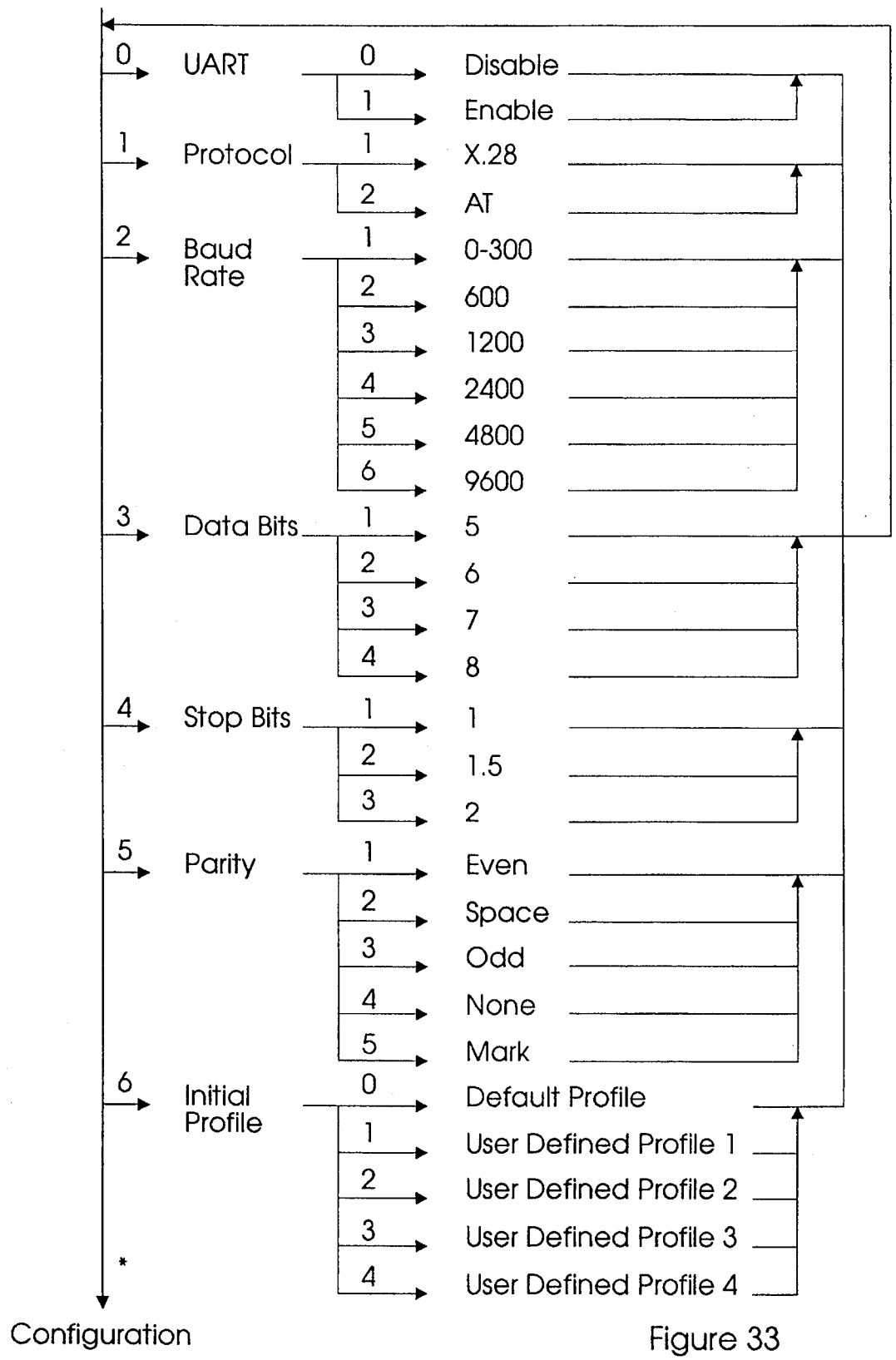
Figure 34:
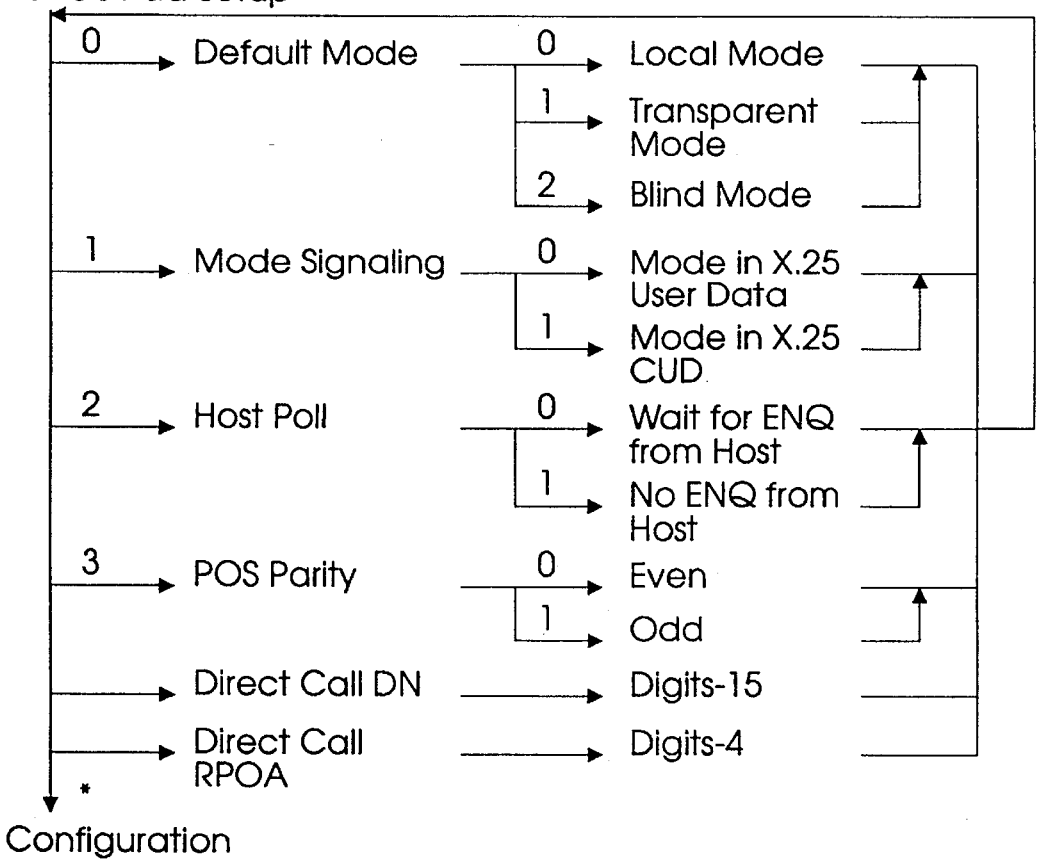
Figure 35:
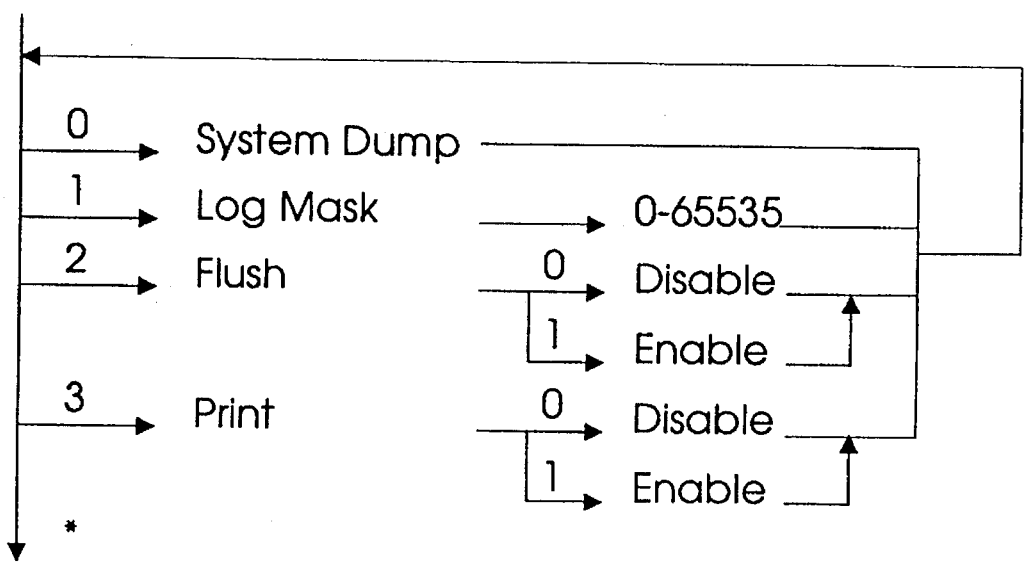
Figure 37:
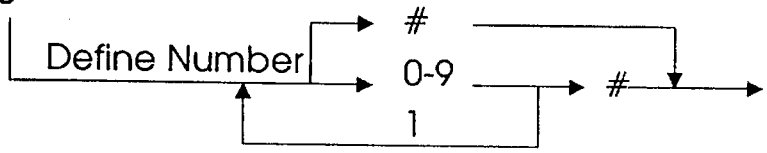
Figure 38:
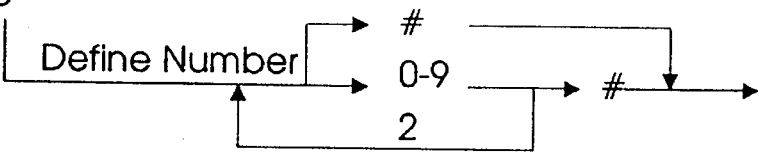
Figure 39:
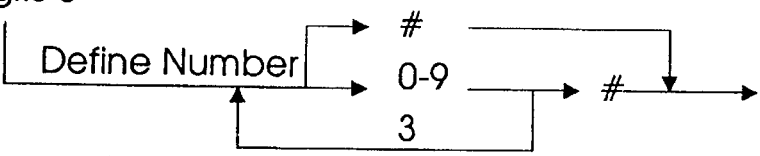
Figure 40:
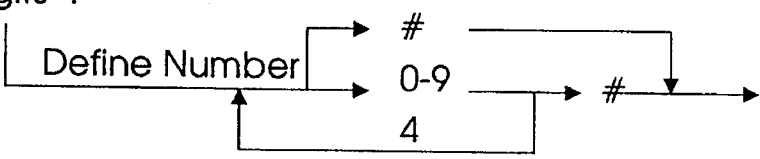
Figure 41:
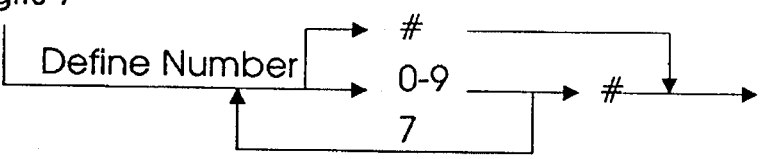
Figure 42:
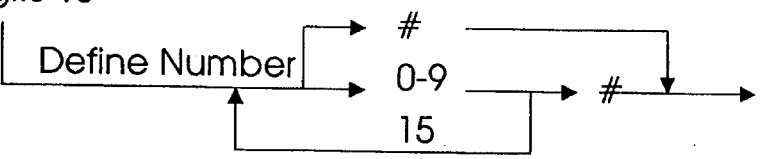
Figure 43:
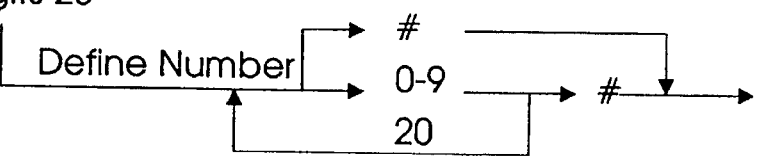

The microcontroller sets the billing number in the line setup subroutine illustrated in FIG. 32. The seven digits entered after the sequence #120 is the billing number for the terminal. When a call comes in for the billing directory number, it is automatically routed to the appropriate line. A one or a zero is entered following the input sequence #121 enable and disable.

The serial port setup options (FIG. 33) enable the microprocessor to interface with existing software through ports 36–39 and uses the Integrated Services Digital Network as a communication line. The setup options available include UART enable/disable, which allows a port 36–39 to be used for ISDN communications. Another option sets the protocol, which is the set of rules governing the exchange of information between two devices which allows effective communication. There are currently two available protocol settings: the X.28 and the AT. The baud rate of the asynchronous communications channel may also be set. The data length is set, such that the number of bits in each data packet sent between ports 36–39 and the private exchange microprocessor U1 are identified. The stop bit determines how packets are terminated. Parity may also be set, and is used to detect errors in the packet.

The private exchange supports commercially available caller ID display devices used for caller ID detection. The private exchange has electrical support for caller ID from either of the two POTS lines connected to ports 30 and 31. Caller ID is sent through the analog lines in conjunction with ringing. The rules associated with private exchange caller ID display devices are as follows: 1) the private exchange signalling interface allows half duplex data transmission from the private exchange to the caller ID device; 2) the private exchange can recognize the state of the caller ID display device (On-Hook and Off-Hook); 3) data transmission will not occur during power ringing, subscriber or caller ID display device alert signalling; 4) No sequence number or acknowledgement is used for the data messages from the private exchange to the caller ID display device; 5) during data transmission, a normal line supervision voltage is applied between the tip and ring conductors; 6) data transmission associated with power ringing occurs during the long silent interval between the first and second power ringing patterns (the duration of the silent interval must be greater than or equal to 3.6 seconds and less than or equal to 4.4 seconds); 7) the private exchange waits 500 milliseconds after the start of the silent interval before starting the transmission of data (the transmission ends no later than 200 milliseconds prior to the end of the silent interval); 8) if the line goes Off-Hook before or during data transmission, normal ring trip treatment is provided; 9) any associated loop carrier system must provide an end-to-end voice path during ringing (without this voice path caller ID will not operate); 10) if any loop system or terminal equipment interrupts the electrical path between the switch and the caller ID display device, the message transmission may be interrupted.

The time available for private exchange transmission is therefore between 2.9 and 3.7 seconds. The signal thus includes two seconds of power ringing including any distinctive patterns, 500 milliseconds between the end of a ringing pattern and the beginning of a data transmission; 2.9 to 3.7 seconds for data message transmission including channel seizure, carrier signal and message data and over 200 milliseconds before the application of a second ringing pattern.

The data transmitted includes month/day/hour and minute characters. Each data character is preceded by start bit and ends with a stop bit. The calling party information begins at word 9 with one of the following: a 10 digit directory number; an ASCII alpha character P for "privacy"; an ASCII alpha character O for "out of area." The message includes a channel seizure signal having 30 bytes of 01010101; a carrier signal 150 milliseconds at 1200 Hz; a message typed word 0000100; a data word count 9–18, the data words, and a check sum word.

The Debug option (FIG. 35) is used to determine the errors which are logged into the private exchange. The logged errors may be dumped to a serial port upon the entry of 0 while the controller is in the Debug submenu. The logged error mask is a sixteen bit word command. The flush command is enabled or disabled to force immediate output of debug information whenever available. The print command is used to enable and disable a printer coupled to port 1.

The Logprim mask bits (FIG. 36) include a log primitive bit (0) which is used to effect processing of the Coordinating Entity or second level primitives. A Logpkt bit (1) effects printing of the header data of each level 2 error. A Logdata bit (2) is not used. The Lapstate bit (3) logs the LAP state transitions. The Lapvar bit (4) logs a selected set of LAP local variables. The Logsvcprim bit (5) effects the logging of service related primitives created by the LAP. The Logdebug bit (6) effects printing of detailed messages from the LAP which are used to trace the program flow. The Lognls bit (7) effects priming of the network layer signalling (NLS) errors used for debugging the NLS. The Nlpprim bit (8) effects network layer packet (NLP) primitive processing. The Nlppkt bit (9) is not used. The Nlpdata bit (10) effects logging of the contents of each network layer packet. The Nlpstate bit (11) logs the network layer packet state transitions, although the state information is not logged when Nlpvar is set. The Nlpvar bit (12) effects printing of a selected set of network layer packet local variables. The Nlpsend bit (13) prints information concerning the packets being sent to either the coordinating entity or to the LAP by the network layer packet. The Nlpdebug bit (14) effects printing of the detailed messages from the NLP which can be used to trace the program flow. The USARTdebug bit (15) outputs log messages in the terminal adapter unit interface an the U interface lower level driver code for debugging messages.

A Transaction Processing Protocol for Point-of-Sale (T3POS) devices is a transaction switching and transport protocol designed to provide existing Point of Sale (POS) terminals with efficient and economical switching and transport service over an X.25 based packet network. The private exchange supports a T3POS PAD as specified in Bellcore Special Report SR-NWT-002026 (Issue 1, September 1991). The private exchange according to the invention supports the T3POS protocol transactions from POS terminal equipment to an information service provider through the X.25 packet switched network using an ISDN Basic Rate Interface D-channel.

The T3SOP PAD operates through any of the serial ports 36–39, and each of the four ports may have a respective POS device connected thereto. The T3POS PAD supports serial data rates of 300, 600, 1200, 2400, 4800, and 9600 bps. The T3POS PAD functionality is implemented at the private exchange. The T3POS PAD Setup submenu (FIG. 34) is used to initialize the private exchange for operation for each of the serial ports. The setup submenu is used to select one of three default modes. The Local mode eliminates the transfer of supervisory frames (i.e., ACK and NAK) across the X.25 based packet network. The Transparent mode enables the use of existing credit card authorization and data capture link level protocols with minimal modifications to the POS terminal and without any modifications to the Information Service Provider/Credit Card Association (CCA) host system software. The Blind Mode enables innerworking with the terminal equipment that supports unique protocols (i.e., X.28 asynchronous terminals) and proprietary message formats.

Mode signalling is used by the private exchange microprocessor U1 to identify to the Information Service provider and the T3SOP PAD which mode is being used. For POS terminal initiated calls, the T3POS PAD supports mode selection signalling to the Information Service Provider host via the X.25 User Data Field. Optionally, the T3POS PAD may be configured to signal mode selection via the X.25 Call User Data (CUD) Field.

The Host Poll option is used by the microprocessor to determine if the T3POS PAD can expect an ENQ control character from the host after the call is setup. Host poll provides a configuration option to select "no ENQ from Host" or "Wait for ENQ form Host" with a backup timer T3.

The POS parity setting selectively establishes asynchronous communication with the POS terminal. The communication may use Even or Odd Parity, 7 data bits, and open stop bit or no parity having 8 data bits and 1 stop bit while in Blind mode during data transfer.

The T3POS Opening Frame Control Field from the POS terminal may include an X.28 Selection PAD Command signal containing a called address with an optional Recognized Privacy Operating Agency (RPOA) facility request. An RPOA is an organization that handles network communications. The T3POS PAD may be configured with a directory Number and optional RPOA to provide Direct Call Capability. The Direct Call information may be used when the T3POS Opening Frame from the POS terminal does not contain a Control Field or there is no addressing information in the control Field.

Microprocessor U1 includes a packet assembler/disassembler (PAD) for each data port which converts between the data device protocol and the X.25 port protocol. The PADs supported include an X.28 PAD and an AT PAD, described in greater detail hereinbelow.

The microprocessor U1 allows the placing of an outgoing data call through a data port and an associated PAD. This is done following receipt of a phone number to be called and detection of a carriage return control character from the data device. A data call is suspended when the microprocessor detects CTRL-P from the terminal. An X.28 command for configuring the PAD is entered from the terminal and after an X.28 command is processed, the microprocessor resumes the data call. The microprocessor clears a data call responsive to the input of CTRL-P from the data port.

For incoming data calls, the data call interface is controlled by microprocessor U1 to route data calls to an X.28 PAD or an AT PAD using the X.25 protocol as an underlying transport service. A call from a remote X.28 PAD is routed to an available X.28 PAD on the private exchange. If an X.28 PAD is not available, the call is routed to an available AT pad. An incoming call which is not from an X28 PAD is routed to an available AT pad. If an AT pad is not available, the call is rejected.

The private exchange serial ports 36–39 may be specified in the first data byte of an X.25 incoming call. The serial port value must be an ASCII digit between 1 and 4. If no serial port is specified for an incoming call, or the serial port value is invalid, the call will be routed to the first available serial port enabled for use by the appropriate PAD type.

The X.28 PAD is a CCITT standard for using terminal emulator software to provide control over X.25 data sessions. The X.28 commands include: clear the virtual call; invite remote pad to clear virtual call; transmit an interrupt packet; display current X.3 parameter values; display X.3 parameter X value where X equals the X.3 parameter number; select X.3 parameter profile X where X=X.3 profile number; reset the virtual call; display X.3 parameter value of remote PAD; X =X.3 parameter number; set X.3 parameter n to new value x in remote PAD; set X.3 parameter n to new value X and display it; set X.3 parameter n to new value x; request status of the virtual call; place a data call by number; place a data call by number with up to 12 bytes of user data; and place a data call to a specific private exchange serial port, where n=serial port number (1–4), to connect to serial port.

The X.28 PAD includes various status messages. It includes a PAD command prompt; a confirmation of clear request; an out of order or off line output; a remote station disconnected prompt; local procedure error prompt; a fast select not available prompt; an incompatible destination prompt; an invalid facility request prompt; a destination incompatible prompt; a network blocked prompt; a number busy prompt; a reverse calling not accepted prompt; a route not obtainable prompt; a remote procedure error prompt; an indication that an outgoing or incoming call is connected prompt; number called equals called number for outgoing call prompt; a number equals calling number for incoming call prompt; an engaged prompt in response to STAT command when a call is established; a free response to STAT command when call is not established; an error prompt for a PAD command error; a respond to SET command: n=X.3 parameter number, x=parameter value prompt; a response to SET or SET command: n=invalid X.3 parameter number; a reset by remote device; a local procedure error; a network congestion prompt; a remote procedure error prompt; respond to RSET command: n=X.3 parameter number, x=parameter value; and a response to RSET command: n=invalid X.3 parameter number.

The X.3 PAD parameters include the number 1 which is the suspend data call (escape from data transfer) character wherein 0 means suspend not possible, 1 =DLE (ASCII 16 or CTRL-P) and 32–126=ASCII character value. The X3 PAD parameter number 2 is an echo control wherein 0 is no echo and 1 is echo in command and data transfer modes 2=echo in command mode, and 3=echo in data transfer mode. The X.3 PAD parameter number 3 is a data forwarding character wherein 0 equals no data forwarding, 2 equals CR (ASCII 13) and 126 equal all ASCII control characters. X.3 PAD parameter number 4 is an idle timer delay wherein 0 disables the idle timer and 1–255 delay the idle timer in twentieths of a second depending upon which number 1–255 is input (e.g., 1=½ sec.; 2=¹⁄₁₀ sec.; 3=³⁄₂₀ sec., etc.). Parameter number 5 is a flow control of the terminal by PAD: 0 means no flow control; 1 equals XON/XOFF flow control data transfer; and 2 equals X0/XOFF flow control data transfer and command. Parameter number 6 is a PAD message (service signal) control wherein 0 disables PAD messages, 1 enables the generation of PAD messages, and 5 means PAD messages and prompts are generated. Parameter number 7 is a PAD operation on break signal from the terminal wherein 0 is an ignore break; 1 is a send an interrupt command; 2 is a reset the virtual call; 8 is escape from data transfer; and 21 is a discard data, send interrupt, send indication of break. Parameter number 8 is a discard output, wherein 0 is deliver data from remote station and 1 means to discard data from remote station. Parameter number 9 is the padding after a carriage return. Parameter 0 means no padding after a carriage return, whereas 1–255 indicates the number of padding characters. Parameter number 10 is a line folding control wherein 0 means no line folding and 1–255 indicates the number of graphic characters per line. Parameter number 11 is a speed of the terminal ready only parameter, wherein a 2 means 300 bits per second, a 3 means 1200 bits per second, a 4 means 600 bits per second, a 12 equals 2400 bits per second, a 13 means 4800 bits per second and a 14 means 9600 bits per second. Parameter number 12 is a flow control of the PAD by terminal wherein a 0 means no flow control and a 1 means XON/XOFF flow control. Parameter number 13 is an insert line feed after carriage return wherein a 0 means no line feed insertion; 1 means insert line feed after sending carriage return to terminal; 2 means insert line feed after the carriage is returned from the terminal; 4 means insert line feed after echo of carriage return to terminal; 5 means insert line feed after sending carriage return to terminal and after echo of carriage return; 6 means insert line feed after carriage return from terminal and after echo of carriage return; and 7 means insert line feed after carriage return to and from terminal and after echo of carriage return. Parameter number 14 is the padding after line feed wherein a 0 is no padding after line feed and 1–25 represents the number of padding characters. Parameter number 15 is an editing and data transfer control wherein 0 equals no editing in data transfer and 1 means editing in data transfer. Parameter number 16 is a character delete wherein 0–126 are the ASCII character value and 127 means delete character (ASCII 127). Parameter number 17 is a line delete control wherein 0–23 means the ASCII character value, 24 means CAN character (ASCII 24) and 25–127 mean the ASCII character value. Parameter number 18 is a line display wherein 0–17 equal the ASCII character value, 18 means the DC2 character (ASCII 18) and 19–127 equal the ASCII character value. Parameter number 19 is an editing PAD message control wherein 0 means no editing of pad messages; 1 means editing pad messages for printing terminals; 2 means editing PAD messages for display terminals; and 8 and 32–126 are ASCII character values to use for editing messages. Parameter number 20 is an echo mask wherein 0 means no echo mask such that all characters are echoed; 1 means no echo of CR signal; 2 means no echo of the LF signal; 4 means no echo of the VT, HT and FF signals; 8 means no echo of the VT, HT, FF signals; 8 means no echo of the BEL, BS signals; 16 means no echo of the ESC or ENQ signals; 32 means no echo of the ACK, NAK, STX, SOH, EOT, ETB, or ETX characters; 64 means no echo of editing characters and 128 means no echo of DEL or control characters. Parameter number 21 is a parity treatment wherein 0 means no parity checking or generation. Parameter number 22 is a page weight wherein a 0 means the page weight is disabled.

The AT PAD emulates a Hayes Industry Standard modem. The AT PAD is compatible with communication programs which work with modems, and the software thus makes the private exchange look like a modem to a device connected to one of the data ports. The AT PAD includes the following commands: escape from data transfer mode; set auto answer to enable receipt of incoming calls; place a data call by entering the phone number to call; place a data call using stored dial number; echo in command mode, x=0 for echo disable and x=1 for echo enabled; echo and data transfer mode wherein x is set to 0 for echo disable and x is set to 1 for echo enabled; hang up the call; reestablish data transfer mode; AT query control; query results are generated with x=0 and not generated with x=1; set the S register with a register number and a register value; display S register with R identifying the register number; a verbose mode control wherein x is equal to 0 to display result codes in numeric form and x equals 1 to display result codes in verbose form; result code control wherein x is set to 1–7 to display the full result codes and x is set to any other value to display sparse results; a reinitialized default AT configuration; and a store phone number to call wherein the number is input.

The AT PAD includes S registers. These registers include the following: 0 the auto answer register wherein a 0 disables receipt of incoming calls and 1–255 enable receipt of an incoming call; 3 is a carriage return character 0 127 ASCII character value; 4 is a line feed character having a 0–127 ASCII character value; 5 is a back space character having a 0–127 ASCII character; 12 is an escape from data transfer mode guard time wherein a 0 disables the escape guard time out and 1–255 set the escape guard timeout in increments of 20 milliseconds; and 22 is a result code option wherein 0 means only the connect is displayed and a 16 means the full connect messages.

Placing a data call is accomplished by the command ATDT followed by a number to call. A data call is suspended upon detection of +++ on the terminal keyboard, followed by AT command to query set configuration and detection of ATO to resume the data transfer mode. A data call is cleared upon detection of +++ on the terminal keyboard followed by ATH and return.

The AT PAD displays result codes such as OK when a command is executed; CONNECT when a call is established; NO CARRIER when a call is disconnected or could not be connected; ERROR when an AT command error occurs; CONNECT 1200 when a call is connected at 1200 bits per second; CONNECT 600 when a call is connected at 600 bits per second; CONNECT 2400 when a call is connected at 2400 bits per second; CONNECT 4800 when a call is connected at 4800 bits per second and CONNECT 9600 when a call is connected at 9600 bits per second.

The private exchange 20 according to the invention thus provides a basic rate interface ISDN private exchange which may be economically manufactured and services all existing POTS analog and digital devices. The private exchange includes up to eight terminals (TEI) which are logically created in microprocessor U1 to service ports 30, 31 and 36–39 of the private exchange 20. Each terminal has a unique address, and can process up to fifteen sessions at a time for each logical terminal. This allows significantly more than fifteen sessions to be handled through private exchange to the local exchange at any given time (the local exchange only allows fifteen sessions for each terminal connected to it). Additionally, these terminals are implemented in microprocessor U1 using software, which is significantly less expensive than implementing respective terminals using hardware.

An additional envisioned function of the private exchange 20 is supervision of the network PCM bus 58. The terminals TEI and terminal adaptors TA connected to port 28 communicate through network PCM bus 58. The private exchange 20 is transparent to these signals. However, the private exchange can monitor these signals, and provide voice mail services for these terminal devices. It may thus output voice mail signal to devices connected to port 28 as well as to the local exchange by monitoring voice mail requests.

The private exchange may be configured through ports 30, 31, 36–39 or 26. To configure through ports 30 and 31, audible templates are used to configure through ports 36–39, information stored in the EAROM is downloaded to a PC connected to one of ports 36–39. The PC configures the ports using templates. The updated information is then uploaded to the EAROM. The ports are thus configured in a controlled format using a personal computer. Similarly, the EAROM may be accessed through the U-port 26, such that configuration information may be input to the EAROM from a central location.

The private exchange includes protected memory locations where data is stored. A diagnostic checksum is used to provide a limited memory check. Upon a reset, the protected memory areas are evaluated to determine if data in these locations has been harmed. If the data has changed, as determined by the checksum, the user will have to reload the data. If the data was not harmed, the user will be saved the inconvenience of having to reload the data. Non-critical data is stored in the protected RAM, and the checksum allows less expensive memory devices to be used for this data. This represents a cost saving in manufacturing the private exchange. It should be noted that if a power down occurs, the data in the protected memory will be lost, and the user will have to reload the data.

The POTS line 1 or line 2 can include a caller ID box connected to one of ports 30 or 31. These caller ID boxes look at the analog stream on the line and read caller ID information. This includes the caller's ID, the time and the date, which information is digitally displayed for the user. The private exchange generates caller ID signals using a general purpose microprocessor U1 and software instruction in a novel manner.

The present private exchange provides a cost effective two analog line private exchange. The general purpose microprocessor U1 includes software which implements signalling as well as ringing control. The cadence output of the microprocessor controls the generation of ringing signals as described in International Application NO. WO95/21485, entitled POWER SUPPLY FOR PRIVATE BRANCH EXCHANGE Published Aug. 10, 1995. Dial pulse, Off-Hook and flash hook are distinguished using the microprocessor software.

For the digital ports 36–39, means are provided to communicate serial data between an ISDN X.25 port protocol and the protocol associated with a device connected to these digital ports. This interface may convert between any two digital protocols and thus allows virtually any RS232 port device to be connected to one of the data ports for coupling to the digital network.

Accordingly, it can be seen that an improved private exchange is disclosed which interfaces between a digital signalling local exchange and services all types of analog and digital POTS devices. The exchange provides two analog lines, four digital ports and a voice mail system.

It is to be understood that the foregoing description of the preferred embodiments of the invention is provided for purposes of description and illustration, and not as a measure of the invention, whose scope is to be defined by reference to the ensuing claims. Thus, those skilled in the art may devise embodiments of the particular concepts presented in the foregoing illustrative disclosure which differ from the particular embodiments shown and described in detail herein or may make various changes and structural details to the illustrated embodiments. Accordingly, all such alternative or modified embodiments which utilize the underlying concepts of the invention and incorporate the spirit thereof are to be considered as within the scope of the claims appended hereinbelow, unless such claims, by their language, specifically state otherwise.

The embodiments of the invention in which an exclusive property or privilege is claimed are defined as follows:

1. A subscriber premises network interface to a digital network, comprising:

a first port for connection to a digital network local exchange;

a plurality of second ports for connection to analog telephone devices;

a plurality of third ports for connection to digital devices;

a fourth port for connection to at least one additional digital device; and an exchange circuit coupled to said first, second, third and fourth ports, said exchange circuit including an exchange controller controlling communication to and from at least said second and third ports;

a circuit interface coupled to said first port for effecting a predetermined communication protocol with the local exchange; and a digital port interface, said digital port interface coupling said fourth port with said circuit interface through a network PCM bus.

2. The network interface as defined in claim 1, further including another circuit interface coupled between said network PCM bus and said exchange controller for effecting branching of said network PCM bus to communicate with said second ports.

3. The network interface as defined in claim 2, further including a local interface circuit coupled between said network PCM bus and a local PCM bus, said local PCM bus coupled to said second ports, said exchange controller and said another circuit interface.

4. The network interface as defined in claim 3, wherein said private exchange further comprises a voice mail circuit coupled to said local PCM bus.

5. The network interface as defined in claim 4, wherein said exchange controller includes a time slot controller coupled to said local PCM bus.

6. The network interface as defined in claim 5, wherein said time slot controller includes a time switch connected between said exchange controller and said local PCM bus.

7. The network interface as defined in claim 6, wherein said time switch creates a local communication channel on said local PCM bus which is isolated from the signals on the network PCM bus.

8. The network interface as defined in claim 1, wherein said plurality of second ports are coupled to respective data port interfaces in said exchange controller.

9. The network interface as defined in claim 8, wherein said exchange controller provides signal conversion between local exchange signal protocols and a protocol of a device connected to one of said second ports.

10. The network interface as defined in claim 1, wherein said exchange controller is responsive to signals input at said second or third ports for configuring said exchange controller to connect one of said second or third ports with said local exchange or to configure said exchange controller to communicate with a device connected to one of said second and third ports.

11. The network interface as defined in claim 1 said exchange controller includes a system for determining the type of digital network local exchange to which said network interface is connected.

12. The network interface as defined in claim 11, wherein said controller identifies an ISDN local network type by transmitting ISDN commands associated with different types of ISDN local exchange switches and monitoring the response by the local exchange to those transmitted ISDN commands.

13. A subscriber premises network interface to a digital network comprising:

a first port for connection to a local exchange through a telephone line;

a second port for connection to at least one analog subscriber station device;

a third port for connection to at least one digital subscriber station device;

a network PCM bus connected to said first and third ports;

a local PCM bus coupled to said second port; and an interface circuit connected between said local PCM bus and said network PCM bus, said interface circuit creating a branch from said network PCM bus providing at least one signalling path, said at least one signalling path including a terminal connected to said local PCM bus whereby devices connected to said local PCM bus gain access to said network PCM bus when said terminal is granted access according to a communication protocol.

14. The network interface as defined in claim 13, wherein said local exchange is an ISDN exchange, and said interface circuit includes two S/T interfaces connected back-to-back between said local PCM bus and said network PCM bus.

15. The network interface as defined in claim 14, wherein said interface circuit includes a third S/T interface connected between said network PCM bus and said third port.

16. The network interface as defined in claim 15, wherein said S/T interfaces each include a four-wire side and a two-wire side, said network PCM bus and said local PCM bus each comprise two-wire serial links, and said third S/T module comprises a four-wire port.

17. The network interface as defined in claim 16, further including a serial controller coupled to said local PCM bus.

18. The network interface as defined in claim 17, further including a timing control circuit connected between said local PCM bus and an exchange controller controlling time slot allocation on said local PCM bus.

19. The network interface as defined in claim 13, including a plurality of data ports and a controller coupling said data ports to said interface circuit.

20. The network interface as defined in claim 13, further including an exchange controller, and wherein access to said network PCM bus is provided according to a protocol in said exchange controller.

21. The network interface as defined in claim 13, further including an exchange controller, and wherein said exchange controller is granted access to said network PCM bus according to local exchange protocol.

22. A subscriber premises network interface to a digital network, comprising:

a first port coupled to a digital signal local exchange;

a second port for connection to at least one analog subscriber station device;

a third port for connection to at least one digital subscriber station device;

a memory device storing operating instructions; and a controller coupled to said first port, said second port, said third port and said memory device for controlling communication between said first port and said second port and third ports according to the operating instructions stored in said memory device, and said controller responsive to selected control messages for updating operating instructions and other data stored in said memory;

wherein said other data includes rate information for different signal carriers which may be accessed through the local exchange.

23. The network interface as defined in claim 22, wherein said memory device includes an erasable memory.

24. The network interface as defined in claim 23, wherein said memory device includes a DRAM.

25. The network interface as defined in claim 23, wherein said memory device includes an EEPROM.

26. The network interface as defined in claim 23, wherein said memory device includes a flash ROM.

27. The network interface as defined in claim 22, wherein said other data includes communication protocol information for the local exchange.

28. The network interface as defined in claim 27, wherein said memory device includes write protection which prevents writing over said protocol information unless a predetermined security code is received.

29. The network interface as defined in claim 22, wherein said other data is input through said second port.

30. The network interface as defined in claim 22, wherein said other data is input through said third port.

31. The network interface as defined in claim 22, wherein said other data is input through said first port.

32. A subscriber premises ISDN BRI interface between an ISDN BRI local exchange and at least one subscriber station device, comprising:

a first port for connection to an ISDN BRI local exchange;

a second port for connection to at least one digital subscriber station device;

a third port for connection to at least one analog subscriber station device;

a controller effecting communication between said first port, said second port, and said third port according to a protocol stored during a configuration operation, wherein said controller is configured by signals input through said first port, said second port or said third port.

33. The ISDN BRI interface as defined in claim 32, further including a memory storing the configuration information for each of said second and third ports.

34. The ISDN BRI interface as defined in claim 32, further including a memory storing prompting signals for communication to said third port during configuration.

35. The ISDN BRI interface as defined in claim 34, wherein said prompting signals include an audible template format.

36. The ISDN BRI interface as defined in claim 34, further including a memory storing the configuration information for each of said and third ports.

37. The ISDN BRI interface as defined in claim 32, wherein said controller is responsive to configuration signals input through said third port.

38. A subscriber premises ISDN BRI interface between an ISDN BRI local exchange and at least one subscriber station device, comprising:

a first port for connection to an ISDN BRI local exchange;

a second port connectable to at least one analog subscriber station device;

a third port connectable to at least one digital subscriber station device;

a memory storing call progress tones; and a controller coupled to said memory and to said second and third ports, said controller controlling the reading of said memory such that progress tones stored in said memory are selectively output to said second port.

39. The ISDN BRI interface as defined in claim 38, further including a digital-to-analog interface connected between said controller and said second port, said digitalto-analog interface converting said progress tones stored in said memory into analog signals.

40. A subscriber premises ISDN BRI interface between an ISDN BRI local exchange and at least one subscriber station device, comprising:

- a general purpose microprocessor including software instructions;
- means for connecting said microprocessor to an ISDN BRI local exchange;
- connecting means for connecting said microprocessor to at least one analog port for connection to an analog subscriber station device and to at least one digital port for connection to a digital subscriber station device;
- a memory device for storing audible data in a digital format; and
- said connecting means including a digital-to-analog interface between said at least one analog port and said microprocessor, whereby said microprocessor generates digital audible signals from audible data stored in said memory device for output to said at least one analog port.

41. The ISDN BRI interface as defined in claim 40, wherein said microprocessor generates said digital audible signals responsive to input signals from a device connected with said at least one analog port.

42. The ISDN BRI interface as defined in claim 40, wherein said microprocessor is responsive to signals from said local exchange for generating said digital audible signals.

43. The ISDN BRI interface as defined in claim 42, wherein said digital audible signals include ring-back signals and busy signals.

44. The ISDN BRI interface as defined in claim 42, wherein said digital audible signals include caller ID information.

45. The ISDN BRI interface as defined in claim 42, wherein said digital audible signals include call waiting tone.

46. The ISDN BRI interface as defined in claim 42, wherein said digital audible signals include prompting signals.

47. A subscriber premises ISDN interface between an ISDN local exchange and at least one subscriber station device, comprising:

- a first port for connection to an ISDN local exchange and a U-port interface coupled to said first port for effecting U-boundary communication protocols;
- at least one second port for connection to an analog telephone device;
- at least one third port for connection to a digital subscriber station device;
- a fourth port for connection to at least one ISDN terminal;
- an exchange circuit coupled to said first, second, third and fourth ports, said exchange circuit including an exchange controller controlling communication to and from at least said second and third ports; and
- an S/T port interface coupled to said fourth port, said S/T port interface and said U-port interface interconnected by a network PCM bus.

48. The ISDN interface as defined in claim 47, further including a local interface coupled to said network PCM bus and to said exchange controller for effecting branching of said network PCM bus.

49. The ISDN interface as defined in claim 48, further including a terminal interface circuit coupled between said network PCM bus and a local PCM bus, said local PCM bus coupled to at least said plurality of analog ports.

50. The ISDN interface as defined in claim 49, wherein said private exchange further comprises a voice mail circuit coupled to said local PCM bus.

51. The ISDN interface as defined in claim 50, wherein said exchange controller includes a serial controller coupled to said local PCM bus.

52. The ISDN interface as defined in claim 51, wherein said exchange controller includes a time switch between said serial controller and said local PCM bus.

53. The ISDN interface as defined in claim 52, wherein said time switch creates local time slots on said local PCM bus which are isolated from time slots on said network PCM bus.

54. The ISDN interface as defined in claim 53, wherein said private exchange provides signal conversion between ISDN protocols and the protocol of the device connected to one of said third ports.

55. The ISDN interface as defined in claim 47, wherein said exchange controller is responsive to signals input at said second or third ports for configuring said exchange controller to communicate with said second or third ports or to the through local exchange through said first port.

56. A subscriber premises ISDN BRI interface between an ISDN BRI local exchange and at least one subscriber station, comprising:

- a first port for connection to an ISDN BRI local exchange;
- a plurality of second ports for connection to subscriber station devices;
- an interface circuit coupled to said first port configured to interface with said ISDN BRI local exchange; and
- a microprocessor coupled to said interface circuit and to said second ports, said microprocessor including a plurality of software implemented terminals selectively associated with said second ports and coupled to said ISDN BRI local exchange through said interface circuit.

57. The ISDN BRI interface as defined in claim 56, wherein said controller includes a router for routing calls between said second ports and said first port.

58. The ISDN BRI interface as defined in claim 57, wherein said terminals are used to route a plurality of calls between said first port and respective ones of said second ports.

59. A subscriber premises ISDN BRI interface between an ISDN BRI local exchange and at least one subscriber station device, comprising:

- A U-channel port configured to interface directly with a U channel of an ISDN BRI local exchange;
- at least one additional port configured to interface directly with a subscriber station device;
- an exchange circuit controlling communication between said U-channel port and said at least one additional port, wherein said exchange circuit includes a system for determining the type of ISDN BRI local exchange to which said ISDN BRI interface is connected and wherein said exchange circuit automatically uses ISDN BRI control signals compatible with the local exchange to which said ISDN BRI interface is connected; and
- a power supply for converting high voltage levels to low voltage levels to supply power to said exchange circuit and said port.

60. The ISDN BRI interface in claim 59 including a battery backup for said power supply wherein said power supply supplies power irrespective of said high voltage levels.

61. The ISDN BRI interface in claim 59 wherein said at least one additional port includes an analog port configured to interface directly with an analog subscriber station device.

62. The ISDN BRI interface in claim 61 wherein said at least one additional port includes a plurality of analog ports, each configured to interface directly with an analog subscriber station device.

63. The ISDN BRI interface in claim 61 wherein said analog port is configured to support a POTS telephone.

64. The ISDN BRI interface in claim 59 wherein said at least one additional port includes a digital port configured to interface directly with a digital subscriber station device.

65. The access controller in claim 64 wherein said at least one additional port includes a plurality of digital ports, each configured to interface directly with a digital subscriber station device.

66. The access controller in claim 64 wherein said at least one additional port includes at least one analog port configured to interface directly with an analog subscriber station device.

67. The access controller in claim 66 wherein said at least one analog port includes a plurality of analog ports, each configured to interface directly with an analog subscriber station device.

68. The access controller in claim 65 wherein said at least one analog port is configured to support a POTS telephone.

69. The access controller in claim 59 including an S/T channel port configured to interface directly with an ISDN terminal adaptor or ISDN terminal equipment, wherein said exchange circuit controls communication between said S/T channel port and said U-channel port.

70. The access controller in claim 69 wherein said exchange circuit includes a PCM bus between said U-channel port, said additional ports and said S/T channel port.

71. The ISDN BRI interface in claim 59 wherein said controller identifies an ISDN BRI local exchange type by transmitting ISDN BRI commands associated with different types of ISDN BRI local exchange switches and monitoring the response by the local exchange to those transmitted ISDN BRI commands.

72. A subscriber premises ISDN BRI interface between an ISDN BRI local exchange and at least one subscriber station device, comprising:

a U-channel port configured to interface directly with a U channel of an ISDN BRI local exchange;

at least one additional port configured to interface directly with a subscriber station device;

an exchange circuit controlling communication between said U-channel port and said at least one additional port, wherein said exchange circuit includes a PCM bus between said U-channel port and said at least one additional port; and a power supply for converting high voltage levels to low voltage levels to supply power to said exchange circuit and said port.

* * * * *